Figure 6:
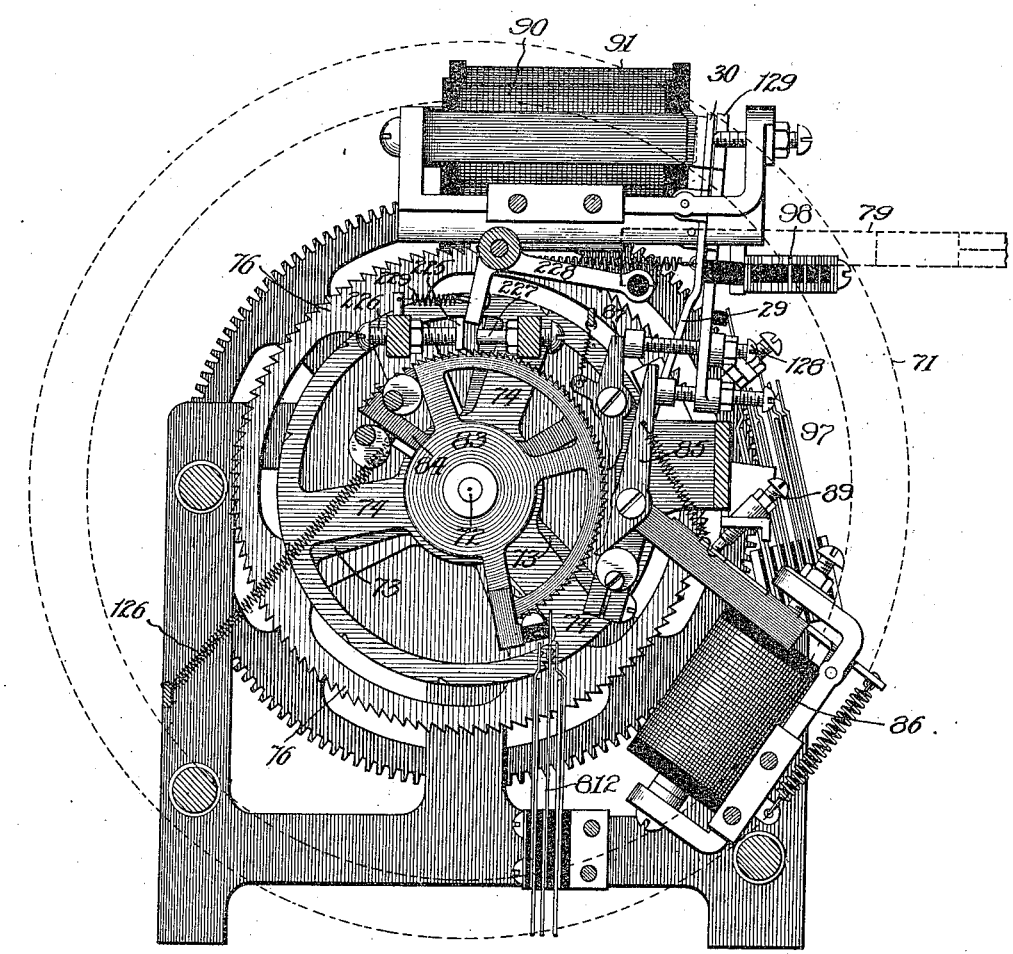

A. M. BULLARD.
SEMI-AUTOMATIC EXCHANGE SYSTEM.
APPLICATION FILED AUG. 4, 1908.
1,144,997.
Patented July 6, 1915.
19 SHEETS—SHEET 1.
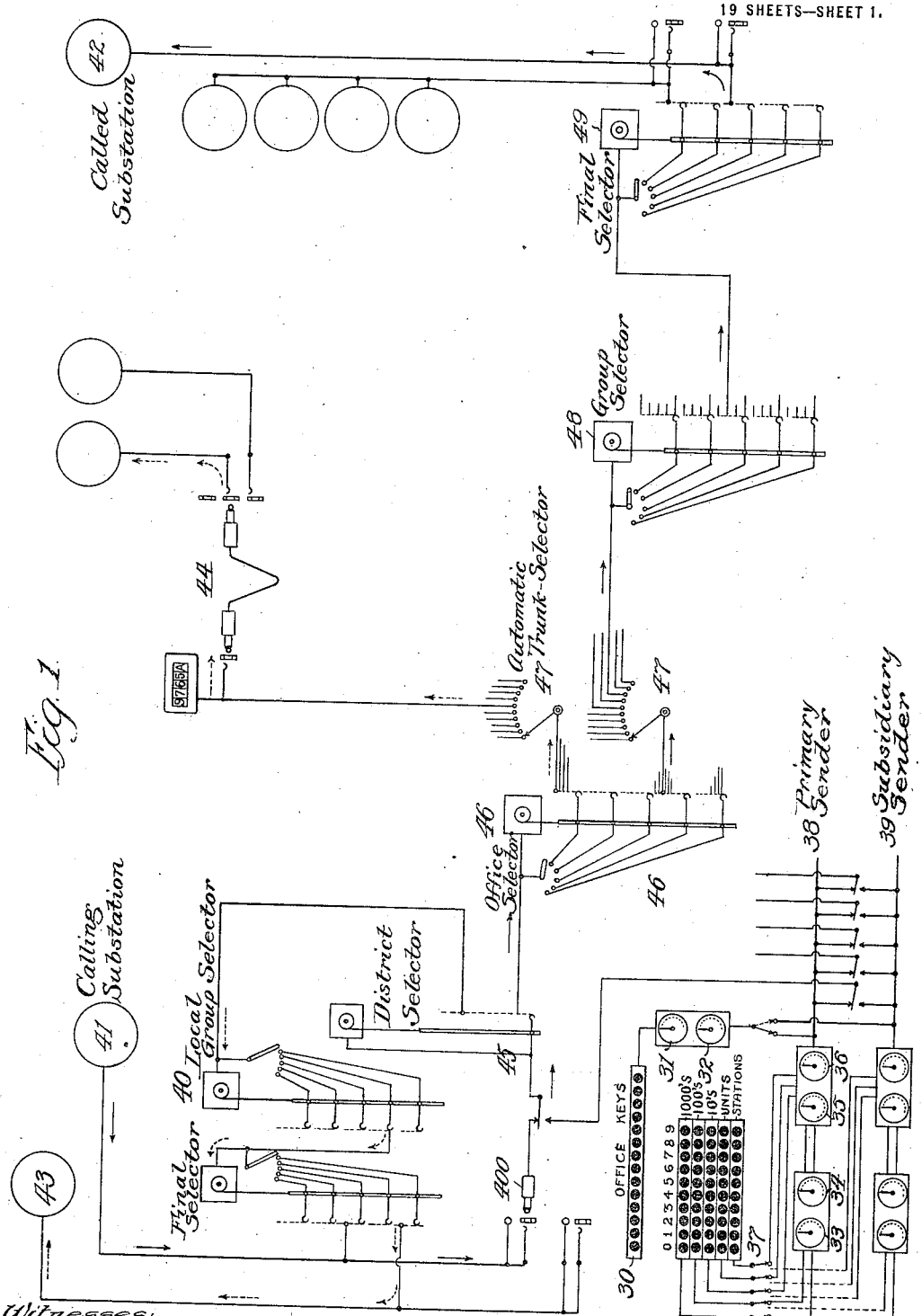

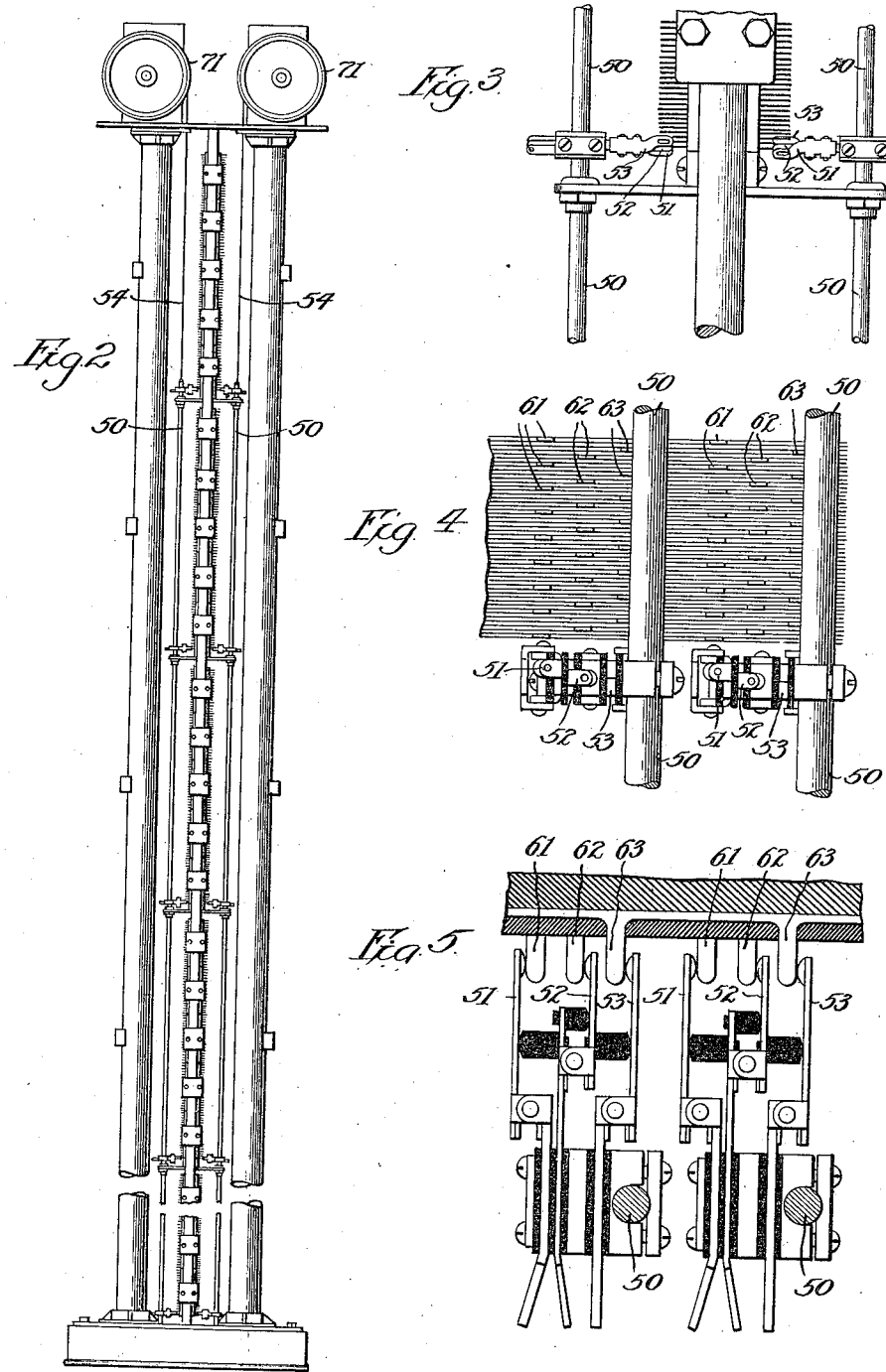

A. M. BULLARD.
SEMI-AUTOMATIC EXCHANGE SYSTEM.
APPLICATION FILED AUG. 4, 1908.

1,144,997.

Patented July 6, 1915.
19 SHEETS—SHEET 4.

Witnesses:
F. P. McIntosh
I. MacDonald

Inventor:
Albert M. Bullard
By Barton, Manner & Folk
Attys.

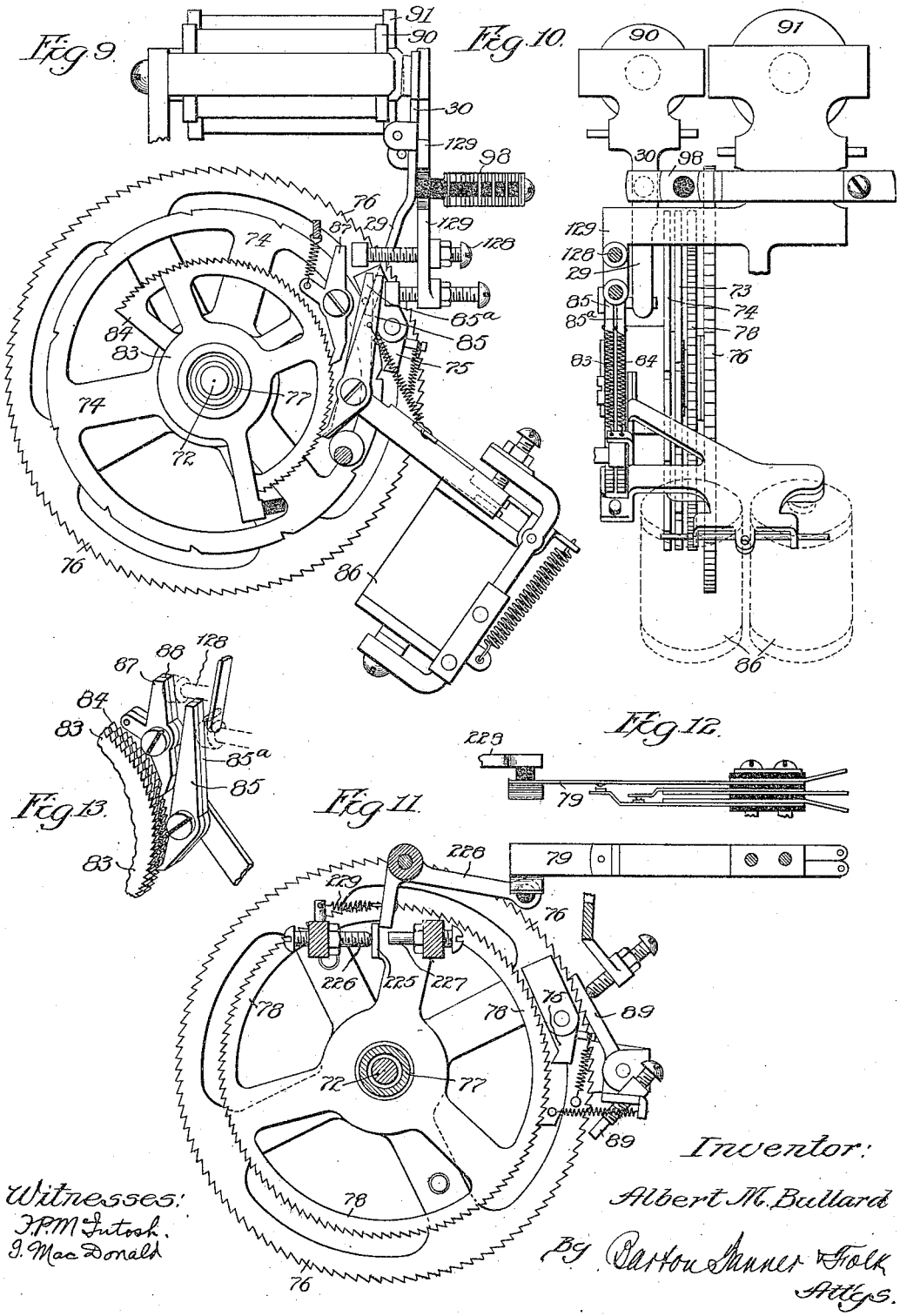

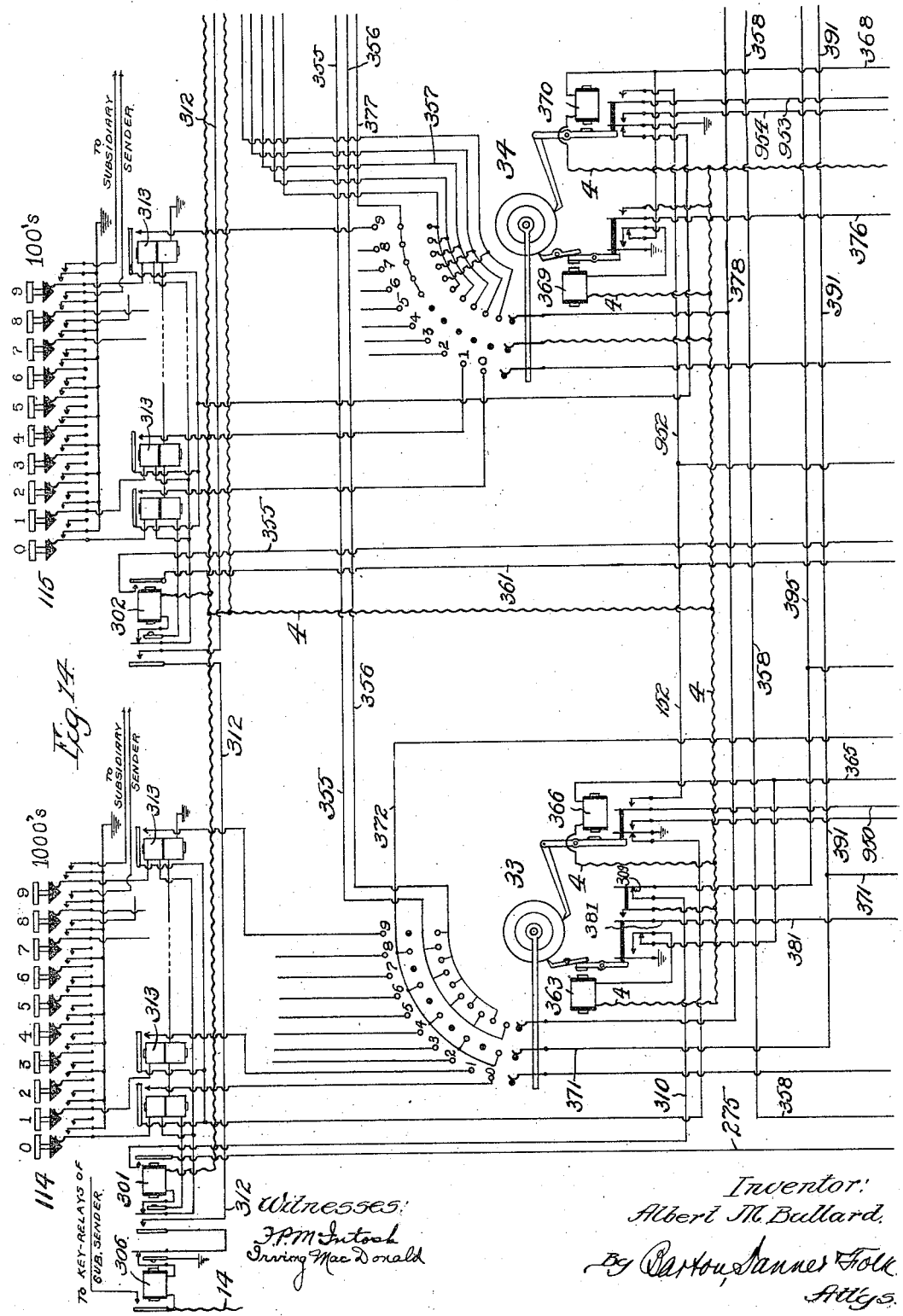

A. M. BULLARD.
SEMI-AUTOMATIC EXCHANGE SYSTEM.
APPLICATION FILED AUG. 4, 1908.
1,144,997.
Patented July 6, 1915.
19 SHEETS—SHEET 7.
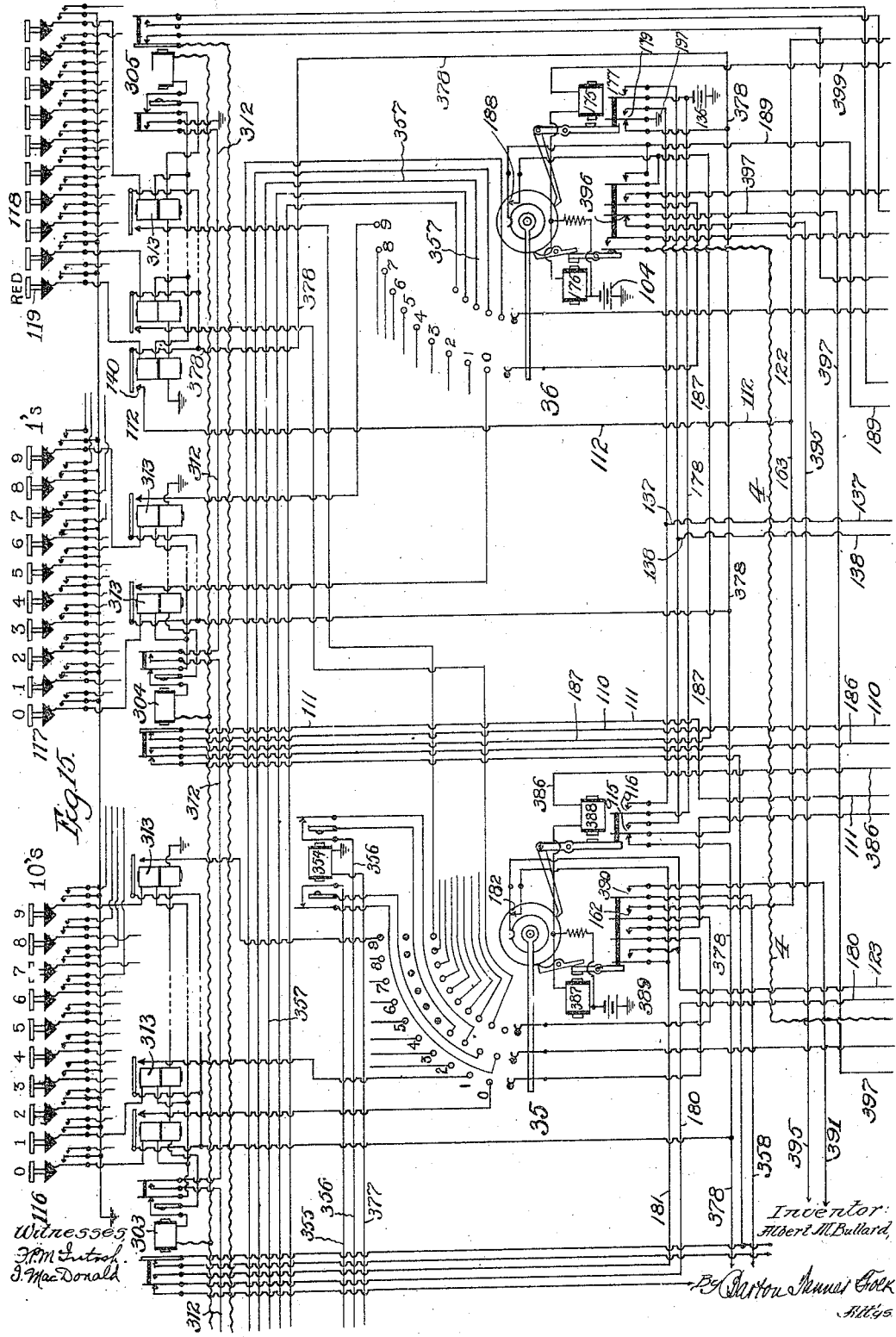

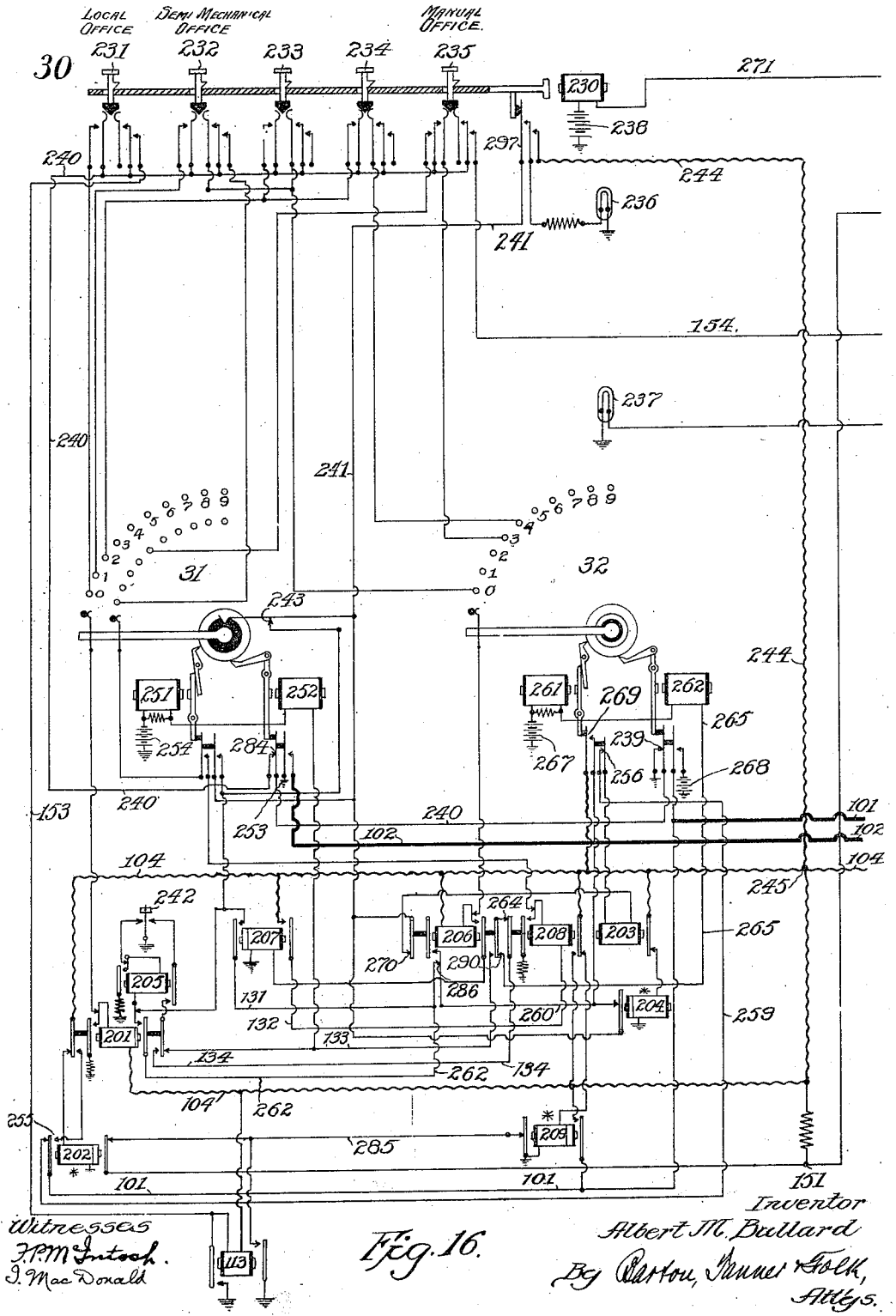

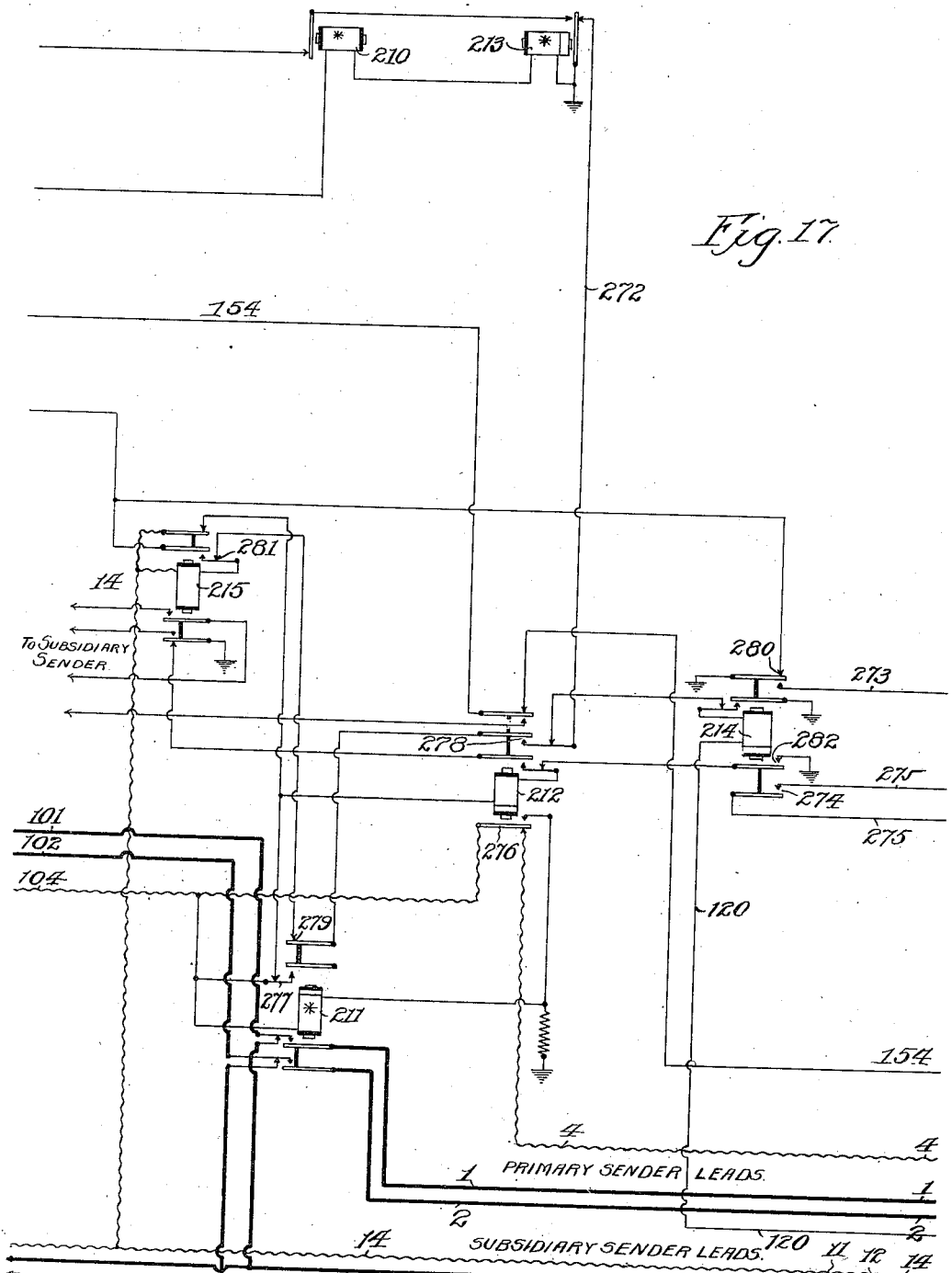

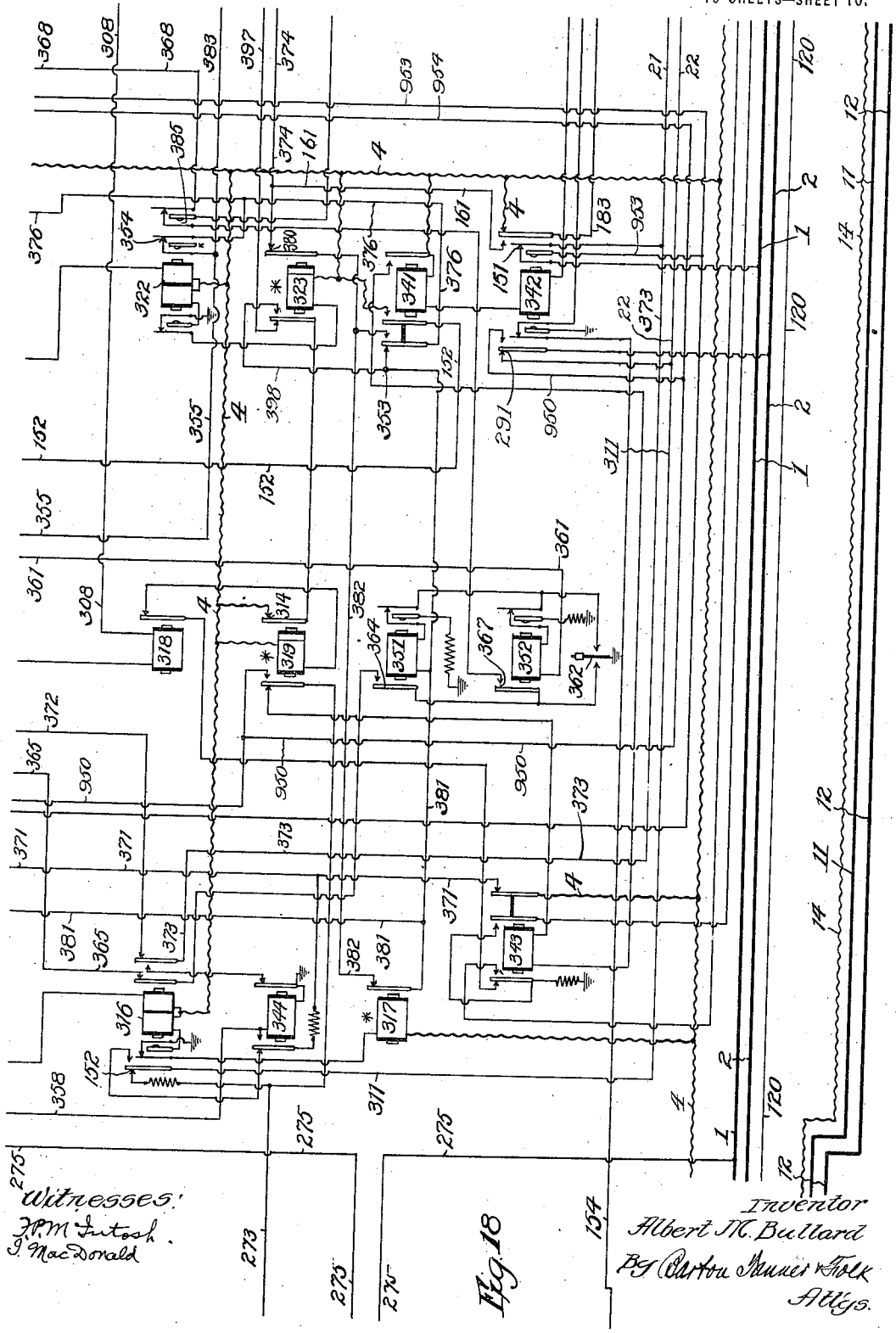

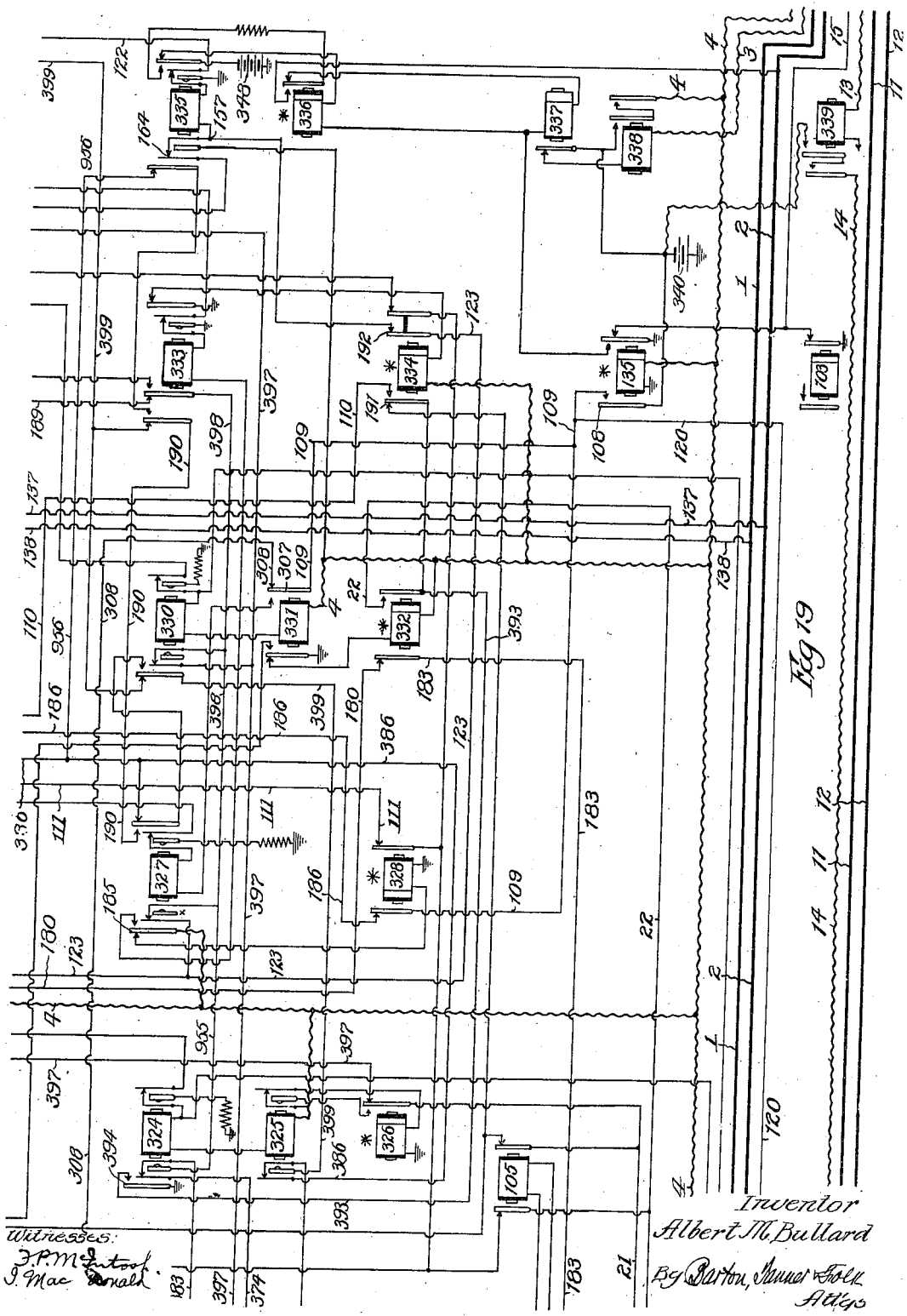

A. M. BULLARD.
SEMI-AUTOMATIC EXCHANGE SYSTEM.
APPLICATION FILED AUG. 4, 1908.

1,144,997.

Patented July 6, 1915.
19 SHEETS—SHEET 12.

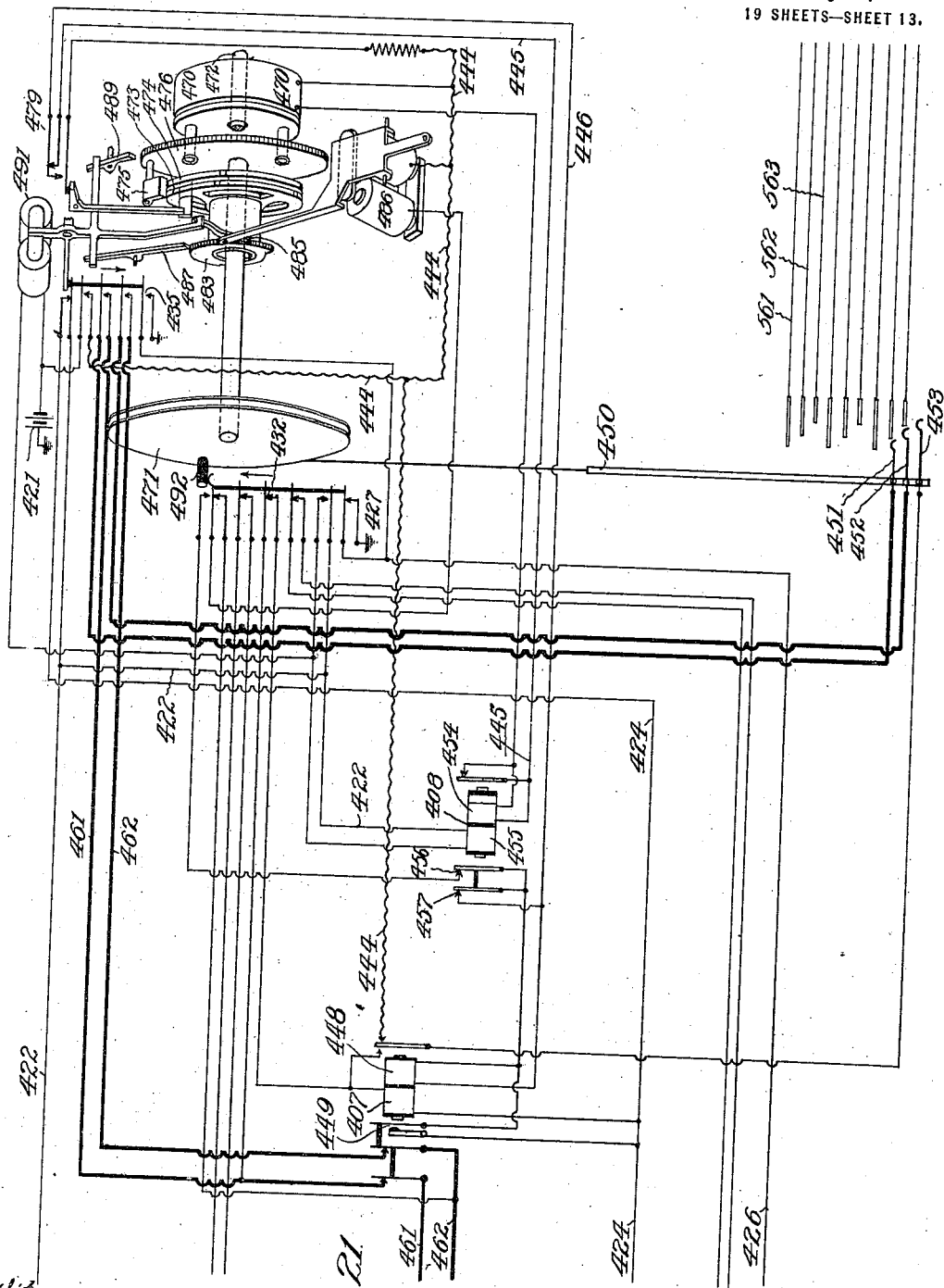

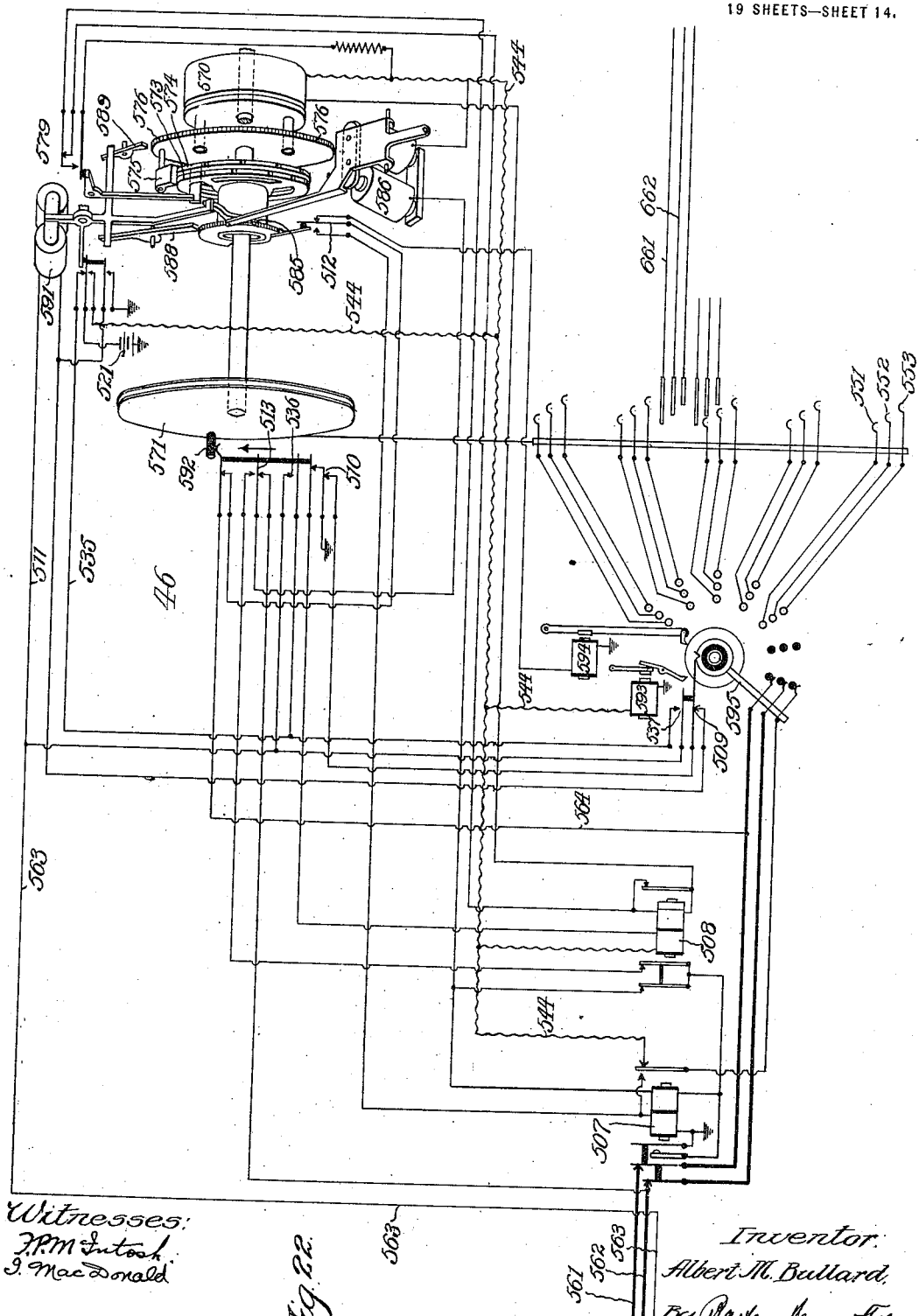

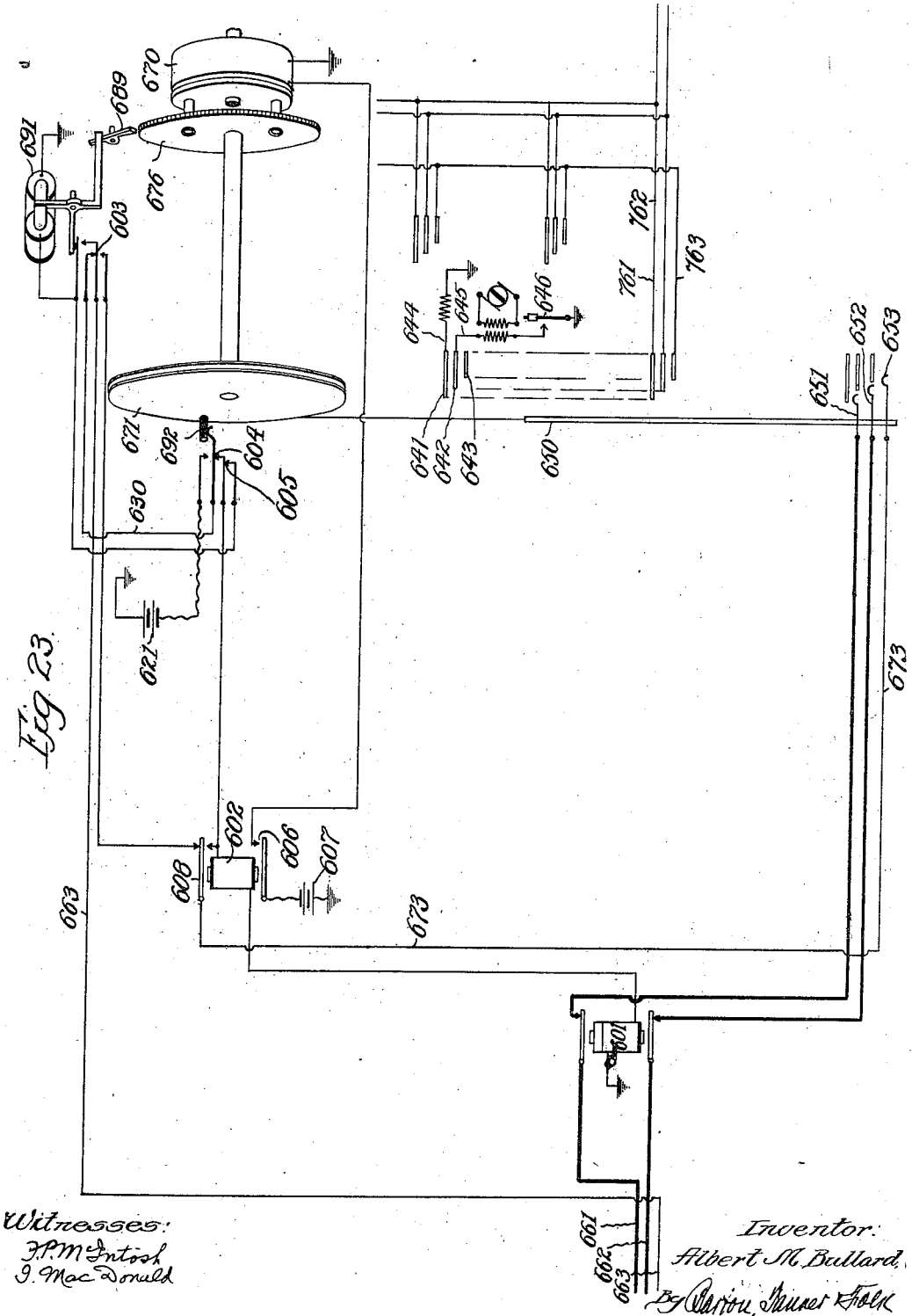

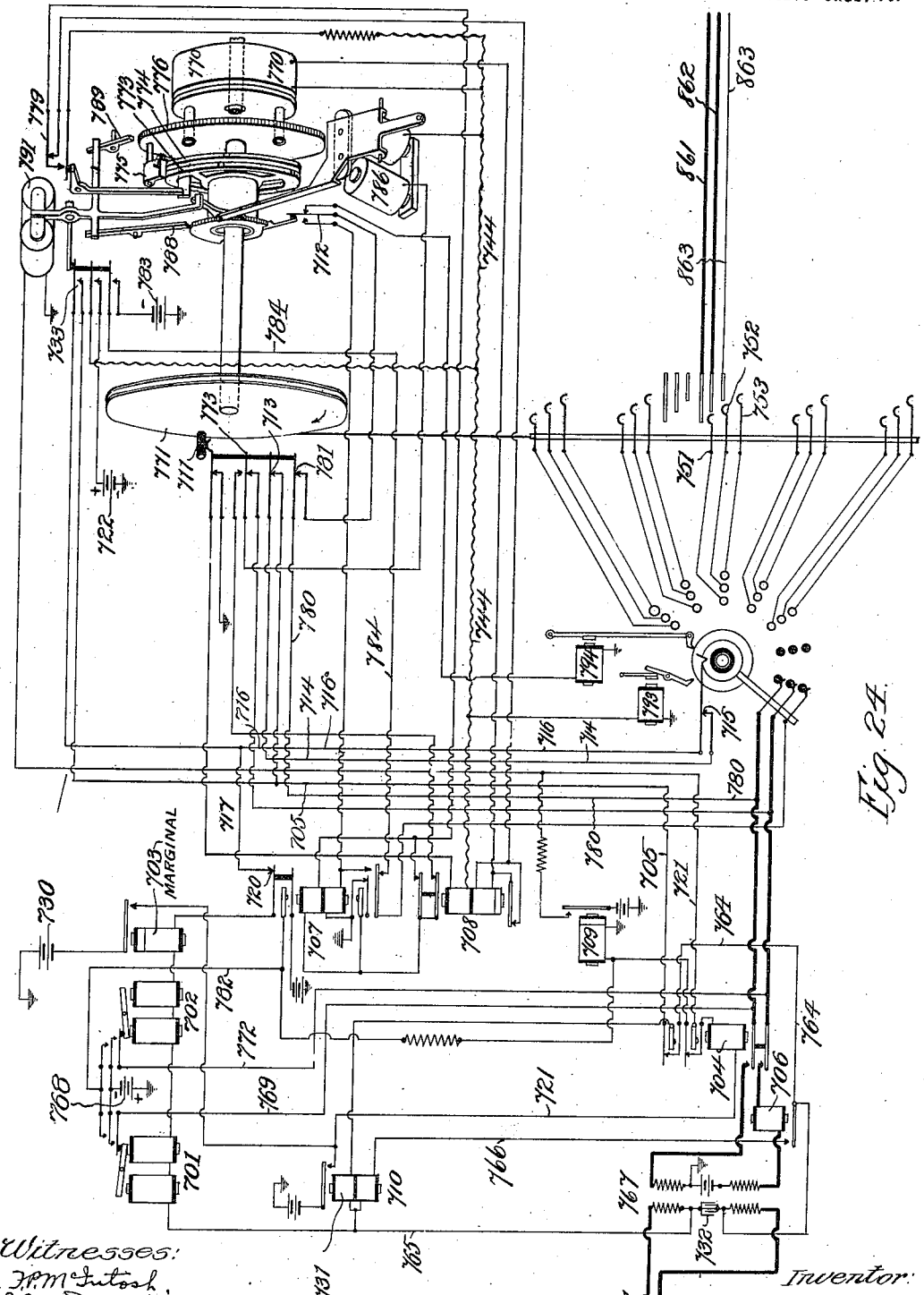

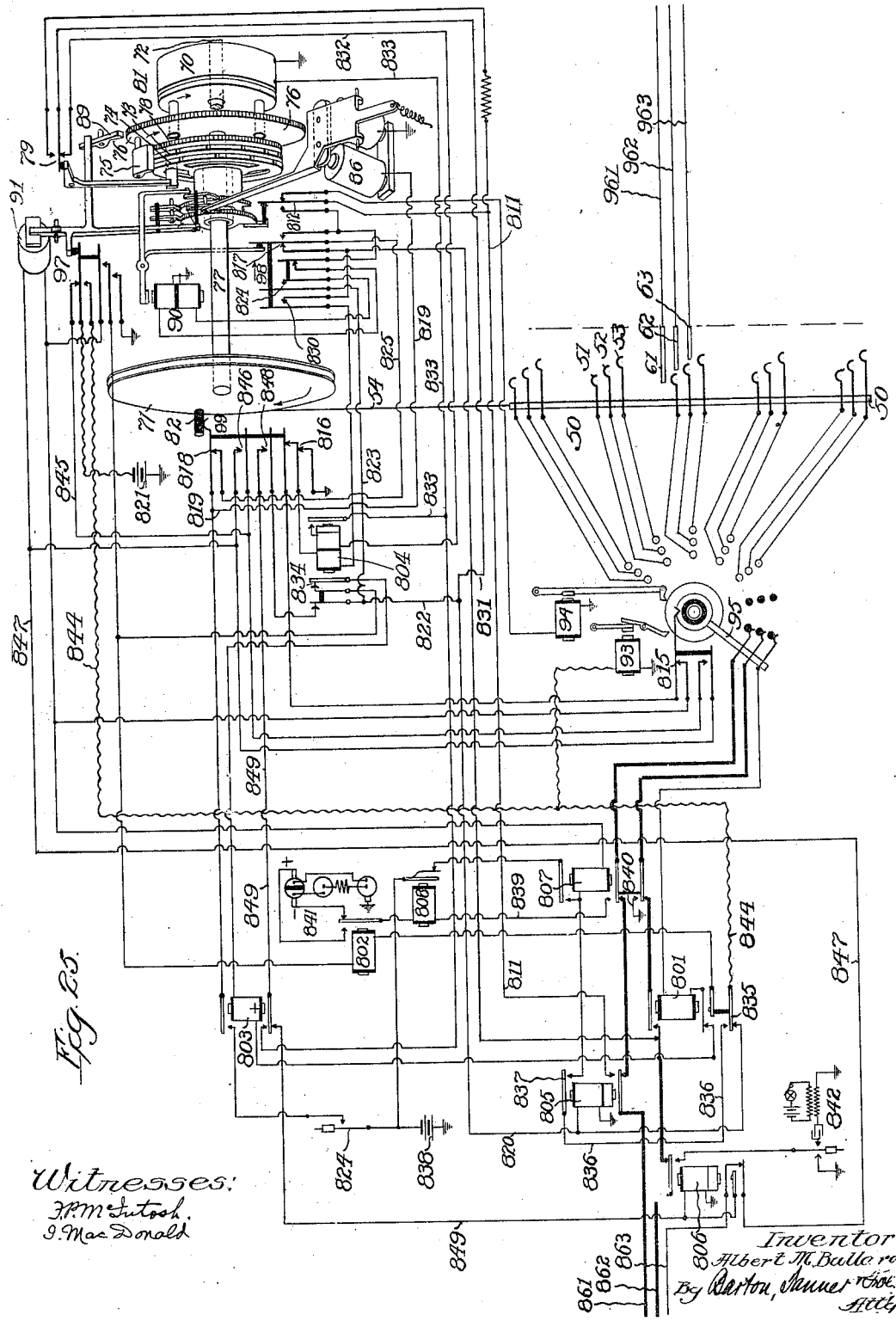

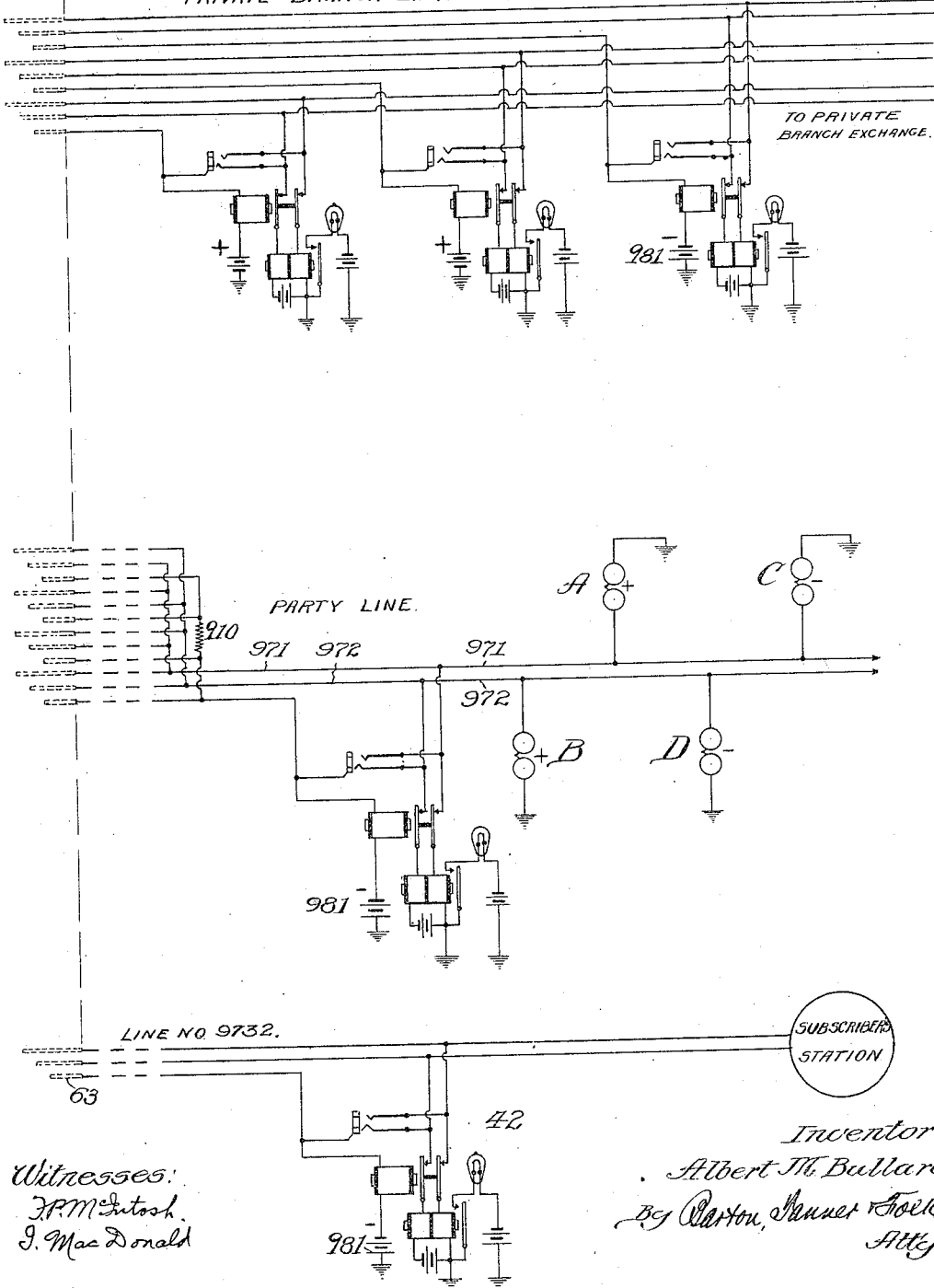

UNITED STATES PATENT OFFICE.

ALBERT M. BULLARD, OF NEW YORK, N. Y., ASSIGNOR TO WESTERN ELECTRIC COMPANY, OF CHICAGO, ILLINOIS, A CORPORATION OF ILLINOIS.

SEMI-AUTOMATIC EXCHANGE SYSTEM.

1,144,997.  Specification of Letters Patent.  Patented July 6, 1915.

Application filed August 4, 1908. Serial No. 446,955.

*To all whom it may concern:*

Be it known that I, ALBERT M. BULLARD, a citizen of the United States, residing at New York, in the county of New York and State of New York, have invented a certain new and useful Improvement in Semi-Automatic Exchange Systems, of which the following is a full, clear, concise, and exact description.

This invention relates to an automatic switching system for telephone lines, and more particularly to a system in which an operator at the central office, after answering a call, may cause the calling line to be automatically switched into connection with any line wanted, whether in the originating office or in a distant office, by merely actuating a corresponding combination of keys. Certain keys designate offices or exchanges; and a bank of number keys, similar to those of an adding machine, may be set in the combinations required to represent any line-number of the system. The circuit is successively extended from the calling line and operator's connecting circuit through a series of automatic selectors, until a final selector is reached which has direct access to the line wanted. The various selectors are successively controlled by "sending apparatus" governed by the depressed keys. After having set up a connection, the sending apparatus is automatically disconnected from the circuit which it has caused to be established, leaving the latter free for telephone transmission, the sending apparatus being immediately available to set up another connection.

A system having such general characteristics is described in a joint application of James L. McQuarrie and myself, Serial No. 336,401, filed September 27th, 1906.

The present invention relates to a system involving the use of an improved type of selector switch and improved sending mechanism; further objects being to secure increased efficiency, speed and accuracy in making connections, and in general to provide improved means for meeting all the manifold requirements of a practical system, imposed by operating conditions. Without attempting to describe or even enumerate these various improvements except by reference to a specific system embodying them in concrete form, I will direct attention to certain salient features or characteristics which when recognized will assist one more readily to follow the detailed description.

When any operator's connecting circuit is taken for use, one of the senders which is idle at the time is automatically seized by that connecting circuit. While the sender so seized is busy, another sender is automatically made available for any of the remaining connecting circuits which may be put into use, and as soon as any sender finishes setting up one connection it is immediately ready to undertake another. In the particular system shown there are two senders—"primary" and "subsidiary"—available for each set of operators' connecting or "cord" circuits. When any of these connecting circuits is put into use (as by the insertion of the plug in a springjack and the actuation of the listening key) the primary sender if free is seized by that connecting circuit. If the primary sender is busy then the subsidiary sender if free will be seized; but in the rare case when both senders are busy a guard signal will be displayed as a warning to the operator until one or the other is freed.

A feature of the system is that for selecting a trunk leading to the desired distant office there is a single "office sender", comprising "office keys" and "office controllers", which may be used as a part of either the primary sender or subsidiary sender; an "automatic transfer mechanism" being arranged to shift the office sender to the leads of the subsidiary sender when the primary sender is in use, and vice versa. A guard signal is provided to warn the operator when the office sender is busy, but this sender finishes its work of governing selection of a trunk very quickly and is free long before the selection of the desired subscriber's line is completed. Although there are two number senders, only a single set of number keys is provided for each operator, these keys when depressed serving to "store up" the indicated number upon locking relays of the sender which has been seized, the keys then losing control of that sender but being available for use with the other sender which may be seized by another cord circuit.

As a practical means for bringing about the required sequence of sender operations, a number of relays are initially excited and locked up when the sender is taken for use, and these relays are released one after another, as the different sender parts complete their respective tasks, to bring other parts into service.

In the selectors used in the system to be described, the traveling brushes are not moved step by step in response to the selecting impulses, but these impulses merely effect the adjustment of electromagnetic stop-setting mechanism which will determine the point to which the brushes shall be moved, and auxiliary power is then applied, as by a magnetic clutch, to take the brushes to the point determined by the stop-setter.

Certain of the selectors have several sets of brushes arranged to travel over different zones of contacts, and auxiliary brush-choosing mechanism for selecting any given set of brushes, according to the zone of contacts which it is desired to reach.

The system includes means whereby if a call is made for a line in a distant office not equipped with automatic selectors, but operated upon the old "manual" plan, the answering operator at the semi-mechanical office may register the number wanted the same as if it were for a semi-mechanical office, depressing the manual office key and the required combination of number keys. The depression of the key designating the manual office will so modify the operation of the number sender that an indicator at the manual office will be caused to display the number so written before a trunking or B operator, who will complete a connection from the trunk to the line so designated.

The various novel features of this invention will be described in their specific application to such a semi-mechanical system, but many of them are capable of use in other systems, where they may take different forms from those here shown.

Figure 8:
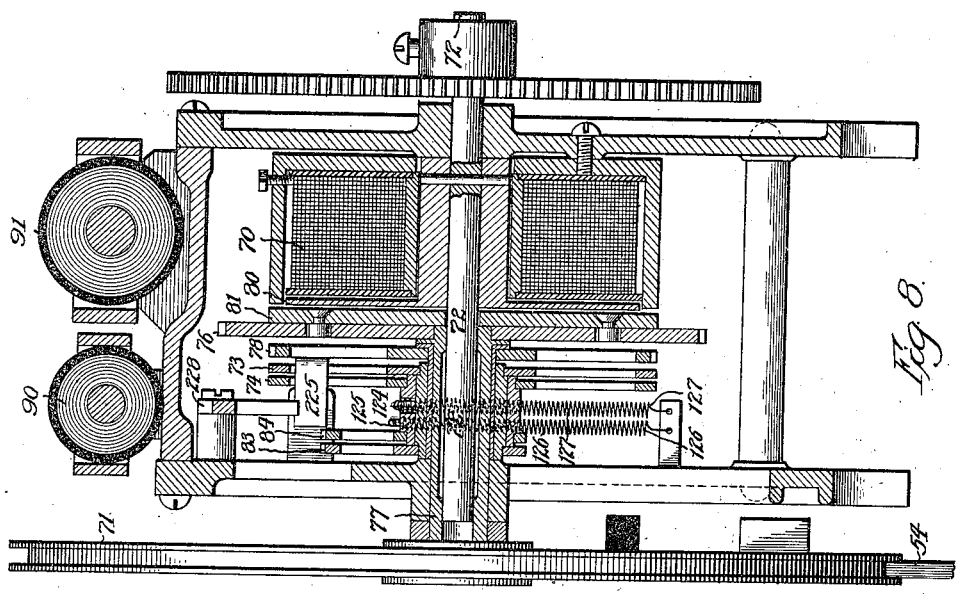
Figure 7:
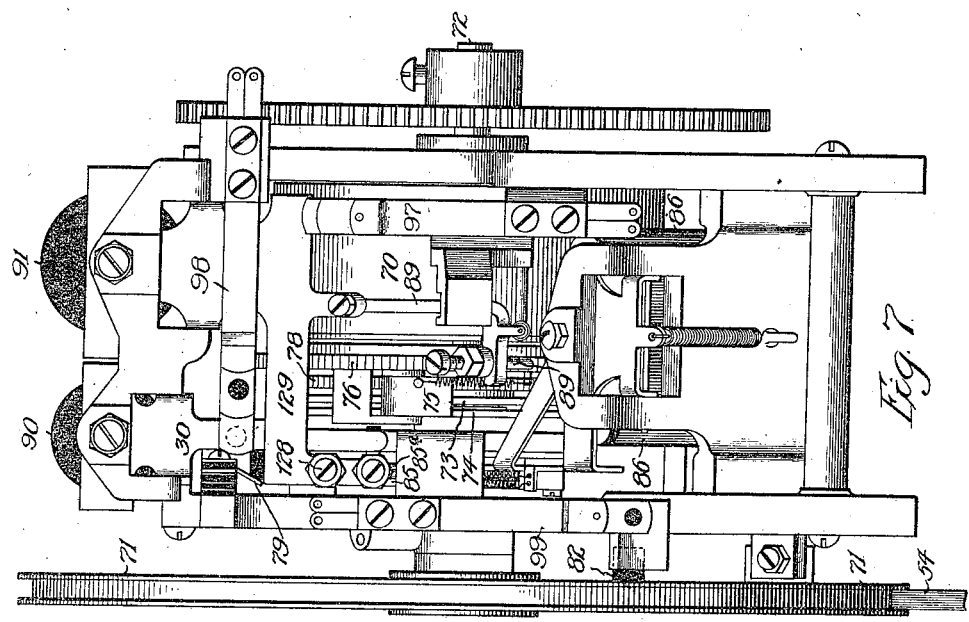
Figure 27:
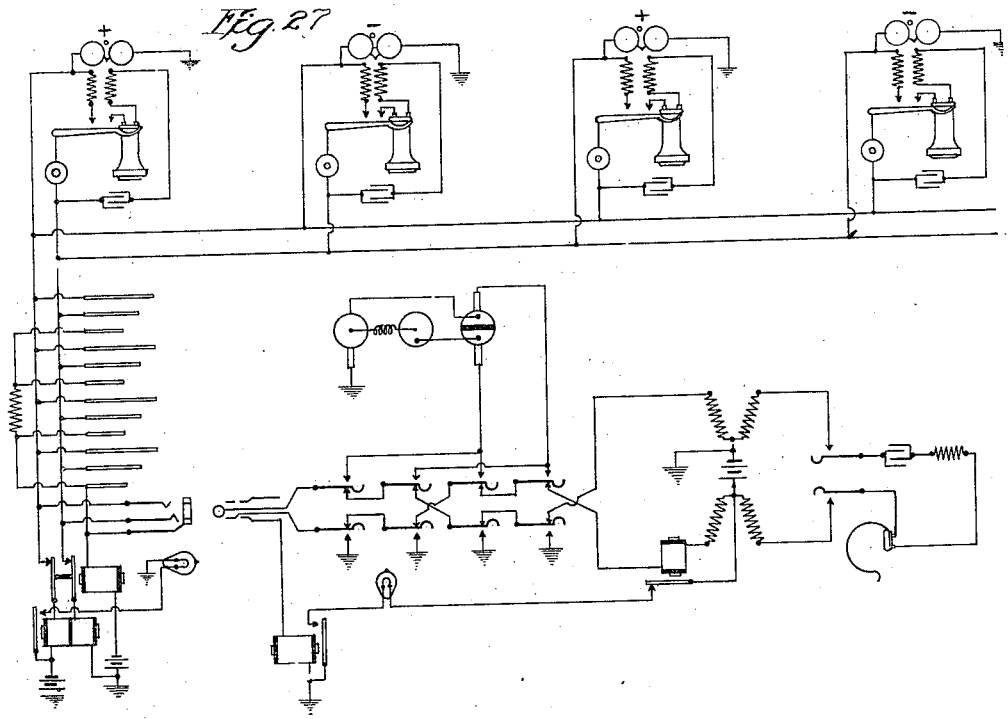
Figure 28:
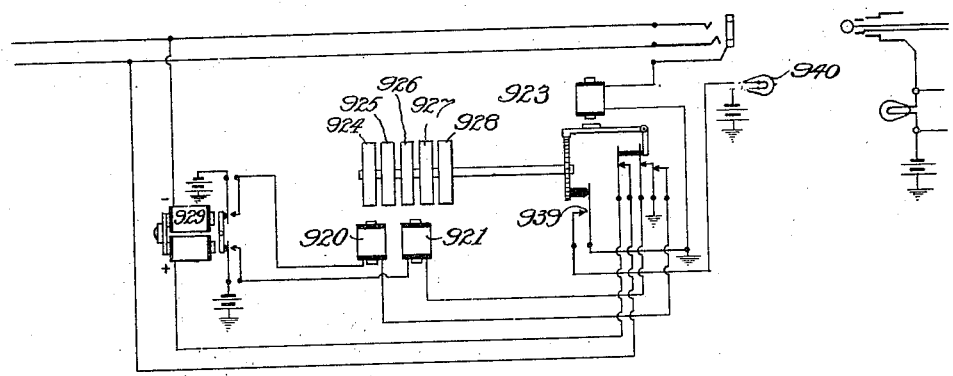

In the drawings Figure 1 is a skeleton diagram indicating roughly in a symbolic way the apparatus involved in completing connection from a calling line in one office to a called line of another office; Fig. 2 is an edge view of a bank of selectors, comprising a common terminal board and individual selector mechanisms each having its own sets of contact brushes arranged to travel over the terminals upon the board; Fig. 3 is an edge view of a fragment of the terminal board, and a set of traveling brushes, on a larger scale; Fig. 4 is a front view of a fragment of the board, and Fig. 5 is a sectional plan view thereof; Fig. 6 is a side view of the operating mechanism of one of the selectors, the sheave and the side of the frame being omitted; the final selector, having the most complete equipment, is the one chosen for illustration; Fig. 7 is a front view of the operating mechanism; Fig. 8 is a sectional view taken on the line of the operating shaft; Fig. 9 is a detail side view of the vernier stop-setting mechanism of the selector; Fig. 10 is an edge view thereof; Fig. 11 is a detail view showing the mechanism for operating the clutch-release switch-springs of the selector; Fig. 12 is a plan view of said clutch-release springs; Fig. 13 is a detail perspective view of a portion of the ratchet mechanism for adjusting the vernier stop-setting disks; Figs. 14 to 26 inclusive are diagrams illustrating the apparatus and circuits involved in connecting a calling line of one semi-mechanical office with the line called for in a distant office. The separate sheets containing these figures when placed together form a complete diagram, the lines which extend to the edge of one sheet being continued on another sheet. In assembling these sheets, Figs. 16, 17, 18, 19, 20, 21, 22, 23, 24, 25 and 26 should be joined together in the order named, and Figs. 14 and 15 should be joined to the top of Figs. 18 and 19 respectively. Figs. 14, 15, 16, 17, 18 and 19 show the "sending apparatus" by which the selecting operations are governed; Fig. 20 shows the calling line and a portion of the operator's connecting circuit; Figs. 21 to 25 show the chain of selectors through which and by which the circuit is successively extended, and Fig. 26 shows the different types of lines—single-station line, party line and private exchange trunks—to which a final selector may make connection. Fig. 27 is a diagram illustrating a plug circuit having equipment for ringing up a station on a party line in response to a call from some other station on the same line. Fig. 28 is a diagram illustrating the circuits for an indicating apparatus which may be used at a "manual" office, to be operated by selecting impulses from a sender at a distant semi-mechanical office, to display the number of the line wanted.

The same reference characters indicate the same parts wherever they are shown.

*General plan of system.*

In Fig. 1 the course of a connection is traced from a calling station 41 of one exchange to a called station 42 of a distant exchange. It is not material to this invention how connection is made from the calling line to the first of the train of selectors, as this may be accomplished either by manual apparatus, such as a plug and springjack, or by an automatic call-distributing apparatus. In the system shown each subscriber's line is provided with the usual answering jack and line signal before the central office operator who attends to the calls from such line, and connection is made to the line, when calling, by an ordinary answering plug. To receive incoming calls, each line is provided with multiple terminals upon a group of mechanical selector switches, called in this case final selectors, so that any one of the selectors of that group can reach any one of the same group of lines. In the system shown the operator's connecting circuit terminates at one end in an answering plug 400, of the usual type, and at the other end in an automatic selector 45 which is here called a district selector. This district selector has access to a number of local trunk lines leading to other selectors 46 called office selectors. Each office selector is adapted to pick out one of a number of automatic trunk selectors 47, which in turn are adapted to find idle trunks leading to distant offices. At the distant office each trunk leads to a selector 48 called a "group" selector, which is adapted to pick out the group of "final" selectors 49 which have access to the particular called line and find one of that group which is idle; the final extension of the circuit to the called line being accomplished by the chosen final selector.

The sending apparatus for causing the desired sequence of selecting operations is adapted to be temporarily associated with any connecting circuit in an operator's position when the listening key of that connecting circuit is actuated in answering a call. When the keys representing the office and line number of the desired line have been depressed by the operator, the sending apparatus will act in sequence upon one selector after another to which the connection is successively extended, causing each selector to automatically pick out the required route until the desired line is reached, after which the sending apparatus will be automatically disconnected from the cord circuit, leaving the connection established.

The sending apparatus in the system shown comprises a set of office keys 30, a set of number keys, and step-by-step mechanisms, called controllers and translators, adapted under the control of said keys to send out selecting impulses over leads which may be connected to any one of the operators' connecting circuits, and so to the train of selectors to which that circuit is successively extended. The selection of an office will be under the control of the office keys 30 shown in detail in Fig. 16. The pressure of the particular key which designates a given distant office is arranged to cause the operation of two controllers 31 and 32, which cause the district selector, office selector and trunk selector successively to extend the circuit from the calling line to a trunk line terminating in a group selector at such distant office. The office keys and the two office controllers 31, 32, shown in detail in Fig. 16 comprise the "office sender"; and only one such office sender is required for each operator's position, this sender being arranged to transmit its impulses over either one or the other of two independent sets of sending leads 38, 39, shown in the symbolic diagram Fig. 1.

The number keys, through the agency of "translators" 33 and 34, Fig. 14, and controllers 35 and 36, Fig. 15, govern the operations of the group selector and final selector in the distant office to which the office sender has extended the circuit.

The sequential operation of the various selectors by the sending apparatus is accomplished, briefly, as follows: A key, or combination of keys, when depressed causes a controller associated with the sender to take a corresponding definite movement or operation, and the step-by-step stop-setting mechanism of the district selector is caused to take a corresponding movement in unison therewith, as by causing each step of the controller to send out a current impulse which will give a corresponding step to said stop-setting mechanism. When the controller has reached the end of the movement predetermined by the key or keys the stop-setting mechanism of the distant selector has advanced to a corresponding extent. The controller in finishing its movement brings other sender apparatus into action, whereby, for example, an impulse may be sent out to cause the clutch to be thrown on at the selector to carry its brushes to the point which the selective stop-setting mechanism has determined, whereupon the further advance of the selector brushes, as in hunting an idle set of terminals in the selected divisions, may be controlled by leaving the clutch under control of the test brush of the selector as it advances over the terminals to be tested. While the selector is "hunting" the operation of the sending apparatus will be suspended under control of a test relay which will respond only when the selector brushes have found and made connection to an idle set of terminals.

Each selector as it is reached by the preceding selector has its own stop-setting magnets brought under the control of the sending apparatus in place of such preceding selector, so that each set of sending impulses will act only on the selector for which they are intended.

For purposes of economy, each selector is preferably arranged to have direct access to a large number of lines. While the lines of an exchange are designated by numerals of the decimal system, the actual grouping of these lines is more economical if the decimal system is not followed. For example, in the system shown, the group selectors and final selectors are five-hundred-line machines. Each set of stationary terminals on the group selector represents a final selector which can reach five hundred subscribers' lines. In an exchange office serving ten thousand lines, the final selectors may be divided into twenty groups, one group for each five hundred lines. The five hundred sets of terminals of the group selector may be divided into five zones of one hundred each, these five zones being again subdivided into four divisions of twenty-five each. Each of the twenty five final selectors represented by the terminals in any given division of the group selector will have direct access to the same five hundred subscribers' lines.

In order to extend connection from a calling line in one office to a group selector at a distant office in which the called line is located, the district selector associated with the operator's connecting circuit chooses an idle office selector 46 (shown in detail in Fig. 22) which is shown as having five sets of brushes, one set for each zone of terminals. The groups of terminals of the office selectors represent groups of automatic trunk selectors 47 (such as shown in detail in Fig. 23). The trunk lines extending to group selectors at a particular distant office are represented by multiple terminals upon a corresponding group of automatic trunk selectors. Each trunk selector is adapted automatically to test such trunk lines in rotation and make connection to the first idle one, the other trunk selectors being then locked out from that trunk line while it is in use.

In order that a group selector at a particular office may extend a connection from its incoming trunk to any one of the ten thousand lines of that exchange, selection will therefore proceed as follows: First, one of the five sets of brushes of the group selector will be chosen according to which large group of two thousand lines contains the one desired. Choice is then made of that one of the four divisions in the range of the selected set of brushes whose terminals represent the twenty five final selectors having access to the group of five hundred lines in which the desired line is located. The terminals representing these twenty five final selectors are now tested in rotation, and connection made to the first one found idle. Now having reached the required final selector, one of its five sets of brushes is first chosen to reach the required hundreds zone, and finally the selected set of brushes is moved to the terminals of the line desired.

As the grouping of lines and trunks does not follow the decimal system, it is evident that the selecting impulses transmitted by the sending apparatus cannot correspond in all cases to the digits of the number of the line wanted. The sending apparatus is therefore provided with means to "translate" the numerical indication of the keys into the desired sequence of control impulses, not necessarily following the decimal system, but adapted to the particular grouping of the apparatus to be controlled. Each number sender therefore comprises, in addition to the two controllers 35 and 36, Fig. 15, by which selecting impulses are directly transmitted, two "translators" 33 and 34, Fig. 14, which govern the operation of said controllers 35 and 36, under control themselves of the thousands and hundreds keys. The specific form of translator used in the system shown is a step-by-step mechanism which is adapted under the control of a depressed key to advance in a number of steps corresponding to the digit represented by such key. By such advance the translator selects a point on one of the controllers to determine the extent of operation of that controller; and the latter when it operates will take a number of steps corresponding, not to the numeral of the key depressed, but to the number of non-decimal divisions required to be passed in reaching the proper route to the line wanted. That is to say, the translators, while being themselves controlled by the number keys upon a decimal basis, in their operation set up a condition for causing the controllers to send out equivalent selecting impulses upon a non-decimal basis. In some cases, however, the translator in its operation may send out the "translated" impulses itself, instead of causing the controller to send them, and when the line wanted is in a manual office the translators will be caused to operate as controllers and send out decimal impulses to work the indicator.

It is not necessary that the translation should in all cases be effected by a step-by-step mechanism, as other means may be provided for translating a combination indicated by a given set of keys into an equivalent combination for governing the selecting apparatus upon another basis. Thus in some cases translation may be secured by interwiring between the keys and controllers, and this is done in the office sender. The actuation of a single key may determine not only the operation of a single controller, but the operation of a number of controllers (or successive different operations of the same controller); so that the single key may thus control a whole sequence of operations according to a predetermined plan.

In the system shown, the controllers 35 and 36, in addition to being governed indirectly by the thousands and hundreds keys, through the medium of translators 33 and 34, are also for some operations controlled directly by the tens and units keys upon a decimal basis, since the grouping of line terminals upon each of the five zones of the final selector follows the decimal system.

In each semi-mechanical exchange office, in addition to the group selectors which form the terminals of incoming trunk lines, there are "local" group selectors 40, Fig. 1, which are used when the called line belongs to the same office as the line calling. In such a case the district selector 45 may be caused to connect directly to a local trunk leading to a local group selector 40, without the necessity of extending the connection through an office selector and automatic trunk selector.

In addition to means for making the usual busy tests and giving the usual busy signals, the system shown includes means whereby if the called station is a private branch exchange having several trunks, as shown in Fig. 26, these trunks will be tested in rotation, and the busy indication will not be given unless all of the private trunks are busy. The system further includes means for automatically signaling any station on a party line, to the exclusion of the other stations, and also means for automatically notifying the operator in the case of "reverting" calls, that is, where the station called for is on the same party line with the calling station.

Selectors.

The selectors in the system shown are of the type wherein the movable switch member consists of a vertical slide rod 50 carrying brushes 51, 52, 53, Figs. 2, 3, 4 and 5, which are adapted to travel over and make contact with stationary line terminals 61, 62, 63. These line terminals may be mounted in a panel terminal board as shown in Figs. 2, 3 and 4. The brush carrier rod 50 of each selector is hung by a flexible steel ribbon 54, Fig. 2, from the carrier sheave 71 of the operating or "elevator" mechanism. By a rotary movement of the sheave the brush carrier rod may be lifted to bring its brushes into contact with any desired set of stationary terminals in their path. The contact brushes which travel over these terminals may be of any desired type. The ones shown have spring pressed arms which are adapted to pass over and make contact with the side edges of the projecting contact terminal lugs, as shown in Fig. 5. To lessen the distance through which any brush carrier is required to travel, a number of sets of brushes are mounted upon each carrier, each set of brushes being intended to move over a corresponding fraction of the whole row of terminals. In the selector shown, which is the final selector, the terminals are divided into five zones of one hundred sets each, and each brush carrier rod is provided with five sets of brushes, one set for each zone. In order, therefore, to make connection with any particular set of terminals, the selector is arranged to first choose the one of its five sets of brushes which travels over the particular zone containing the desired set of terminals, and thereupon the brush carrier rod is moved only the short distance necessary for the selected set of brushes to reach the set of terminals in question.

Figs. 6 to 13 inclusive and Fig. 25 show the operating mechanism of a final selector. The other selectors are in general the same, but do not in all cases require so complete an equipment of contacts and operating parts. The final selector has been chosen for illustration because it has in general all the parts which the others have, and additional parts peculiar to itself. When the mechanism of the final selector is understood, that of the other selectors will be clear from Figs. 21 to 24 inclusive, in which they are diagrammatically shown with their circuit connections.

The particular selector shown embodies inventions which have been made the subject matter of applications of James L. McQuarrie and Edward B. Craft, Serial No. 411,426, filed January 18th, 1908, patented Feb. 22, 1910, No. 949,836, Edward B. Craft and Amos F. Dixon, Serial No. 410,320, filed January 11th, 1908, patented Dec. 16, 1913, No. 1,081,368, and a patent, No. 918,513, issued April 20, 1909 to Amos F. Dixon; and I will describe this mechanism only so far as may be necessary in order that the system of the present invention may be understood.

The operating shaft 77, Fig. 8, which carries the switch moving sheave 71 is arranged to be rotated under control of the clutch magnet 70 by a power shaft 72, to cause the brush carrier 50, Fig. 2, to advance its brushes to the point predetermined by the electromagnetic stop-setting mechanism which responds to the selecting impulses. The clutch members, (consisting of friction plates 80, 81, Fig. 8, one of which is mounted upon the power shaft 72, and the other upon a tubular operating shaft 77 carrying the sheave 71) are adapted to be drawn into engagement by the clutch magnet 70 acting on plate 81, which is of iron. When said clutch magnet is excited, the carrier sheave will be rotated and the contact brushes advanced to a predetermined stopping point by power applied to said clutch members.

The stop-setting mechanism, as shown in Figs. 6–13, comprises two vernier controller disks 73, 74, mounted side by side, said disks having peripheral notches adapted to be engaged by a pawl 75 (Fig. 7) which is carried forward around the edges of said disk as the brush carrier moves from its normal position. This pawl 75 is carried by a disk 76 which is mounted upon the tubular shaft 77 of the carrier pulley 71 so as to rotate therewith. Said disk 76 is provided with ratchet teeth to be engaged by a retaining pawl 89 adapted to be brought into service by the holding magnet 91, Figs. 7 and 11. Side by side with the disks 73, 74, is a third disk 78 having notches around its edge so spaced that the travel of the pawl 75 from one of these notches to the next will correspond to a movement of the selector brushes from one set of stationary terminals to the next. The pawl 75 is normally held out of engagement with the notches of the disk 78 by the disks 73, 74, upon which it rides; but when it reaches a point at which the notches of said disks 73, 74, coincide, it falls in, engages the corresponding notch of disk 78, and slightly rotates said disk. This slight movement of disk 78 is caused to actuate a set of switch springs 79, Fig. 11, by which the circuit of the clutch magnet 70 may be opened. As shown in Fig. 11, the disk 78 has a lug or ear 225 which projects between two adjustable limiting stops 226, 227, between which it is permitted to have a slight movement. The actuating member for the stop-switch springs 79 is a bell-crank lever 228 one arm whereof actuates said springs while the other end projects into the path of the lug 225 on the disk 78. A spring 229 causes the bell-crank lever to push the lug 225 backward against its rearward limiting stop.

The ratchet disk 76 carrying the pawl 75 is adapted to be held by the pawl 89, Figs. 7 and 11, (brought into service when holding magnet 91 is excited) so that when the units disk 78 has been moved by pawl 75 sufficiently to actuate the clutch-release switch-springs 79, said disk 78 is retained in such advanced position by the pawl 75, whether the clutch is on or not. But if under such circumstances the vernier disk 73 is given another advance step to throw the notches under pawl 75 out of coincidence, the pawl will thereby be raised out of engagement with the teeth of disk 78, permitting the latter to return to normal position under the influence of spring 229, and to restore the contact springs 79 to normal.

The point at which the notches of disks 73 and 74 will coincide, and consequently the stopping point of the brush carrier, is determined by the relative positions of said disks, which may be adjusted by means of electro-magnetic step-by-step mechanism responsive to the selecting impulses. The disks 73 and 74 are provided with ratchets 83, 84, Figs. 8 and 9, respectively, with which the pawls 85, 85ᵃ, Fig. 13, of a stepping magnet 86, Fig. 9, are adapted to engage. The ratchet disk 83 is mounted upon the same tubular shaft 124 with the vernier disk 73; and similarly the ratchet disk 84 is mounted upon a concentric tubular shaft 125 which also carries the vernier disk 74. The disks 73, 74, and their respective ratchets are yieldingly held in their normal positions by means of springs 126, 127. Holding pawls 87, 88, Figs. 13 and 9, for the ratchet wheels 83, 84, respectively, are normally held out of engagement therewith by stop-screw 128 (Fig. 6) carried by the armature lever 129 of the holding magnet 91. When said holding magnet is excited the stop-screw is withdrawn and the holding pawls are permitted to engage their ratchets. The stepping pawl 85 is normally held out of engagement with ratchet 83 by a stop-screw carried by armature lever 129 of holding magnet 91, but is released and permitted to engage said ratchet when the holding magnet is excited. The other stepping pawl 85ᵃ is normally held out of engagement with ratchet 84 by an arm 29 of the armature lever 30 of a shift magnet 90, said pawl 85ᵃ being allowed to engage said ratchet 84 when the shift magnet is excited. If the pawl 85 alone is thrown into gear with its ratchet 83, the step magnet will advance only the vernier disk 73, the other disk 74 being unaffected; but if both stepping pawls 85 and 85ᵃ are thrown into engagement with the ratchets 83 and 84, the stepping magnet will then advance both of the vernier disks 73 and 74 together. By virtue of this construction, it is unnecessary to have separate stepping magnets for long and short steps, as the single stepping magnet 86 can act first as a "long-step" magnet, to advance the vernier disk 73, giving the tens division, and then after the operation of the shift magnet 90, said step magnet may advance both disks 73 and 74 together to give the units divisions.

The holding magnet 91 has an armature lever 129 which is adapted to bring into service the holding pawls for all the ratchets of the operating mechanism. As shown most clearly in Figs. 9, 10 and 25, the armature of the holding magnet 91 may also be arranged to operate a set of switch springs 97, and the shift magnet 90 may also operate a set of switch springs 98, Fig. 6. A third set of switch springs 99 may be controlled at the sheave or carrier-pulley 71, Fig. 7, being held in one condition by a stud 82 on said pulley when the latter is in its normal position, and allowed to shift when the pulley removes said stud in leaving its normal position. Another set of springs 812 may be controlled by the ratchet disk 83, Fig. 6, said springs being held in one position when the ratchet disk is normal, and allowed to shift when said ratchet disk leaves its normal position.

In the selector shown, the notches of disk 74 are spaced apart a distance corresponding to ten notches on the disk 78, which form, so to speak, a units scale. The notches of disk 73, on the other hand, are spaced apart a distance corresponding to only nine notches or divisions of said units disk 78. In the mechanism shown, the disks 73 and 74 normally rest so that a single independent step of disk 73 and a further step of both disks 73 and 74 together will bring the notches of all three disks into coincidence at zero or a point corresponding to the first stationary terminal No. 0 on the selector. The vernier disk 73 is always intended to take at least one independent step, which would set the point of coincidence one notch back from zero. If then the disk 73 is advanced an additional step equal to one space on the units scale, the first point at which the scales 73 and 74 coincide will be opposite the ninth notch of the units scale. Similarly, an advance of disk 73 through two steps from normal will throw the point of coincidence to the nineteenth notch of the units scale, and so on, each unit of advance of the vernier disk 73 throwing the point of coincidence a distance of ten units ahead. If it is desired to set up a coincidence at an intermediate point, between any given tens division and the next, that is accomplished by first advancing the vernier disk 73 a number of steps sufficient to reach the required bank of tens, as hereinbefore described, and then advancing both disks 73 and 74 together unit by unit, until the desired intermediate point is reached. At least one step of both disks together is always given. Thus to set the coinciding point at the thirty-fifth notch from zero on the units disk or scale, the vernier disk 73 would first be advanced four steps (that is, three steps from zero) throwing the point of coincidence to the twenty-ninth notch from zero on the units disk, and then both disks 73 and 74 would be stepped ahead together a distance of six units, and the notches of the three disks would then coincide at the thirty-fifth notch from zero on the units scale, and no coincidence would occur in advance of that point. By this mechanism a stopping point may thus be established at a point far distant from the zero position, by relatively slight movements of the disks 73 and 74.

The operation of the mechanism will in general be as follows: The holding magnet 91 will first be energized to attract its armature, allowing the pawl 85 of the stepping magnet to engage the ratchet 83, and also bringing into service the holding pawls 87 and 88 of ratchets 83 and 84 and holding pawl 89 of the ratchet disk 76 which rotates with the carrier pulley or sheave 71. The step magnet may now, through the agency of the ratchet 83, advance the vernier disk 73 the required number of steps to bring the point of coincidence of the notches on disks 73, 74, in the required bank of tens or long divisions of the scale. The shift magnet 90 will then be operated to bring the stepping pawl 85ª into engagement with ratchet 84, whereupon further actuation of the stepping magnet will advance both disks 73, 74, together the required number of steps to reach the intermediate point or "units place" desired, on the scale. The stop being thus set, the clutch magnet 70 is then excited, whereby the constantly-rotating shaft 72 is coupled to drive the carrier pulley 71 and raise the brush carrier rod, at the same time advancing the pawl 75, carried by disk 76, around the periphery of the disks 73, 74 and 78. When this pawl 75 reaches the predetermined point at which the notches in the three disks coincide, it drops in and moves disk 78 sufficiently to operate the stopping switch 79, which is arranged to open the circuit of the magnetic clutch. The traveling brushes of the selector have thus been moved to the required point and stopped. If a further movement of the brushes is desired, as in hunting for an idle terminal, the stepping magnet may be given a stroke to advance the disk 73 and throw the notches now under the pawl 75 out of coincidence, whereupon the clutch will be thrown on again by the recovery of switch 79, and the carrier sheave will be rotated to continue the travel of the selector brushes until they reach an idle set of terminals, whereupon the clutch magnet may be finally deënergized; the mechanism being held against return to normal by the holding pawls controlled by the holding magnet 91.

When the holding magnet 91 is deënergized, its armature in recovering will withdraw the various holding pawls from their ratchets, and allow the whole mechanism to return to normal position.

It will be understood that any desired spacing of the notches on the vernier wheels may be adopted according to the units of travel which each advance step of the vernier wheel is adapted to represent. Thus in the group selector (Fig. 24) each step of the vernier wheel instead of representing ten units represents twenty-five units, the notches of disk 774 being spaced a distance apart equal to twenty-five notches on the units disk, while the vernier 773 has its notches spaced apart a distance equal to twenty-four of such units notches.

In the district selector, office selector and group selector, it is only necessary that the selecting impulses shall determine the general division of terminals to which the traveling brushes shall be advanced and in which they will hunt for an idle terminal so that no "units steps" need be taken by the vernier wheels. In these selectors therefore only one vernier disk 73 will be rotated by the step magnet to determine "long steps" only. The other vernier disk 74 in these selectors will take the place of the units disk 78, in that it will carry the lug or ear 225 which operates the clutch release switch 79; and therefore only the two vernier disks 73 and 74 will be required, the units disk being omitted. In the diagram (Figs. 21, 22 and 24) that one of the vernier disks which operates the clutch release switch is shown in the same relative position that disk 78 occupies in the final selector.

Detailed operation of system.

The character of the circuits and apparatus employed in the system shown will sufficiently appear in tracing upon the diagram, Figs. 14-26, the successive steps in the operation, without a preliminary enumeration of the various parts and their electrical connections. Known types of apparatus are designated by the usual conventional symbols.

*Automatic seizure of idle sender.*—When a subscriber at one station (as 41, Fig. 20) desires communication with another station (as 42, Fig. 26) he will signal the central office (Fig. 20) in the usual manner by removing his telephone from its hook, which will result in the lighting of the line signal lamp 416. The central office operator responds to the call in the usual way by inserting her answering plug 400 in the answering jack 163 of the calling line; and by actuating listening key 431 associated with the circuit of the answering plug her telephone set 417 will be brought into connection with that of the calling subscriber, who will then be enabled to give his order to the operator.

Upon inserting the answering plug, the district selector (Fig. 21) is placed in condition to respond to selecting impulses, and this is accomplished by energizing the holding magnet 491 and relay 408, the circuit for these being completed by the operation of relay 409 (Fig. 20) which places a ground on the ground feed wire 424. The connecting supervisory lamp also lights.

When the operator throws the listening key, the two main conductors 461 and 462 leading to the district selector are disconnected from the cord circuit and connected with leads to the sending apparatus shown on Figs. 16 to 19 inclusive. This seizure of a sending apparatus by the cord circuit is accomplished through the operation of relays 405 and 406.

Upon connection of the ground feed wire 424 to ground, a circuit is completed from battery 421 at the district selector, through holding magnet 491, winding 455 of relay 408, conductor 422, supervisory lamp 423, to the ground feed wire 424, thence through back contact of a relay 404 and a normal contact 425 associated with the operator's listening key 431 to the front contact of relay 409, over wire 426, through a normal contact held by the carrier sheave 471 of the district selector to ground at 427. The holding magnet 491, in attracting its armature, allows the holding pawls 487 and 489 to engage their respective ratchets, thus bringing the district selector into operative condition; and said holding magnet 491 also actuates a set of switch springs shown in association therewith, which shift in the direction of the arrow. Among other functions, one pair of these switch springs connects the battery 421 to the local battery feed 444 of the district selector, and a contact 435 is also closed in multiple with the contact 427. When the contact 427 is opened by the rotation of the carrier sheave, if the plug 400 is removed from the jack, the holding magnet 491 is released, and cannot again be energized until the selector is completely restored to normal.

Unless both senders are in use, the lead 15 of the subsidiary sender will have a ground connection thereon at a back contact of relay 135 or relay 103 (Fig. 19) so that lead 15 on Fig. 20 will be a ground lead. The actuation of the operator's listening key will, at special contact 428 thereof, complete a circuit through relay 405 which may be traced from battery 430 through one winding of relay 405, contact 428, through a pair of contacts normally closed by the carrier sheave 471 of the district selector (Fig. 21) to the ground lead 15, Fig. 20. Relay 405, in attracting its armatures, connects the main line wires 461 and 462 of the district selector to two armatures of a transfer relay 406 which will connect said line wires either to the leads 1 and 2 respectively of the primary sender, or to the leads 11 and 12 respectively, of the subsidiary sender, according to which of these senders is free. If the primary sender has already been taken for use by some other cord circuit, there will be battery connected to the lead 4. One winding of the transfer relay 406 of each cord circuit is connected in a branch to ground from the lead 4, through normally closed contacts of its district selector and back contact of relay 405. If, therefore, the primary sender is already in use, the transfer relay 406 will be excited, and when relay 405 is energized, the leads 461 and 462 would, therefore, be connected through front contacts of the relay 406, to the leads 11 and 12 of the subsidiary sender. Relay 406 in attracting its armatures would close a locking circuit for itself from the lead 13, through a front contact of relay 405, to the ground feed 424. Relay 405, when once excited, completes a locking circuit for itself from either lead 3 or lead 13 (according as relay 406 is normal or excited) and through a front contact of relay 405 to the ground feed; this contact serving both relays 405 and 406 for locking purposes. When relay 405 is excited, it breaks the path from battery feed 4 to relay 406; so that unless said transfer relay 406 is excited at the time 405 attracts its armatures, it cannot operate during the use of the primary sender by that cord circuit. Assuming, however, that the primary sender is free when relay 405 is excited, relay 338 of the sending apparatus (Fig. 19) will be energized by current from the negative pole of battery 340 (the positive pole whereof is grounded) flowing through back contact of a relay 337, winding of relay 338, conductor 3, normally-closed contact of relay 406, through winding of relay 405 and its front contact to the ground feed wire 424. This circuit maintains relay 405 excited during the operation of the sending apparatus. Relay 338 in attracting its armatures, will also connect the lead 4 of the sender to the free negative pole of said grounded battery 340. This battery on the lead 4 will cause the transfer relays 406 of all the cord circuits of that operator's position (except the one just taken for use) to become excited, thus locking out all these other cord circuits from the primary sender, and transferring them to the subsidiary sender; so that if any one of the remaining cord circuits is taken for use before the primary sender has finished its work, it will seize the subsidiary sender; after which the other cord circuits will be locked out from both senders until one or the other becomes free.

When the primary sender is taken for use, the connection of the battery to feed wire 4 results in the immediate operation of several relays associated with the number sender and office sender, these relays being intended to be released at subsequent steps in the operation to perform various switching functions.

The relays of the office sender which are thus initially excited when the sender is first taken for use are the following: (Fig. 16) 202, 204, 209; (Fig. 17) relays 210, 211 and 213 of the transfer mechanism; (Fig. 18) relays 317, 319, 323; and (Fig. 19) relays 326, 328, 332, 334 and 135. Relay 135, which is of the slow-approach type, draws up its armature a moment after battery is applied to the sender feed 4, and in so doing applies battery 340 to the subsidiary feed-wires 109 and 120, and also completes a circuit to ground for relay 336, whereby said relay is also excited.

For convenience in tracing the various steps in the operation of the system, all the relays of the office sender, the transfer mechanism, and the number sender which are thus initially excited when the sender is taken for use are designated on the diagram by an asterisk (*).

*Control of sender by keys.*—The office keys 30 (Fig. 16) govern the selection of a trunk line leading to a required distant office through the medium of controllers 31 and 32 of the office sender acting over leads 101 and 102 which are now extended through primary sender leads 1 and 2 to conductors 461 and 462 on Fig. 20, and thence to the district selector. Said keys are arranged to ground points on said controllers and also by means of a set of master contacts to control a starting relay which starts said controllers in operation.

On Fig. 16 a few office keys are shown wired to the controllers 31 and 32. The wiring of the keys for the different offices will, of course, be distinctive. In Fig. 16 key 231 represents a local office, key 232 a semi-mechanical office, and key 235 a manual office. The thousands and hundreds keys 114 and 115, and the locking relays of the primary sender corresponding thereto are indicated on Fig. 14, and the tens and units keys 116 and 117 on Fig. 15, together with a set of stations keys 118 for use in calling stations on party lines in manual offices. In calling a line in a semi-automatic office, the thousands, hundreds, tens and units keys would be used, and in addition thereto, the first key 119 of the stations keys would always be depressed unless some party line station were called, in which case one of the other stations keys would be depressed. Each station on a party line in the semi-mechanical office would be represented by a different number, there being terminals on the final selector representing each station of the party line, as shown in Fig. 26.

Each number key when actuated serves to complete an energizing circuit for a corresponding relay 313 of the sender which has been taken for use, the relay which is energized being then locked up from the battery feed of that sender. The various relays operated by the number keys serve to ground points of translators 33 and 34 and controllers 35 and 36. Each digit key when actuated, besides operating a corresponding relay, also completes a circuit for a relay common to that group of digit keys, that is to say, relay 301 is common to the thousands keys, relay 302 to the hundreds keys, relay 303 to the tens keys, relay 304 to the units keys and relay 305 to the stations keys. Each of relays 301 to 305 inclusive closes a break in a circuit 312 which includes a transfer relay 306 (Fig. 14) which controls the connection of the battery wire 14 of the subsidiary sender to the key-relays for that sender. (The subsidiary sender being a duplicate of the primary sender is not shown). The object of circuit 312 is to prevent the subsidiary sender from being started until a thousands relay 313, a hundreds relay 313, a tens relay 313, a units relay 313 and a stations relay 313 of the primary sender have been actuated. When this has been done all the relays 301 to 305 inclusive will be excited, thus completing a circuit for the transfer relay 306, which will thereupon connect the battery feed wire 14 of the subsidiary sender to the feed wire of the number keys, making the subsidiary sender then available for use in connection with some other cord circuit before the primary sender has finished its work. It will thus be seen that as the number of the called line is written down upon the number keys, that number is stored up, so to speak, on the locking relays 313 of the primary sender; and then when one key of each digit and a stations key have been depressed, the transfer relay 306 makes the set of keys available for use with the subsidiary sender. When both senders are in use, a guard lamp 237 (Fig. 16) is lighted, as will hereinafter be explained, and when this warning light is shown the operator will not attempt to use the number keys until it disappears. It should be noted that when, for example, one of the thousands keys is actuated and the relay 301 common to all the thousands keys is excited, said relay 301, besides completing a circuit for the locking windings of the individual relays 313 of the thousands keys, cuts off from those keys the battery feed of the primary sender, so that if said keys are then used in connection with the subsidiary sender while the primary sender is still in use, none of the locking relays 313 of the primary sender will be disturbed. A similar provision is made for the hundreds, tens, units and stations keys. It will be noted that the locking windings of all the locking relays 313 associated with the thousands keys are connected in series in a single circuit controlled by the relay 301 common to said keys. Each relay of the set which has locking windings in series in the same circuit is adjusted so that its armature will not be drawn up by the energization of the locking winding alone, but if already drawn up will be held by such locking winding. Only the relay which has been energized by the depression of the corresponding key will have its armature drawn up, even though the locking windings of all the relays of that set receive current. A similar provision is made for the relays of the hundreds, tens, units and stations keys.

A set of contacts 297 (Fig. 16) is arranged to be actuated when any one of the office keys is depressed, these contacts being for the purpose of closing a circuit through the starter relay 205 which will start the operation of the office controller 31; and said contacts are also utilized to control the circuit of the guard lamp 236, which, when lighted, will indicate that the office sender is in use. The office keys are arranged to lock in their depressed position under the control of a restoring magnet 230, which will receive current from battery 238 at the end of the operation of the office controllers to restore said keys.

*Selecting a line in a semi-mechanical office.*—Assume that the operator presses the office key 232, (designating a semi-mechanical office) and also depresses number keys 114, 115, 116 and 117, representing the number 9732, and the first or "red" stations key 119, which is always depressed unless some special station is wanted, in order to secure uniformity of operation.

The pressure of the office key will result in the following operations, hereinafter to be described in detail. A guard lamp 236 will be lighted to show that the office sender is in use. Controller 31 will be started by the starter relay 205 and will intermittently apply ground to the office sender lead 102 to cause the step magnet of the district selector to take a predetermined number of steps, after which controller 31 will be stopped when the outer brush on its rotary arm reaches a point grounded by the depressed key. Relays 201 and 202 will then coöperate to send an impulse of battery current over the sender lead 101 to operate the clutch relay 407 of the district selector, whereupon the district selector will first move its brushes to the point predetermined by its step magnet and will then begin its hunt for an idle office selector. When the latter is found it will complete a circuit for a test relay 203 of the office controller over the sender leads 101 and 1 to ground through the brush chooser step magnet 594 of the office selector, which will associate the brush chooser arm with the first set of brushes. The operation of said test relay 203 at the office controller will then bring the controller 32 into operation, which will send pulsations of current over the sender leads 101 and 1 to cause the brush-choosing magnet 594 of the office selector to take a predetermined number of steps. Controller 32 will then be stopped when a circuit for its cut-off relay 206 is completed by the brush of said controller reaching the point grounded by the office key. Then controller 31 will again be operated, and will intermittently apply ground to sender lead 102 which will cause the step magnet 586 of the office selector to take a predetermined number of steps. Then, as the inner brush of the controller 31 reaches the point grounded by the office key, a cut-off relay 208 of the office sender will be excited to stop the operation of said controller. Thereupon relays 208 and 209 will coöperate to send an impulse of current over lead 101 to operate the clutch relay 507 of the office selector, which will cause said selector to first move its brushes to the point predetermined by the step magnet and then begin its hunt for an idle trunk selector. The office selector, having found an idle trunk selector, will, by applying current to the wire 663 of the trunk selector, which has been secured, cause said trunk selector to begin its automatic operation to hunt for an idle trunk leading to the office designated by the depressed key, and terminating at such office in a group selector. The above sequence of operations having all resulted from the depression of the office key, and a trunk line to the desired office having been obtained, the office sender, comprising the office keys and controllers 31 and 32, will be automatically disconnected from the primary sender, and made available for use with the subsidiary sender if another call is to be made over another cord circuit before the primary sender has finished its work.

*Detailed operation of office sender.*—I will first describe more in detail the sequence of operations resulting from the depression of the office key. All of the keys of the office sender have connection to a common lead 240, which is connected through the normal contacts 284 and 239 of the stepping magnets of controllers 31 and 32 respectively, to the grounded or return pole of the battery. Each of the office keys when depressed is adapted to connect this ground lead 240 to one or more of the contacts of controllers 31 and 32. Key 232 when depressed will connect said ground lead to the second contact (No. 1) in the outer row of contacts of controller 31, and also to the first contact (No. 0) in the inner row on said controller 31, and to the first contact (No. 0) on controller 32. This combination determines the exchange that may be selected by the depression of key 232; that is, it determines the number of steps the controllers 31 and 32 may take, and therefore the number of impulses to be delivered to the step magnets of the district selector and office selectors. The set of contacts 297 common to all the keys will be actuated, at the same time completing circuit from the office battery feed 104 through the guard lamp 236 to ground, and also through wire 241, contact 243 closed by the office controller 31 when in its normal position, thence through a normal contact of relay 201, starter relay 205, to a contact of the pulsator 242, and through the vibrating arm of said pulsator to ground. Said pulsator is kept continuously in vibration by any well known means. The starter relay 205 upon receiving current through the path just traced attracts its armature, which completes a locking circuit to ground to maintain said starter relay excited independent of the pulsator 242, and also completes a circut from the alternate contact of said pulsator through a back contact of relay 201, and through the step magnet 252 and holding magnet 251 of the controller 31, to the free pole of grounded battery 254. Said controller magnets thus receive pulsating current (due to the intermittent closing of the circuit by said pulsator 242) and the step magnet in respose thereto advances the controller arm over the stationary terminals in its path. The starter relay insures an accurate start at the beginning of a pulsation of current, because the stepping circuit is closed by relay 205 when the vibrating arm of the pulsator is away from the contact controlling said stepping circuit. That is to say, the stepping circuit is not completed to the pulsator until said pulsator first completes at its alternate contact a circuit for the starter relay, after which the next swing of the pulsator will apply a full pulsation to said stepping circuit.

The holding magnets 251 and 261, respectively, of the controllers are shunted by non-inductive resistances to make them slower to release their armatures, so that although they receive pulsating rather than steady current, yet they will hold their armatures steadily attracted to keep the holding pawls in continuous engagement with the ratchet wheel as long as the stepping circuit is completed through the pulsator. The steady attraction of their armatures also maintains the circuit of the starter relay. The step magnets 252 and 262, respectively, on the other hand, respond to each pulsation of current. The holding magnets attract their armatures as quickly as do the step magnets, the effect of the shunt being merely to make said holding magnets sluggish in releasing their armatures. The armature of the holding magnet of controller 31 closes a normally-open contact in shunt of the contacts 243, which last mentioned contact open an instant later as the rotary arm leaves its normal position. Said contact 243 is for the purpose of insuring that the controller arm shall be in its zero position before the starter relay can be excited by the depression of an office key.

The step-by-step mechanism of the controllers 31, 32, 35 and 36, and translators 33 and 34 may be in general similar to that of the automatic selectors shown in my prior Patent No. 826,310 of July 17, 1906.

The rotary arm of controller 31 is stepped around at each stroke of the step magnet 252. The contact springs operated by said step magnet connect the lead 102 (which is connected to the primary sender lead 2) to ground at 253. This intermittently completes a circuit for the step magnet 486 of the district selector, which is connected from battery feed 444 through a contact normally closed by the stud 492 of the carrier sheave to the wire 462, thence through contacts of relays 405 and 406 to the main sender lead 2 and office sender lead 102 to ground 253. The step magnet 486 is thus caused to advance the ratchet 483 carrying vernier disk 473 a number of steps, one for each stroke of the step magnet 252 of the controller 31.

When the outer brush of the rotary arm of controller 31 reaches the point grounded by the depressed key (in this case the second point (No. 1) in the outer row of terminals) a circuit will be complpeted for the cut-off relay 201, which may be traced from the battery feed 104 at point 245, through the winding of relay 201, normal contacts of said relay, outer brush of the controller arm, point No. 1 of the stationary contacts of said controller, through the contacts of key 232 to the ground lead 240, thence through a contact 284 closed by the armature of the step magnet 252 when in its normal position, and through contact 239 of controller 32 to ground. The contact 284 of controller 31 is introduced into the circuit of the ground lead 240 just traced, in order to insure that the last pulsation sent out by the step magnet shall be a complete one, and shall not be prematurely cut off the very instant the brush of the controller arm reaches the grounded point. Contact 284 insures that after the brush reaches the point connected to the ground lead 240, the armature of the step magnet 252 must return to its normal position before the circuit of the ground lead will be completed to ground and permit the operation of the cut-off relay 201. The step magnet of controller 32 is also adapted at each step to break the circuit of the ground lead at contact 239 for a similar purpose, when that controller is operated.

When circuit is completed for the cut-off relay 201 by the outer brush on controller 31 reaching a grounded point, said relay will break the circuit previously traced through the operating magnets of controller 31, and will also break the circuit of the starter relay 205, shifting said starter relay to the control of a relay 204 which is in turn under control of a test relay 203. Said relay 201 will also complete a locking circuit from the battery feed through its own winding to ground, and will open the circuit of slow release relay 202. One armature of said relay 202 is connected to the sender lead 101, and during the momentary interval after relay 201 has drawn up its armatures, and before the armature of relay 202 has left its front contact 255, an impulse of current will flow from the battery feed wire 104, through the front contact of relay 201, contact 255 of relay 202, sender leads 101 and 1, lead 461 of the district selector, through the contact 432 normally closed by the carrier sheave 471 of said district selector, through one winding of the clutch relay 407, and thence to the ground lead 424. The momentary impulse of current sent over the circuit just traced is for the purpose of energizing the clutch relay 407.

The clutch relay 407 in drawing up its armature completes a circuit for the clutch magnet 470 over a path which may be traced from battery feed wire 444 through said clutch magnet 470, thence through a winding 454 of relay 408 (which relay was excited at the same time as the holding magnet) thence through wire 445 to the middle spring of the stopping switch 479, through the normal contact thereof, to wire 446, through a locking winding 448 of relay 407 and thence through a front contact 449 of said relay to the ground lead 424. This circuit maintains relays 407 and 408 and clutch magnet 470 excited, and causes said clutch magnet to mechanically couple the constantly rotating shaft 472 to the wheel 476 to drive the carrier sheave 471. The brush carrier 450 of the selector is thus raised by the rotation of the sheave 471, trailing the brushes 451, 452 and 453 over the set of stationary terminals leading to office selectors. During this movement, however, the line brushes 451 and 452 of the district selector are dead, the circuit thereof being opened at back contacts of the relay 407. The first movement of the sheave 471 shifts the set of contact springs controlled thereby, in the direction of the arrow. As said sheave is rotated, the pawl 475 is carried around the edge of the vernier disks 473, 474, until a point is reached at which the notches of said disks coincide, whereupon said pawl 475 falls into the coincident notches, and in doing so rotates said disks sufficiently to actuate the stopping switch springs 479. This occurs at the point predetermined by the setting of the vernier disks.

The operation of the stopping switch 479 breaks the circuit previously traced through the clutch magnet 470, but first establishes a circuit from the battery feed wire 444 through a resistance to the alternate contact of said switch 479 and thence over wire 446 through winding 448 of relay 407, and through the front contact 449 of said relay to the ground feed wire. This circuit, it will be noted, excludes both the clutch magnet 470 and the winding 454 of relay 408. The other winding 455 of said relay 408 is now short-circuited by one of the off-normal contacts of the sheave 471, so that said relay 408 allows its armatures to fall back, short-circuiting its own winding 454 and also short-circuiting the winding 448 of relay 407, the intention being that relay 407 shall now be controlled by a test circuit from the third brush 453 of the district selector, through a front contact of said relay 407, through a winding of said relay to the ground feed 424. The relay 408 is constructed, however, to release its armature slowly in order to give the brush carrier rod 450 time to drop back into place after the slight toss that occurs when the power is suddenly shut off by the release of the clutch magnet. During the interval of toss the relay 407 is held up by the circuit established by the springs 479 when the pawl 475 falls into the coinciding notches of the vernier disks. A similar provision will be found in the circuits of the other selectors. If now, when relay 408 has recovered, there is no busy test potential applied to the test brush 453, relay 407 will also allow its armatures to fall back, establishing the circuit of the line wires 461, 462, through to the brushes 451, 452, and thence to the terminals 561, 562, leading to an office selector; the test brush 453 being also connected through a back contact of said relay 407 with the battery feed wire 444, to apply a test potential to all the multiple terminals of the trunk line which the selector has reached.

The brushes of the selectors are arranged so that in passing over the stationary terminals before a brush breaks contact with one terminal it makes contact with the one next ahead. If, however, when the brush of the district selector arrived at the predetermined point, the line so reached was busy, a test potential would exist on the third contact 563 of such line, and current would, therefore, flow by way of brush 453 through a front contact and one winding of relay 407 to the ground lead, which would maintain said relay excited for the purpose of again energizing the clutch 470 to continue the travel of the selector brushes in a hunt for an idle terminal. But before the selector can continue its travel, the pawl 475 must be disengaged from the notches of the vernier disks to permit further advance of said pawl around their edges, and also to permit the disk 474 to restore the switch 479 to normal position. This is accomplished by giving the vernier disks 473 another step to throw the notches out of coincidence at the point where the pawl lies. A circuit is therefore completed for the step magnet 486 when the relay 408 recovers. This circuit may be traced from the battery feed 444 through the step magnet 486 and an alternate contact of the sheave-springs, contact 456 of relay 408, contact 449 of relay 407, to the ground lead 424. The vernier disk 473 is thus given a step which destroys the previous coincidence of the notches and raises the pawl 475, allowing disk 474 to recover and to restore the stop-switch 479. This switch now closes a new circuit for the clutch magnet 470 which may be traced from the battery feed wire 444, clutch magnet 470, back contact of relay 408, wire 445, normal contact of stop-switch 479, wire 446, back contact 457 of relay 408, front contact 449 of relay 407 to the ground lead 424. It will be noted that this circuit excludes the locking windings of both relays 407 and 408. When the clutch magnet is again energized by current flowing in the circuit just traced, the slector continues to advance the movable brush until an idle trunk is reached, which will have no test potential on the terminal 563 thereof. Relay 407 thereupon releases its armature, which results in the breaking of the clutch magnet circuit at the front contact 449. The district selector has now secured connection with an office selector (Fig. 22) and the district selector test brush 453, upon connecting battery with the test wire of the office selector, operates the office selector holding magnet 591, which in supplying battery to its feed wire 544 operates the slow-release relay 508, the circuit being completed through contacts closed by the sheave 571 when in its normal position. This relay 508 has the same mode of operation as that of relay 408 of the district selector. Each of the selectors has such a slow-release relay associated with it for the same purpose. The circuit by which the holding magnet 591 of the office selector is energized may be traced from battery on the third or test terminal 563 of the district selector through the conductor 511, holding magnet 591, contact 509 closed by the rotary arm of the brush chooser in its normal position, and thence by way of normal contact 510 closed by the carrier sheave to earth.

When the district selector has found an idle office selector, the relay 407 completes, in establishing the circuit of line wire 461, a circuit for the test relay 203 of the office sender (Fig. 16) which has been waiting on the line, the operation of the test relay being for the purpose of starting controller 32, to send out impulses for the operation of the brush-choosing magnet 594 of the office selector. The circuit for the test relay 203 may be traced from the battery lead 244 of the office sender (Fig. 16) through master contacts 297 to conductor 241, back contact 270 of relay 206, thence through the winding of the test relay 203, normal contact 256 of the holding magnet 261 of controller 32, wire 259, back contact of relay 202, to the sender lead 101, thence by way of the primary sender lead 1 and contacts of relays 406 and 405 to wire 461 of the district selector, through an alternate contact operated by the holding magnet 491, thence to the brush 451 and over wire 561 of the office selector, through back contact of relay 507 to wire 564 and through a normal contact operated by the sheave 571 of the office selector, to the middle spring 512 of a set of springs which will be operated by the step magnet of the office selector in making its initial step, and through the normal contact of said spring 512 to the brush-chooser step magnet 594 and thence to ground. Current flowing over this circuit operates the stepping magnet of the brush chooser. The purpose of the circuit just traced is to operate the test relay 203 at the office sender. When said test relay 203 operates, it cuts off the slow-release relay 204, which in recovering establishes a circuit from the battery lead 244 through contacts 297, wire 241, back contact of relay 204, wire 260, normal contact 286 of relay 206, wire 262, through a front contact of relay 201, and through the starter relay 205 and pulsator 242 to earth. The starter relay 205 is thus operated and locks up through its own front contact to ground. The starter relay 205 now connects the pulsator 242 in the circuit of the operation magnets of controller 32. This circuit may be traced from the battery 267 associated with said controller 32, through the holding magnet 261 and stepping magnet 262 of said controller, wire 265, back contact 290 of relay 206, back contact 264 to relay 208, wire 134, front contact of relay 201, front contact of starter relay 205 to the pulsator, and thence to ground. The controller 32 operates in the same manner as controller 31, and at each step of the step magnet 262 it applies current from the free pole of battery 268 to the sender lead 101, and thence over the circuit previously traced through the brush-choosing magnet 594 of the office selector to ground, operating this brush-choosing magnet a definite number of times, as predetermined by the depressed key, to choose one of the five sets of brushes on the office selector. In the case we have assumed, the key 232 will have grounded the first point on controller 32 so that only one impulse of current will be sent thereby through said brush-choosing magnet 594. The brush choosing magnet 594 will not cause the arm of the brush-choosing mechanism to move upon the first step of controller 32 due to the fact that magnet 594 is energized when this controller takes the first step, through the test relay 203, and there is not sufficient interval in the interrupting of current flow on sender lead 101 to cause the magnet 594 to fall back and permit the stepping pawl to reëngage the ratchet. This impulse will not therefore advance the rotary arm of the brush-chooser one more step in addition to the step before mentioned, and the wires 561 and 562 (under the control of relay 507) will be connected to the first set of terminals on the brush chooser, and thence to the first set of brushes 551 and 552 on the main carrier rod of the office selector.

When the brush of controller 32 reaches the grounded point in its path, in this case the first one, it will complete a circuit for the cut-off relay 206, from the battery feed 104 to the grounded point of controller 32 and thence to the ground lead 240 which has been connected with said point by the key 232. Said cut-off relay 206 therefore operates and breaks the starting and stepping circuit previously traced, at the contacts 286 and 290, respectively, and also locks itself up from the battery feed 104. When the holding magnet 261 of controller 32 operated, it applied battery to the starter relay by means of contact 269, before opening at contact 156 the circuit of the test relay. When cut-off relay 206 operates, it introduces another break in the circuit of the test relay at back contact 270 to prevent its operation when controller 32 returns to normal. Relay 206 completes a locking circuit through its own winding and through relay 207, which latter completes a circuit for the starter relay 205 from battery feed 244, contacts 297, wire 241, contact 243 of controller 31, front contact of relay 207, wire 131, wire 262, front contact of relay 201, starter relay 205 to earth at the pulsator 242. Relay 207 also applies battery from feed 104 to the conductor 132 which extends through cut-off relay 208 to the inner brush of controller 31.

The stepping circuit for controller 31 is now traced from battery 254 through the holding and stepping magnets 251 and 252, respectively, to wire 133, front contact of relay 206, back contact 264 of cut-off relay 208, wire 134, front contacts of relays 201 and 205 to the pulsator. The controller 31 therefore takes a step and momentarily completes a circuit from ground 253 over lead 102 to the office selector, where the path may be traced over wire 562, through the normal contacts 513 closed by the carrier sheave 571 of the office selector in its normal position, thence through the step magnet 586 to the battery feed wire 544.

The step magnet 586 at its first movement steps the vernier wheel 573 ahead one step, which opens the normal contact of spring 512 and closes an alternate contact whereby the connection of the line wire 561 is shifted from the brush chooser step magnet 594 to the relay 507, thus preparing for the final impulse which will presently be sent over conductor 561 to operate relay 507 to throw on the clutch and start the movement of the selector. This final impulse is sent out by relays 208 and 209 in the same way that relays 201 and 202 coöperated. That is to say, when the inner brush of controller 31 reaches the point grounded by the depressed office key it completes a circuit for the cut-off relay 208, which locks up. When the relay 208 is excited, besides breaking the stepping circuit of the controller 31, it breaks the circuit of the slow-release relay 209, and at the same time applies current through its front contact to the front contact of said slow-release relay. During the short interval before this relay 209 releases its armature, therefore, current will be sent out from the feed 104 to the lead 101, and thence over the main circuit to wire 561 of the office selector, through the back contact of relay 507, through the normal contacts closed by the sheave 571, to the middle spring 512 of the set which was operated when the step magnet gave the vernier wheel its initial step, and thence through the alternate contact of said spring 512 and through a winding of relay 507 to earth. From this point up to the moment when the office selector finds an idle set of terminals leading to a trunk selector, the operation of the circuit is the same as already described for the district selector, and need not be repeated.

When the office selector secures connection to the trunk selector (Fig. 23) battery is applied from feed wire 544 through back contact of relay 507 and test brush 553 of the chosen set of brushes to the test wire 663 at the trunk selector, and current flows over said wire 663 through normal contact of the spring 603 of the holding magnet 691, contacts 604 and 605 closed by the sheave 671 of the trunk selector in its normal position, thence through the holding magnet 691 of said trunk selector to ground. When the holding magnet 691 operates, it closes a contact which connects it directly to the third or test wire 663 of the office selector independent of the contacts 603, 604 and 605 previously mentioned. Before the normal contact of springs 603 is broken, relays 602 and 601 are both operated by current from the wire 663. The operation of relay 602 closes contact 606, completing a circuit from battery 607 through the clutch magnet 670, and starts the brush carrier rod 650 of the selector on its upward hunt for an idle trunk line leading to a group selector at the desired distant office. If the first and succeeding terminals are busy, the test brush 653 will find battery thereon, which, by means of front contact of armature 608 of relay 602 will maintain the excitation of relays 602 and 601, although contacts 604 and 605 have been opened by the sheave 671 when it left its normal position. Battery will be supplied to relay 602 from the test terminal of the first trunk line (if busy) before contacts 604 and 605 are opened. When the brushes arrive at the terminals of a trunk line which is not in use, the brushes will find no test potential on the terminal, and relays 602 and 601 will recover. Relay 602 releases very promptly, and in so doing disconnects the clutch magnet and stops the advance of the brush carrier. It also disconnects the test brush 653 from its previous circuit, and connects it instead through the alternate contact of the spring 603 to the wire 663, which receives battery from the office selector feed wire, thus placing a test potential on the test wire of the selected trunk. Relay 601 is constructed so as to release very slowly, for the purpose of keeping the circuit of the main line wires leading to brushes 651 and 652 open until the carrier rod has settled down in place after the toss that occurred when the power is shut off.

When the operation of the office selector has been completed, the sending apparatus controlled by the office keys (Fig. 16) has finished its work as part of the primary sender, and may be transferred to the subsidiary sender, as will hereinafter be described; its last function with the primary sender being to establish a condition which will permit translators 33 and 34 (Fig. 14) to start, under control of the thousands and hundreds keys. This is accomplished as follows: When the cut-off relay 208 is operated as a result of the inner brush of controller 31 finding the terminal grounded by the depressed key 232, relay 209 is released, and the latter, in recovering, completes a path 285 from a back contact of relay 202 to earth, shunting the relays 210 and 213 (Fig. 17). Relay 213 is constructed to release its armatures slowly, whereas relay 210 recovers quickly, so that a circuit is momentarily completed for the restoring magnet 230 of the office keys, said circuit being traced from the free pole of grounded battery 238, through the winding of magnet 230, wire 271, back contact of relay 210, and front contact of relay 213 to earth. Magnet 230 in attracting its armature releases the depressed office key, and allows it to return to normal position. When relay 213 closes its back contact, it completes a circuit for relay 214, which relay permits the starting of the translators under control of the number keys and also governs the transfer mechanism by which the sending apparatus controlled by the office keys may be switched to the leads of the subsidiary sender. The circuit for relay 214 is completed from the battery feed wire 120 of the primary sender through the winding of relay 214 and through a normal contact of said relay and a normal contact of relay 212 over wire 272 to ground at the back contact of relay 213. Relay 214 at a front contact completes a locking circuit from the battery feed 120 through its own winding to earth, independent of the energizing circuit previously traced.

*Starting the number sender, and outline of its operation.*—The number sender consisting of translators 33 and 34 (Fig. 14) and controllers 35 and 36 (Fig. 15) is brought into action when relay 214 is excited at the end of the operation of the office sender. Relay 214 applies ground to a lead 273 of the number sender and also closes a normal break in a circuit 275 by which the test relay 318 (Fig. 18) is made ready to respond when an idle group selector shall have been secured by the automatic trunk selector. The excitation of the test relay 318 results indirectly in the operation of two starting relays 351 and 352 which in turn will bring translators 33 and 34 into action. As shown, the translators each have three rows of contacts and three corresponding brushes. The outer brush on the rotary arm of each translator is connected to a corresponding cut-off relay, for stopping the operation when such brush shall reach a grounded terminal, the stationary terminals in the outer row on translators 33 and 34 being arranged to be grounded by the locking relays of the thousands and hundreds keys, respectively (Fig. 14). The armatures of the relays associated with the thousands keys are connected to a common ground wire normally connected to ground through contacts of the step magnet of translator 33; and similarly the armatures of the relays associated with the hundreds keys are connected to a common wire which is grounded at a normal contact of the step magnet springs at translator 34. The outer brushes of controllers 35 and 36 are connected to cut-off relays for stopping the operation of these controllers; the outer row of stationary terminals on controller 35 being grounded by the locking relays of the tens keys (Fig. 15) and the outer row of terminals of controller 36 being grounded by the locking relays of the units keys, in the same manner as described in connection with the thousands and hundreds keys. In selecting a line in a semi-mechanical office, translator 33 sends out selecting impulses by means of the middle row of terminals to the sender lead 1 for the purpose of operating the brush-choosing magnet of the group selector; but the principal function of translators 33 and 34 is to apply ground to points of controllers 35 and 36 to govern the operation of said controllers in sending out selecting impulses for operating the step magnet of the group selector and the brush-choosing magnet of the final selector; after which controllers 35 and 36 will each again be operated, this time under the direct control of the tens and units keys respectively, to send out selecting impulses for operating the magnets which set the vernier stop-setting mechanism on the final selector.

We have assumed that the line No. 9732 has been called and that the corresponding thousands, hundreds, tens and units keys, and the first or red stations key 119, have been depressed. The line numbered 9732, in the ten-thousand-line exchange for which the call was made, is in the fifth group of two thousand; therefore, the fifth set of brushes on the group selector should be chosen under control of the ninth thousands key. This is accomplished by the middle brush of translator 33 which, in trailing over its contacts, makes and breaks a circuit controlling the brush-choosing magnet of the group selector. It will be remembered that each zone of the group selector has four divisions representing four different sets of five-hundred-point final selector; the entire zone thus represents final selectors for four times five hundred, or two thousand lines. The number 9732 is in the fourth or last group of five hundred between the numbers 8000 and 9999; therefore, if the ninth thousands key and the seventh hundreds key are depressed, this combination should cause the step magnet of the group selector to advance the chosen set of brushes into the fourth or last division of their zone, to hunt therein for an idle final selector. This control of the step magnet of the group selector is effected by means of the first operation of controller 35, which sends out stepping impulses until the middle one of its brushes reaches a grounded point. The point which is grounded is determined by translators 33 and 34 under the control of the thousands and hundreds keys. The inner brush of translator 33 applies a ground to conductor 356 which extends to the contacts of a relay 354 at the controller 35. In the case assumed, said relay 354 is excited by current derived from the middle brush of translator 34 under the control of the seventh hundreds key, and connects the grounded lead 356 to the last terminal in the middle row on controller 35. Controller 35 in its first operation will therefore take four steps, sending four impulses for the operation of the step magnet of the group selector, whereby said group selector is caused to pick out the last division in the zone reached by the fifth set of brushes, to hunt for an idle final selector. The final selector having been secured, the first selective operation will be to choose that one of its five sets of brushes which travels over the hundreds zone in which the terminal 9732 is located. As the number 9732 is in the third group of 100 between the numbers 9500 and 9999, the third set of brushes of the final selector should be chosen, and this is accomplished under the control of the seventh hundreds key, because when translator 34 completes the eighth step from normal (seventh step from zero terminal) its inner brush (which is grounded) will rest on a terminal which is connected by a wire 357 to the third terminal in the inner row of controller 36. Controller 36, therefore, to govern the brush choosing magnet on the final selector will send out three impulses to choose the third brush. The operations of controllers 35 and 36 under control of the translators are now completed and said controllers will now again be operated under the direct control of the tens and units keys to operate the step magnet of the final selector.

The vernier disks of the final selector are normally positioned so that one step of disk 73 will bring the notches of disks 73 and 74 into coincidence at a point one step back of the zero point; whereupon an additional or "units step," in which both disks 73 and 74 are advanced together, will set the stop for the zero terminal of the selector. Each controller takes at least one step from its normal position to reach the terminal No. 0, or the first terminal in its outer row. In the operation of the final selector the vernier disk 73 is always given at least one independent step, corresponding to the first step of controller 35 in selecting "tens," and disks 73 and 74 together are always given at least one units step corresponding to the first step of controller 36 in selecting "units."

In reaching the number 9732, when controller 35 is brought into operation under the control of the tens key No. 3, it will therefore send four impulses to the step magnet of the final selector, which will advance the vernier disk 73 four steps to bring the notches of disks 73 and 74 into coincidence with the 29th notch of the units disk, ready for the units impulses. Now the shift magnet 90 of the final selector will be energized and the units disk stepping pawl brought into action and three units steps will be given by controller 36 in advancing to point No. 2 grounded by units key No. 2, thus throwing the point of coincidence of the vernier disks to a point opposite notch No. 32 of the units disk 78, so that the stop is set for terminal No. 32. Finally, after sending an impulse for causing the clutch to be applied to take the brush carrier to the predetermined point, the sending apparatus disconnects itself from the circuit, which is left completed between the calling and called stations, the sending apparatus being then ready to set up another connection.

*Detailed operation of number sender, controlling group selector and final selector.*— Returning to the moment when relay 214 was excited at the close of the operation of the office sender, the further steps in the operating of the sending apparatus may be traced in detail as follows: Relay 214 closing a normal break in conductor 275, completes a circuit for the test relay 318, which, as soon as a group selector has been secured, may be traced as follows: From battery 340 (shown in lower right hand corner of Fig. 19) through front contact 108 of relay 135 to subsidiary feed wire 109, back contact of armature 307 of relay 331, wire 308, through the test relay 318 (Fig. 18) through the normal contacts 309 of the holding magnet of the translator 33 (Fig. 14) through wire 310, front contact of relay 301 (Fig. 14), which relay is excited when any thousands key is depressed, to wire 275, through the contact 274 of relay 214 to the sender lead 1, thence over the main circuit through the district selector, office selector and trunk selector, to wire 761 of the group selector (Fig. 24) through one winding of a repeating coil 767, wire 765, polarized relays 701 and 702 and marginal relay 703, back contact 720 of relay 707 to wire 717, thence over wire 716, normal contact 715 of the brush chooser, wire 714, contact 713 closed by the carrier sheave 771 in its normal position, wire 705, normal contact of relay 704, wire 764, through another winding of the repeating coil 767 to the line conductor 762, and thence back through the trunk conductor, office selector and district selector, to the sender lead 2, through back contact of armature 291 of relay 342 to wire 311, through back contact 152 of cut-off relay 316 to the ground lead 273 and thence through a front contact of relay 214 to earth. Returning now to the group selector shown in Fig. 24, current flowing in the circuit just traced operates the polarized relay 701, which sends current from negative battery 768 over wires 769 and 780, through a normal contact 781 of the carrier sheave, normal contact of the shift-springs 712, stepping magnet 794 of the brush-choosing mechanism to ground; thereby causing the rotary arm of the brush-chooser to take a step. The polarized relay 701 also sends current from battery 768 over wire 782, through the relay 709 to earth. This relay 709 controls a local circuit for the holding magnet 791, which in operating applies positive battery 722 to the local feed wire 744 and also applies negative battery 783 to a conductor 784 leading through the back contact of clutch relay 707 to the third or test brush of the brush-chooser, and so (after the operation of said brush-chooser) to the third or test brush 753 of the selected set of brushes which is to find a final selector. The next step will be the starting of the translators 33 and 34 (Fig. 14) and the sending of impulses by translator 33 to cause the operation of the brush-choosing magnet 794 of the group selector (this brush-choosing magnet being in a circuit controlled by the polarized relay 701 just described). Returning to the sending apparatus, when test relay 318 is operated, it releases a relay 319 which in recovering applies battery from the sender feed 4 through a back contact 314 of relay 319, and front contact of relay 323 to a junction point 353, where current divides, part flowing over wire 354 through the starting relay 351 to pulsator 362 and earth, and the other part flowing through a back contact of relay 341, wire 376, normal contact 354 of relay 322, over wire 355 through a front contact of relay 302 of the hundreds keys (Fig. 14) through wire 361 through the starter relay 352 and pulsator 362 to earth. The starter relays 351 and 352 now lock up and send pulsations through the stepping circuits of translators 33 and 34, as follows: For translator 33, begin with the pulsator 362, through the front contact of armature 364 of the starter relay 351, through a back contact of cut-off relay 316 to a conductor 365, from which branches extend through the holding magnet 363 and stepping magnet 366 of the translator 33 to the battery feed 4. The stepping circuit of translator 34 is traced through the front contact 367 of starter relay 352 through a normal contact of cut-off relay 322 to a wire 368 from which branches extend through the holding magnet 369 and stepping magnet 370 of the translator 34, to the battery feed 4. Each translator is now stepped around till its outer brush shall touch a terminal which has been grounded. It will be noted that the holding magnets of translators 33 and 34 lock up from the feed wire 4 to ground through their own contacts, and the translators when stopped at the predetermined point will be held in that position until battery is removed from the feed wire 4 at the end of the sender operation.

In selecting the line 9732, the terminal 9 in the outer row on translator 33 will be grounded by that one of locking relays 313 which is controlled by thousands key No. 9. The first step of the translator 33 breaks the circuit of the test relay 318 at contact 309, and causes relay 319 to be again excited. Starter relay 351 remains locked up, however, by a circuit closed by the holding magnet of the translator from battery feed 4 to wire 381, relay 351 and its front contact and through a resistance to earth. Starter relay 352 also remains locked up under control of relay 322, the first step of translator 34 applying battery from feed 4 to wire 376, from which circuit may be traced through normal contact 354 of relay 322 to wire 355, thence through front contact of relay 302 (Fig. 14) to wire 361 through relay 352 and its front contact, and thence through a resistance to earth. Translator 33 in advancing trails its middle brush over the middle row of its contacts, and in so doing intermittently completes a circuit for the operation of polarized relay 701 (Fig. 24) which is to operate the brush-choosing magnet 794 of the group selector. It will be noted at this point that the first step of the translator 33 does not cause an advance of the brush choosing arm, due to the fact that there is not a great enough interval between the time of opening contact 309 and the closing of the middle brush with the first terminal in the path to permit the brush choosing magnet 794 to fall back. The brush choosing arm will advance, however, with subsequent steps of the translator, the circuit for the bridged relay 701 being opened and closed by the middle brush of translator 33. This circuit is traced as follows: The middle brush of translator 33 is connected by wire 371 through a back contact of relay 343 to the battery feed 4. Every alternate contact in the middle row on the translator 33 is connected to a wire 372 from which circuit may be traced through a back contact of relay 316 to wire 373, normal contact 151 of relay 342, to sender lead 1, thence over the main circuit through the intervening selectors to wire 761 of the group selector, thence through the bridge circuit including polarized relays 701, 702, and marginal relay 703, now completed through contact 733 of the holding magnet, back over wire 762, through the intervening selectors to the sender lead 2, through a normal contact 291 of relay 342, to conductor 311, thence through a back contact 152 of relay 316 to the ground lead 273 and through front contact of relay 214 to earth. Each pulsation of current in the circuit just traced will affect polarized relay 701, but will not affect polarized relay 702 nor will it affect relay 703 which although not polarized is responsive only to current of a higher voltage. At each response of polarized relay 701, the local circuit previously traced from battery 768 through the brush-choosing magnet 794 is operated. In the case we have assumed, the middle brush of translator 33 sends five pulsations of current to operate relay 701 thereby causing the brush magnet 794 to take five steps, thus selecting the fifth set of brushes upon the main brush carrier of the group selector. The relay 709 of the group selector, which applies current to the holding magnet thereof, is of the slow release type, so that although its circuit is intermittently broken by the polarized relay 701 in operating the brush magnet, yet said relay 709 does not release its armature during intervals between the current impulses. Returning now to the sending apparatus, when the outer brush of the translator 33 reaches the point grounded by the depressed thousands key, cut-off relay 316 is operated and locked up from the battery feed wire, and cuts off pulsating current from the stepping circuit 365. It also, as will presently be shown, applies battery to sender lead 2 and grounds the sender lead 1, (reversing the former connections) which results in polarized relay 702 of the group selector (Fig. 24) being operated and relay 701 released. The battery is applied to the sender lead 2 from the battery feed 4 through the back contact of relay 343 and back contact of relay 344 to the front contact of armature 152 of relay 316, thence over wire 311 through the back contact 291 of relay 342 to the sender lead 2. The circuit may thence be traced out over the main wire through the bridge containing the polarized relays 701, 702, of the group selector and back over the other side of the circuit to the sender lead 1, thence through a normal contact 151 of relay 342 to wire 373 and through a front contact of relay 316 and back contact of relay 344 to earth. The effect of current flowing in the circuit just traced is to operate the polarized relay 702 and release relay 701. Relay 702 completes a circuit from battery 768 through the relay 709, to take the place of the one previously closed by relay 701 which is now broken and it will also send current over wire 772 through a normal contact of the spring 773 of the set operated by the carrier sheave, through the step-magnet 786 to the feed wire 744 which is connected to the positive pole of battery 722. The batteries 768 and 722 are thus connected in series, and the step-magnet 786 is operated and advances the ratchet 783 of vernier wheel 773 one step, holding it in the advanced position without recovering. As will be hereinafter described, the first one of the selecting impulses to be sent out to this step magnet by controller 35 will not further affect the step magnet, which is already excited, but upon the recovering of the controller step magnet, after its first step, the magnet 786 will be released, and each succeeding impulse will operate said step magnet 786.

During the operation of translator 33, translator 34 has also been getting into position, but without sending any impulses over the selecting circuit. Translator 34 has two functions in selecting a line in a semi-mechanical office; first, in conjunction with translator 33 it determines the grounding of a point in the middle row of terminals on controller 35 to govern the operation of that controller in sending out selecting impulses for the operation of the stepping magnet of the group selector. Secondly, translator 34 grounds a point in the inner row of terminals on controller 36 for the purpose of determining the operation of that controller in sending out impulses for the operation of the brush-choosing magnet of the final selector. The middle brush on the arm of translator 34 is connected to the battery feed 4, and the last five terminals in the middle row of terminals on said translator are connected through a wire 377 with a relay 354 associated with controller 35 (Fig. 15). The four terminals in the middle row on controller 35 are to govern the operation of the step magnet of the group selector, in selecting that one of the four divisions in the zone of the chosen brush which contains a terminal of a final selector serving the particular group of five hundred lines in which the line wanted is found. Each of the four divisions indirectly represents a group of five hundred lines in the larger group of two thousand lines represented by the whole zone. Selection of a particular one of the four divisions must, therefore, be determined first, according to whether the group of five hundred lines containing the line wanted is in the first or second thousand of the larger group of two thousand selected, and secondly, whether it is in the first or second five hundred in that particular thousand. The depressed thousands key will therefore cause the translator 33 to select either the first two or the last two of the four points in the middle row on controller 35; and the depressed hundreds key will then cause translator 34 to ground either the first or second point of the selected two, according as the particular hundred required is among the first five hundred or the second five hundred of that thousand. This may be accomplished as follows: The inner brush of translator 33 is arranged to ground one of two wires leading to controller 35. The wire selected is normally connected to the first contact in the group of two thus chosen; but if the middle brush of translator 34 is stopped at any point after the first five, it will complete a circuit for the shift-relay 354 which will transfer the connection of the selected wire to the second contact of the two. If the depressed hundreds key is among the first five, the shift relay 354 will not be operated.

The inner brush of translator 34, under control of the depressed hundreds key, governs the grounding of a point on the inner row of controller 36, for the purpose of causing that controller in its operation to select the particular hundred in the selected group of five hundred. The controller 36 when operated under control of said inner brush sends impulses for operating the brush-choosing magnet of the final selector. Assuming the hundreds key 7 to have been depressed, the translator 34 will stop when its outer brush rests upon the point 7 in its outer row of terminals. A circuit will therefore be completed for the relay 354 and said relay will connect the wire 356 which was grounded by translator 33 with the last contact in the middle row of terminals on controller 35. When the outer brush of translator 34 rests upon contact No. 7, the inner brush thereof will rest upon a contact connected by wire 357 with the third contact on the inner row of controller 36. The said inner brush of translator 34 which is thus connected with a point on controller 36, is grounded through wire 378, this ground wire being normally connected to earth through a contact of the step magnet of controller 36 at ground 197.

When the outer brush of translator 34 reaches the point in the outer row grounded by a hundreds key (in this case point No. 7) relay 322 is operated and locked up, and cuts off pulsating current from said translator. Relay 322 also breaks the locking circuit of the starter relay 352. It also releases relay 323 which closes contact 380 to complete a circuit for the starter relay 352, which will presently be traced, this circuit, however, being dependent upon a back contact of relay 317 which released when relay 316 operated, in order to insure that the next selecting operation does not commence until both translators have completed their movements. When the holding magnet 363 of the translator 33 attracts its armature, it closes the contact which applies battery from the feed wire 4 to the wire 381, which is connected through the winding of the starter relay 351 to earth, so that said starter relay 351 remains locked up for the rest of the operation after translator 33 has taken its first step, remaining locked until battery is taken off the feed wire 4. When relays 317 and 323 have both recovered at the end of the operation of translators 33 and 34, respectively, the circuit for the starter relay 352 is completed from the battery feed 4, through contact of the holding magnet of translator 33, wire 381, back contact of relay 317, wire 382, back contact 380 of relay 323; wire 374, to a normal contact of relay 324, wire 383, wire 355, thence through the front contact of relay 302 (Fig. 14) wire 361, to the starter relay 352 and through its normal contact to the pulsator 362 and ground. The starter relay 352 now connects the pulsator in the stepping circuit of controller 35 for the operation of said controller, the circuit being traced from said pulsator 362 as follows: through front contact 367 of starter relay 352, through the front contact 385 of relay 322, normal contact of relay 325, through wire 386 and through the step magnet 388 and holding magnet 387 of controller 35 to the free pole of the grounded battery 389. When the holding magnet 387 of controller 35 is excited, it closes a contact 390, which applies battery to relay 344 (shown below relay 316) over the following path: beginning with battery feed 4 at back contact of relay 343, through wire 371, wire 391, contact 390, wire 358, through the winding of relay 344 to earth. Relay 344 in drawing up its armature, removes battery and ground from sender leads 2 and 1, respectively, but not before the step magnet of controller 35 has applied current to the line in the same way by means of contacts 915 and 916. This circuit is as follows: From battery 136 near the step magnet of controller 36, over wire 178, through contact 916, wire 137, sender lead 2, and thence over the main circuit through the bridge previously traced at the group selector, back on sender lead 1, to wire 138, through contact 915, to conductor 378, to ground 197 at controller 36. This causes relay 702 at the group selector to maintain the circuit through the step magnet of said group selector and keep the armature of said step magnet in the forward position until contacts 915 and 916 open, when the step magnet of the controller next releases its armature under influence of pulsating current.

During the intermittent opening and closing of the circuit at contacts 915 and 916 of controller 35 when the latter is in operation, relay 702 (Fig. 24) is intermittently excited and caused to apply battery 768 through wire 772 to the step magnet 786, over the circuit previously traced. This operation advances vernier disk 773 a number of steps, dependent upon which thousands key and which hundreds key have been depressed. In the case assumed, where the thousands key No. 9 and the hundreds key No. 7 were depressed, the controller 35 would take four steps, (this being governed by the positions of translators 33 and 34) causing the relay 702 to give the division magnet 786 four steps (that is, three steps additional to the initial step formerly mentioned). This would, by advancing the vernier disk 773, set the stop at the beginning of the fourth division, so that when the clutch is applied it will cause the selector arm to be moved to the fourth division, in which it will hunt for an idle set of terminals leading to a final selector.

The stopping of controller 35 after it sends out four impulses is brought about by means of the cut-off relay 324 (in series with relay 325) which relays are energized in the usual manner when the middle brush of controller 35 reaches the grounded point. Relays 324 and 325 are now locked up, and cut off pulsating current and unlock starter relay 352. A ground is also applied by means of contact 394 of relay 324 to sender lead 2, and an impulse of current is applied momentarily through the front contact of relay 326 to the sender lead 1. This impulse is for the purpose of energizing the relay 701 of the group selector to cause the same to complete a circuit for the clutch relay 707, which will throw on the clutch and cause the brush carrier of the group selector to be moved to the predetermined division. When the polarized relay 701 receives the impulse of current from relay 326 at the end of the operation of the controller 35, it closes circuit from the battery 768 to wire 769, and thence to the shift spring 712, through the alternate contact of said shift spring, and through a winding of relay 707 to earth. Said relay 707 now operates to throw in the clutch 770 just as in the case of the other selectors. When the relay 708 recovers, owing to the operation of the stopping switch 779, when the pawl 775 reaches the predetermined stopping point, said relay 708 closes a circuit for the step-magnet to advance the ratchet wheel one step and release the pawl 775, thus restoring the stopping switch and permitting a hunting movement similar to that described in connection with the district selector. During the interval of selection and hunting by the group selector, the circuit through relays 701, 702 and 703 is kept open by means of contact 720 of relay 707, in order to suspend the operations of the sender through the medium of its test relay until the group selector has found a final selector. This waiting test circuit through the test relay 318 is as follows: Beginning with battery feed 109 at back contact of relay 331, through wire 308, test relay 318, wire 395, contact 396 of controller 36, wire 397, back contact of relay 326, normal contact 151 of relay 342, to sender lead 1, thence over the main circuit to the group selector, and through the bridge circuit thereat when completed at the time the group selector has found an idle final selector (at which time this bridge is closed by relay 707) back over the other side of the main circuit to sender lead 2, to the back contact 291 of relay 342, wire 22, front contact of relay 332, to wire 393 and through the contact 394 of relay 324 to earth. During the hunting operation, the relay 707 has applied battery through a front contact to the relay 709, in order to prevent said relay 709 from falling back, and opening the circuit of the holding magnet 791.

When the group selector first makes connection with the final selector, it applies current from battery 783 through conductor 784 and back contact of relay 707 to the test wire 863, through a normal contact of relay 806, (Fig. 25) wire 847, through the holding magnet 91 to a normal contact 815 of the brush-chooser, and normal contact 816 of the carrier sheave to earth. The holding magnet 91 is now excited and closes a locking circuit for itself independent of the contacts 815 and 816. In operating, it applies battery to the feed wire 844, from which current flows through a back contact 835 of relay 801, through relay 805 to earth, whereby said relay 805 is excited. Relay 805, although of the slow-release type, attracts its armature with practically the same speed as an ordinary relay.

When the group selector has found a final selector, as above described, the relay 707 of the group selector is released, closing a contact which completes the circuit through the test relay of the sending apparatus, whereupon relay 701 is again excited and sends an impulse of current from battery 768 over wire 769, through the brush contact 751 of the group selector to wire 861 of the final selector, thence through the front-contact of relay 805 over wire 811, through the normal contact of the shift spring 812, through the step magnet 94 of the brush chooser associated with the final selector to earth, causing said step magnet to take a step.

Returning to the sending apparatus, we find the operation of test relay 318 released relay 319, which in turn applied battery to starter relay 352 over the following path: beginning with the battery feed 4 at back contact 314 of relay 319, back contact of relay 323, through wire 397, normal contact of relay 330, wire 398, through a front contact of relay 324, wire 383, wire 355, contact of relay 302 (Fig. 14) back over wire 361, through the starter relay 352 and pulsator 362 to earth. The starter relay 352 is now locked up and applies pulsating current to the operating magnets of controller 36, over a path which may be traced through the front contact 367 of relay 352, front contact 385 of relay 322, front contact of relay 325, wire 399, through back contact of relay 330, through step magnet 175 and holding magnet 176 of controller 36 to the free pole of grounded battery 104. Each step of the step magnet 175 of said controller 36 puts negative battery on the sender lead 1 by means of contact 177, and at the same time applies ground 197 to the sender lead 2 by means of contact 179. The impulses thus sent out by controller 36 operate the polarized relay 701, which at each impulse applies battery 768 through wire 769 to brush 751 and through wire 861 of the final selector, front contact of relay 805, wire 811, normal contact of shift spring 812, through the step magnet 94 of the brush chooser to earth. It will be noted that the first step of controller 36 does not cause a corresponding advance of the brush chooser arm of the final selector because the circuit through the test relay 318 and the bridged relay 701 is controlled at contact 396, and the time interval between the opening of contact 396 and the closing of contacts 177 and 179 is not sufficient to permit the step magnet 94 to fall back. The brush chooser arm will advance on all subsequent steps of the controller 36, however. The particular set of brushes which travels over the required hundreds zone containing the terminals of the line wanted is thus chosen.

When the inner brush of controller 36 reaches the point grounded by translator 34, relays 330 and 331 are operated and locked up, breaking the stepping circuit of said controller and also unlocking the starter relay 352. The armature 307 of relay 331 disconnects the test relay 318 in order not to interfere with subsequent operations, and also connects battery from the feed wire 109 to relay 327, so that the latter may serve as the cut-off relay for the next operation of controller 35. Relay 331 also unlocks relay 332, which opens its front contact and removes ground from sender lead 2. Relay 332 also at a back contact completes a circuit for the starter relay 352 to start controller 35. This circuit is traced from the battery feed at back contact of relay 342, through wire 183, back contact of relay 332, wire 180, front contact of the relay 303 (Fig. 15) which is operated when any tens key is depressed, to wire 181, through normal contact 182 of the rotary arm, through normal contact of relay 327, front contact of relay 324, wire 383, wire 355, contact of relay 302, wire 361, through starter relay 352, pulsator 362 to earth. Starter relay 352 now sends pulsations through the stepping and holding magnets of controller 35 over a path which may be traced through front contact 367 of relay 352, front contact 385 of relay 322, front contact of relay 325, wire 399, front contact of relay 330, back contact of cut-off relay 327, through the step magnet 388 and holding magnet 387 of controller 35, to the free pole of grounded battery 389. This second operation of controller 35 is for the purpose of operating the step magnet 86 of the final selector in selecting tens. Each step of the controller 35 applies negative battery 136 to sender lead 2 and ground to sender lead 1 to operate the polarized relay 702 at the group selector, which in turn applies negative battery 768 to wire 772, over which current flows to brush 752, wire 862 of the final selector, back contact of relay 806, normal contact of relay 801, contact 817, wire 825, contact 818 of the sheave springs, wire 819, step magnet 86, to earth. The first step of the step magnet shifts the spring 812, which brings the units wheel holding magnet 90 into connection with the other side 861 of the line ready to receive impulses which will be later delivered over that conductor. The step magnet 86 in this first operation under control of controller 35 operates only the ratchet 83 of the vernier disk 73, so that each step represents a setting ahead of the stop a distance equal to ten notches on the units disk 78.

In selecting the number 9732, the tens key No. 3 will have been depressed, grounding point No. 3 on the outer row of controller 35, causing said controller to take four steps, and so causing the stepping magnet 86 in its first operation to take four steps, setting the stop at point No. 29 on the units scale. Now when the outer brush of controller 35 reaches the point grounded by the tens key, cut-off relay 327 is operated and locked, and breaks the stepping circuit and the circuit of the starter relay, in the usual manner. It also, by means of contact 185, connects the battery feed to relay 333, so that the latter may serve as the cut-off relay to govern the last operation of controller 36 under control of the units keys. The cut-off relay 327 also unlocks relay 328, which in releasing completes a new circuit for the starter relay 352 as follows: Beginning with the battery feed 109 at back contact of relay 328, over wire 186, through the front contact of relay 304 (Fig. 15) which is operated when any units key is depressed, back over wire 187, contact 188, closed by the rotary arm of controller 36 in its normal position, wire 189, back contact of relay 333, wire 398, through front contact of relay 324, wire 383, wire 355, through front contact of relay 302 (Fig. 14) wire 361, through the starter relay 352 and pulsator 362 to earth. The starter relay 352 locks up and sends pulsating current through its front contact 367, through a stepping circuit of controller 36, to cause said controller to send out impulses for the operation of the step magnet of the final selector in taking "units steps." This stepping circuit for controller 36 is traced from the front contact 367 of starter relay 352, through front contact 385 of relay 322, front contact of relay 325, wire 399, front contact of relay 330, front contact of relay 327, wire 190, back contact of relay 333, wire 399, through the stepping magnet 175, holding magnet 176 of controller 36, to the free pole of grounded battery 104.

In the operation of controller 36 the step magnet will, by means of contacts 177 and 179, apply negative battery and ground to sender leads 1 and 2, respectively, causing relay 701 of the group selector to be operated, which will send impulses of current from battery 768, over wire 769, brush 751, wire 861, front contact of relay 805, wire 811, alternate contact of spring 812, through a normal contact of the set of switch springs to be operated by the shift magnet 90, and through one winding of said shift magnet 90 to earth. The magnet 90 in operating its set of springs closes a circuit through its locking winding, which may be traced from the battery feed 844, through normal contacts 835 of relay 801, wire 820, wire 822 and wire 823, through the contact 824, and winding of magnet 90 to earth. The magnet 90 operates so quickly that the step magnet 86 is thrown into circuit by the alternate contact spring 817 before the impulse of current has ceased to flow, so that the step magnet 86, as well as magnet 90, is operated by the first impulse. The circuit through the step magnet may be traced from the alternate contact of shift spring 812, through the alternate contact of spring 817, wire 825, normal contact 818 of the sheave springs, wire 819, through step magnet 86 to earth. This second actuation of the step magnet is for the purpose of advancing both of the vernier disks 73 and 74, to set the stop ahead a certain number of units steps from the point where it was previously set by the operation of vernier disk 73. The shift magnet 90 brings stepping pawl 85ª into engagement with the ratchet 84 of the vernier disk 74, so that the step magnet will now advance both ratchets together. In the case assumed (reaching line No. 9732) the step magnet will require three of such units steps; these are furnished by the action of controller 36 just described, which advances until its outer brush reaches the point grounded by the units key, in this case point No. 2 in the outer row. When the outer brush of controller 36 reaches the grounded point, relay 333 is operated and locked, and breaks the stepping circuit of controller 36 and the locking circuit of the starter relay 352. It also unlocks relay 334, which applies a ground to sender lead 1 by means of its back contact 191 (this ground being at relay 324) and applies battery by means of its back contact 192 to the relay 335. The circuit for this battery will hereinafter be traced.

The function of relay 335 is to stop the advance of controller 35 when its inner brush is used in conjunction with the stations keys, when an indicator is to be operated at a distant manual office. As we are now dealing with a call to a semi-mechanical office, no further selecting impulses need be sent by the controllers. The red key 119 of the stations keys is however always actuated in transmitting a call to a semi-mechanical office. Its function is to cause relay 335 to be operated at the close of that operation of controller 36 which is governed by the units keys, said relay 335 sending out an impulse which will result in the throwing on of the clutch at the final selector. Key 119 when depressed, causes a corresponding one of the relays 313 to lock up and close a contact 140. This completes a circuit for relay 335 which may be traced from the battery feed 4 at the back contact of relay 342, over wire 183, through back contact of relay 332 to wire 180, through a front contact of relay 303 to wire 181, through contact 182 of the rotary arm of controller 35, over wire 123, through a back contact 192 of relay 334, to point 157, thence through the winding of relay 335 and its normal contact, to wire 122, thence over wire 112, through the contact 140 of the relay which is locked up by the special key 119 of the stations keys, to wire 378 and thence to ground 197 at a back contact controlled by the step magnet of controller 36. A circuit may also be traced from point 157 to the starter relay 352; but this circuit is instantly broken by relay 335, before the starter relay can pull up its armatures.

Relay 335 releases relay 336, and at the same time connects the 48-volt battery 348 to the armature of said relay 336 and the sender lead 2. An impulse from this battery 348 to sender lead 2 is transmitted before the release of relay 336, and its effect upon the apparatus of the group selector and final selector will be described after first explaining the manner in which the primary sender, whose operation has now been substantially completed, disconnects itself from the operator's connecting circuit.

When relay 336 closes its back contact, current is sent from battery 348, through relay 337, to ground at the front contact of relay 135. Relay 337 opens the circuit from battery 340 through relay 338 to feed wire 3 and relay 405 (Fig. 20). Relay 338, in recovering, cuts off battery 340 from the feed wire 4 of the primary sender, which unlocks all the relays of this sender which have been locked up to ground from said feed wire, including relay 135 which opens the circuit of relay 337. Relay 337, however, is of the slow-release type, and does not close its back contact again until relay 338 has had ample time to open its contacts. Relay 405 (Fig. 20) in recovering, restores the talking circuit at its back contacts and leaves the connection in proper form for telephonic transmission; the primary sender being now free to serve another cord circuit.

The impulse of current from the 48-volt battery 348 which was sent out to the sender lead 2 at the front contact of relay 336 at the end of the operation of the primary sender operates both relays 702 and 703 of the group selector, the latter being a marginal relay, which operates on current of the higher voltage from battery 348, but does not operate on the lower voltage from the other batteries employed in the system. Relay 702 of the group selector momentarily closes a contact which sends an impulse for the operation of the clutch relay 804 of the final selector, over the following path: wire 772, brush 752, wire 862, back contact of relay 806, normal contact of relay 801, contact 830 of the set of springs operated by the shift magnet 90, through one winding of relay 804, and through contact 816 normally closed by the carrier sheave 71 to earth. Relay 804, in operating, closes a circuit for the clutch magnet, which may be traced from the battery feed 844, through back contact 835 of relay 801, wire 820, wire 831, normal contact of the stopping switch 79, wire 832, through retaining winding of relay 804, front contact of said relay 804, to wire 833, through the clutch magnet 70 to earth. The clutch 70 is now thrown on and the brush carrier thereby advanced to the point predetermined by the setting of the vernier disks 73 and 74. When the pawl 75 reaches the coinciding notches of these vernier disks it falls in and pushes the units disk 78 sufficiently to actuate the clutch stopping switch 79. The clutch circuit (including the retaining winding of relay 804) is thereby broken, and relay 804 (which is of the slow-release type) in recovering, closes at contact 834 a test circuit from the test brush 53, through marginal relay 801 and polarized relay 803 in series, to ground at the contact springs of the holding magnet. Relay 801 is a marginal relay and responds only if the line now reached by the test brush is free. It governs the definite seizure of the line by the final selector, and also governs the ringing relay by which ringing current is applied to the line wanted. Relay 801 at its back contact also governs a circuit for the cut-off relay 806, which latter relay will open the main circuit and apply current from the busy-tone apparatus 842 to the line, unless relay 801 does come up instantly at the time the relay 804 recovers. Relay 803 is polarized to respond only to positive current received from the test brush. This relay is used only in governing the hunting of trunks leading to private branch exchanges, and its operation will be described hereinafter.

We will assume that the called line No. 9732 is an individual line (that is, not a party-line or a private branch exchange) and that it is not busy. At the moment when relay 804 recovers, therefore, when the brushes of the final selector have been moved to the predetermined point, relay 801 will be excited by current derived from a battery 981 (Fig. 26) which is normally connected to the test terminal of the line. The armature 835 of relay 801 will therefore disconnect the battery feed wire 844 from the wire 820 and apply battery instead to a path leading through wire 836, front contact of relay 805, ringing relay 807, and contacts closed by the holding magnet 91 to earth. Relay 801 in attracting its armatures, also disconnects the polarized relay 803 and substitutes a relay 802. The relay 802 is for the purpose of determining whether positive or negative ringing current shall be applied to the called line in calling a station on a party line, and need not be considered at this point. Relay 801 further unlocks the relay 805, which, however, is of the slow-release type and keeps its armature 837 attracted long enough to apply an impulse of current from the battery feed 844 through the ringing relay 807. Relay 807 then closes a locking circuit for itself from battery 838 through the back contact of relay 808, through winding of relay 807 to earth at the contacts closed by the holding magnet. Relay 807 also opens the main circuit and connects the terminals thereof leading to the called station with the wires 839 and 840, connected respectively to the free pole of a grounded ringing generator 841 and to earth. The circuit from the ringing generator 841 includes the winding of a cut-off relay 808 which is adapted to respond when the called subscriber removes his telephone from its hook in answer to the call. When this cut-off relay 808 is actuated upon the response of the called subscriber, it unlocks the ringing relay 807, which in recovering cuts off ringing current and restores the talking circuit.

The final impulse of current from the 48-volt battery 348 of the primary sender operated relay 703 of the group selector, which closes a circuit from battery 730, through relays 704 and 709 to ground. Relay 704 in operating, first closes a contact which bridges a high-resistance winding 731 of relay 710 across the condenser 732 which is bridged between the windings of the repeating coil in the trunk line. Relay 710 is operated by current in this bridge circuit resulting from restoration of relay 405 (Fig. 20). Relay 704 then breaks the bridge including the relays 701, 702 and 703, and also closes a locking circuit through wire 721 and holding magnet 791 to earth, battery being derived from the armature of relay 710. After closing this locking circuit, the relay 709 is released, as it is no longer required to keep the holding magnet excited. The purpose of putting the holding magnet in direct control of the relay 710 is to insure the complete restoration of the group selector even though the trunk line should be picked up immediately after its release by the first trunk selector. This is brought about by the quick release movement of the holding magnet and the immediate opening of its contact 733, which opens the bridge of relays 701, 702 and 703 across the trunk; contacts 713 and 715 in shunt of the contacts of the holding magnet not being closed until the selector is fully restored.

The operator supervises the connection in the usual way. The movement of the called subscriber's telephone hook controls supervisory relay 706 at the group selector, which relay controls the shunt of the high-resistance winding 731 of relay 710, containing the low-resistance winding thereof. This in turn affects the supervisory relay 402 in the cord circuit (Fig. 20) which controls a shunt of the supervisory lamp 423 in series with the holding magnet 491.

*Calling a busy direct line.*—If the line to which the brushes of the final selector have been carried is busy, the relay 801 upon making test with that line will fail to operate, because there will be a shunt on the test wire sufficient to divert a portion of the current from said relay 801. This will be apparent, for example, by reference to Figs. 20 and 26. Normally the multiple test terminal 63 of a line and the test ring 163 of the springjack will be connected through the cut-off relay of such line to the free pole of a grounded battery 981. It will be evident, however, that if connection is made with the line, whether at its springjack or at one of its terminals upon the final selector, there will be a path to ground from the test terminal, either through a relay 409 of a cord circuit (in case connection was made at the springjack) or through relays 801 and 802 (in case connection was made to the line by a final selector). If now another final selector attempts to make connection with such a busy line, the test relay 801 of the last-mentioned selector will not receive sufficient current for its operation because it will be shunted by the path just described to ground at some other terminal. The relay 801 of the other selector will not, however, be deënergized sufficiently to release its already-attracted armature. Relay 803 of the testing final selector also remains unoperated; and this combination will close a circuit for the lockout relay 806 as follows: Beginning with battery feed 844, through the back contact 835 of relay 801, wire 820, back contact of relay 804, off-normal contact 848 of the carrier sheave, wire 849, back contact of relay 803, through relay 806 to earth. Relay 806 in attracting its armatures will break the main circuit of the wire 862 and apply thereto the free terminal of grounded source of busy-tone current 842, which current will flow back through a winding of the repeating coil 767 of the group selector to earth; and the repeating coil inductively transmits this signal over a circuit leading to the operator's telephone and to the calling line. The busy tone apparatus 842 may be also arranged to intermittently close a path from wire 862 to ground which will intermittently operate supervisory relay 706 (Fig. 24) and in turn supervisory relay 402 (Fig. 20) and cause the supervisory lamp 423 before the operator to flash. Relay 806 also completes a locking circuit through its own winding to ground from the test wire 863, which derives current from battery 783 at the group selector applied over wire 784 through back contact of relay 707 to the test brush 753 and so to said wire 863. The lockout relay 806 also, in breaking the connection of wire 863 to the holding magnet 91, releases said holding magnet and allows the final selector to return to normal. The purpose of this is to prevent a number of final selectors from piling up, as it were, on a busy line and thus interfering with the shunt on its test terminal. Relay 806 is copper-jacketed and constructed so as to be slightly sluggish in drawing up its armatures, so that it will not operate after relay 804 recovers until relay 801 or relay 803 has had full opportunity to operate.

*Calling a busy private branch exchange.*—In the upper portion of Fig. 26, several trunk lines leading to a private branch exchange are shown. The final selector in attempting to reach one of a given group of private branch exchange trunks, will first bring its brushes to rest upon the terminals of the first trunk line of that group, after which if the first trunk line is busy, the others will be tested in rotation until an idle one is secured. If the last private trunk is found busy, the lockout relay 806 of the testing final selector will be operated, restoring the selector and sending the busy signal. This is accomplished by connecting up the last private trunk similarly to an ordinary individual line, namely, in such a manner that the negative pole of a grounded battery is applied to the test terminal through the cut-off relay of the trunk. All the other private trunks have their test terminals connected to positive battery, which produces the following results when a busy trunk such as these is tested: Test relay 801 of the testing final selector does not operate because it does not receive sufficient current, but polarized relay 803 does operate, being arranged to respond to the smaller current from positive battery derived from a shunted test terminal. Relay 803 in operating cuts off the lockout relay 806 and applies battery from wire 849 to the clutch magnet 70. At the same time the stopping switch 79 is restored to permit a further advance of the selector arm, this being accomplished by applying current from pulsator 824 to the step magnet 86 over the following path: battery 838, pulsator 824, front contact of relay 803, wire 819, step magnet 86 to earth. Pulsating current instead of a single impulse of battery current is here applied in order to give several steps to the vernier wheels and set the stop far ahead, so that if desired a large number of private trunks can be tested. When an idle trunk is reached, the test relay 801 will be operated, and will cut off the lockout relay and perform its other functions as before described. On reaching the last private trunk, relay 803 will release its armatures, because of the reversal of current through it, leaving the lockout relay in position to respond if test relay 801 does not.

*Calling a four party selective line.*—Each station of a party line is represented by a separate set of terminals upon the final selector, these sets of terminals being wired as shown on Fig. 26. A resistance 910 is inserted in the circuit of the test wire of the upper sets of terminals, and these two sets are reversely connected with respect to the line conductors 971 and 972. The two lower sets of terminals are also reversely connected with respect to the line conductors, but they have no special resistance 910 in their test wires. In case the final selector makes connection with either of the lower two sets of terminals, the relay 802 in the test circuit will be excited and will apply the positive terminal of the ringing generator to the brush 51, thus sending positive pulsating current from the brush over the line wire 971 to ring the bell at station A, or over the line wire 972 to ring the bell at station B, according as the first or second of these sets of terminals has been chosen. If connection is made to either of the upper two sets of terminals, the resistance 910 in the test wire will prevent the operation of relay 802, so that the negative terminal of the ringing generator set will be applied to brush 51, ringing the bell at station C over line wire 971, or at station D over line wire 972, according to which of the two upper sets of terminals are employed in making connection to the line.

*Disconnection.*—When, at the end of conversation, the calling subscriber has given the signal for disconnection, the operator can restore the train of selectors by merely withdrawing the answering plug, or operating release key 425. Either the withdrawal of the answering plug 400 or the actuation of key 425 will remove ground from the ground feed wire 424 of the district selector, which releases its holding magnet 491 and in turn allows the brush carrier rod to fall by gravity to its normal position. The district selector cannot again be used for selecting until it is fully restored, because the relay 409 cannot again apply ground to the ground feed wire until the returning carrier-sheave has closed the contact 427. The main conductors of the transmission circuit are open at the holding magnet 491 during recovery, in order that the lines passed over by the brushes 451 and 452 may not be disturbed. No potential is applied to the test brush 453 during restoration because the battery feed wire 444 is now dead.

The district selector in recovering immediately releases the office selector, which, in recovering, is kept "busy" to all district selectors, because battery is kept applied to its test terminal until recovery is complete. This circuit is as follows: battery 521, normal contacts of the holding magnet 591, wire 535, off normal contacts 536 of the carrier sheave and 537 of the brush chooser in multiple, to wire 563 and so to all the multiple test terminals of the selector. The purpose of contacts 536 and 537 in multiple in this circuit is to insure the recovery of both the brush selector and the main selector. The holding magnet is not operated from this circuit because it has opened its ground circuit, and because the brush chooser has opened the contact 509.

The office selector in releasing unlocks the trunk selector in turn, which is kept "busy" to other office selectors during recovery by battery placed on its test terminal over the following path: from the free pole of grounded battery 621, through an off-normal contact of the carrier sheave 671, to wire 630, thence through a normal contact of the middle spring 603 of the set which is operated by the holding magnet, to wire 663, and so to the multiple test terminals of this trunk selector upon all the office selectors which have access thereto. The holding magnet 691 cannot be operated during this interval because contacts 604 and 605 are open.

The group selector is released when the district selector opens the circuit of the main wires 461 and 462, thus cutting off the supply of current for bridged relay 710, which releases relay 704 and holding magnet 791. This group selector is not kept busy to hunting trunk selectors during the interval of time required for recovery, because the third or test wire is not extended to this exchange. But provision has been made to suspend the operation of the sender when this group selector has been picked up by a trunk selector. When the group selector is released and the holding magnet 791 recovers, the relay 704 releases, and would connect relays 701, 702 and 703 across the trunk but for the fact that this bridge is open at contact 733 of the holding magnet, in multiple with which are the serial contacts 715 and 713, which remain open so long as the brush chooser arm and the rod of the main group selector are away from their normal positions. Thus connection may be secured with the group selector, but the test relay 318 at the sender will not be operated until the bridge containing relays 701, 702 and 703 is closed by the complete restoration of the group selector.

If the operator desires to disconnect in the midst of a selecting operation, as in case of a mistake or for any other reason, this may be accomplished by the withdrawal of the answering plug or the operation of release key 425, which will result in relay 710 being released and in turn releasing the holding magnet 791, as before described.

The group selector releases the final selector, current for the holding magnet 91 being cut off at the test wire 863. The final selector is kept "busy" during restoration by a potential placed on its test terminal over a path which may be traced as follows: battery 821, normal contact of the holding magnet springs, wire 845, off-normal contacts of the carrier sheave and brush chooser in multiple, wire 847, back contact of relay 806 to wire 863, and so to all the multiple test terminals of the final selector upon the various group selectors which have access thereto. The holding magnet 91 is not operated over this circuit because the path through its winding to ground is broken by its own springs before battery 821 is applied to wire 847. The restoration of the chain of selectors is thus completed.

*Calling a line in the originating office.*—When a line is wanted in the originating office, traffic conditions may permit of the elimination of the office selector and the automatic trunk selector in establishing a connection. Trunk lines will lead from a bank of terminals on the district selector direct to the group selectors of the local office. The special wiring of the local office keys (Fig. 16) permits of the following operation: The call is carried directly to the district selector and from there to the local group selector where selection takes place under the control of the number sender, substantially as described in connection with calling a line in a distant exchange. When the operator depresses the local key 231 shown on Fig. 16, it results in grounding point No. 0 in the outer row of terminals of controller 31. This local key 231 also closes a special local circuit for relay 113, which locks itself up in a circuit from the battery feed wire 104, and places a ground on wire 285 leading to back contacts of relays 202 and 209. Key 231 also brings about the operation of the master-contact 297 which applies battery from feed wire 244 to wire 241, through contacts 243 on controller 31, through the winding of relay 205 to the pulsator 242, and thence to ground. Relay 205 will lock up, and pulsator 242 will intermittently close the circuit which is traced therefrom through the front contact of relay 205 and back contact of relay 201, through the stepping magnet 252 and the holding magnet 251, to the free pole of the grounded battery 254, causing controller 31 to advance. On the first step, however, the outer brush of controller 31 will make contact on terminal No. 0, and this will result in the operation of cut-off relay 201, which will break the stepping circuit and also the circuit of the starter relay 205. Relay 202 will also be released, as previously described in connection with the selection of a line in a distant semi-mechanical office. Current will flow from battery feed 104 through front contact of relay 201 and momentarily through the front contact of relay 202 to wire 101 and thence to the clutch relay of the district selector, over a path previously traced. Relay 202 will also at a back contact connect the wire 285 (which was grounded by the special relay 113) in shunt of relays 210 and 213, shown on Fig. 17. This will result in the release of these relays 210 and 213 and the delivering of the impulse which operates the restoring magnet 230 of the office keys. Relay 214 will also be operated, closing a contact 274 to start the number sender in operation. The circuit used on the three-wire group selector for handling calls for the originating office is the same as that of the office selector shown in Fig. 22, except that the division magnet of the three-wire group selector, corresponding to magnet 586 is connected to ground instead of battery, so that contact 916 of controller 35 upon being intermittently operated will cause a corresponding operation of said magnet. The selection is the same as previously described in connection with the group selector and the final selector.

*Reverting calls.*—If one subscriber on a party line desires to communicate with another party on that same line, the method of handling the call is as follows: The subscriber will request the operator to make connection with a certain number, and she will proceed to make the connection in the regular manner. When, however, the final selector makes connection with the line called, which in this case is that of the party calling, provision is made to increase the resistance of the circuit which ordinarily is in shunt of relay 801, and which governs the operation of that relay. When the final selector reaches the terminals of the called line, the stopping switch 79 is operated at the time pawl 75 falls into the coinciding points of the vernier disks. This results in delivering an impulse of current over conductors 861, through the train of selectors to relay 403 (Fig. 20) as follows: from the feed wire 844 through the normally closed contact 835 of relay 801, to conductor 820, thence to conductor 831 and through the alternate contact of the switch 79 and out over wire 811 to wire 861, and thence back through the chain of selectors to wire 461 (Fig. 20) through relay 403 and the normally closed contact of relay 402 to the ground feed wire 424. It will be remembered that the group selector used in this case is wired substantally as the circuit shown in Fig. 22, and therefore the circuit for the above impulses will be completed from wire 861 of the final selector to wire 461 of the operator's cord circuit shown on Fig. 20. One winding of the repeating coil is in shunt of relay 403, but does not interfere with its operation. When relay 403 operates, it breaks a normal shunt of a resistance in series with relay 409, and also introduces a resistance in series with the two talking conductors of the cord circuit. The resistance is added in series with relay 409 to increase the resistance of that circuit and thus permit the operation of relay 801 of the final selector; and the resistances are added in series with the talking conductors of the cord circuit to cause current to flow from the battery 499 through one winding of the repeating coil, through relay 402 out over conductor 462, and through the train of selectors to wire 862 (Fig. 25) through the contacts of relays 806 and 801 (the latter being now operated) to brush 52, (which at this time is in connection with a terminal corresponding to 431, Fig. 20) thence to the long spring of the jack 163 and by way of the ring of the plug 400 and armature and front contact of relay 403, through a winding of relay 404 to earth. Resistances are added in each side of the cord circuit so that in case the connection of the final selector with the line is in the opposite relationship to the plug 400, the current sent out through the relay 402 will be diverted through the winding of relay 404. This results in the operation of relay 404 which locks up through its front contact and the normally closed contact of key 425 through the front contact of relay 409, to wire 426 which leads to ground at the district selector. Relay 404, in operating, removes the ground from the common ground wire 424, which results in the release of the holding magnet of the district selector and the subsequent restoration of the other selectors throughout the set. The operation of relay 404 also applies an intermittent ground to relay 402 which operates and causes the supervisory signal lamp 423 to flash, (but in a different manner, as faster or slower, than an ordinary "busy" flash) indicating to the operator that the particular connection which she may be handling on that cord is a revertive call, and therefore she will be required to use a special cord in her position for ringing the called subscriber. Such a cord circuit is shown in Fig. 27. Relay 404 also applies a tone to the cord circuit, which is heard by the calling subscriber and by the operator, and denotes that it will be necessary to replace the receiver on the hook at the calling station, while the operator rings the party called. The two parties may then converse by means of current received from the special cord circuit shown in Fig. 27, and the operator will supervise the connection in the usual manner. It will be noted that relay 403 remains operated only during the prolongation of the impulse delivered at the time the stop switch 79 was operated, and therefore, in restoring, will short circuit the resistances in series with the talking circuit and relay 409, thus establishing the regular busy test potential on the line now in use, and preventing other final selectors from making connection with that line during the time plug 400 remains in the line jack. Provision is made in the special cord circuit mentioned above for maintaining a busy test potential on the line after this cord circuit has been connected thereto.

*Calling a subscriber in a distant manual exchange.*—As before stated, when a call is made for a subscriber of a distant exchange having its switchboard arranged for manual operation, the keys representing the desired office and the number of the subscriber wanted are depressed, the same as if the call were for a semi-mechanical office. The depressed office key in this case will bring about an extension of the circuit from the calling line to a trunk line leading to the desired office, as previously described, and cause the display of a signal thereat, whereupon the operator at that exchange will answer the call and complete connection to the called line, in the manner usual in manually-operated switchboards. Preferably, however, a number indicator is provided at the manual office, to be operated by impulses from the sending apparatus at the calling office, and thereby to automatically indicate to the manual office operator the number of the line wanted. For this purpose the depression of an office key designating a manual office is caused to bring about a modified operation of the sending apparatus controlled by the number keys, such that a succession of impulses upon the decimal system will be sent out, corresponding to the numerals of the depressed thousands, hundreds, tens, units and party-line-stations keys.

The particular mechanism of the indicator to be employed at the manual office is of no special importance provided it will respond to the selecting impulses, as herein described, so as to show the number transmitted. In an application of Amos F. Dixon, Serial No. 454,896, filed September 26, 1908, and patented Nov. 26, 1912, No. 1,045,686 one form of such mechanism is illustrated and described in detail, and this form is indicated in the diagram, Fig. 28. This mechanism has two stepping magnets 920 and 921, and a release-magnet 923; and will be arranged so that step magnet 920 operates thousands wheel 924, then step magnet 921 operates hundreds wheel 925, which movement shifts the driving gear (not shown) of step magnet 920, to drive the tens wheel 926. Step magnet 920 now operates said tens wheel, and in so doing shifts the driving gear so that step magnet 921 may operate units wheel 927. Step magnet 921 in driving units wheel 927 shifts the driving gear to allow step magnet 920 to drive stations wheel 928. When the operator at the manual office plugs into the trunk line jack in answer to the call, the release magnet 923 is energized, and the wheels return to normal. As shown, the indicator step magnets are operated in local circuits of a polarized double-movement line relay 929, which responds to reversals of polarity and operates in a similar way to the polarized relays used in connection with the group selector. A signal lamp 940 is arranged to be lighted when the indicator is operated, the circuit therefor being controlled at a contact 939 which is closed when the indicator leaves its normal position. Each of the indicator wheels is arranged to take one step from normal to display the index 0. This corresponds to the first step of a controller in reaching its "zero" terminals.

The operation of the office sender in securing a trunk leading to a manual office is similar to its operation already described in reaching a semi-mechanical office. The manual office key 235, however, besides grounding points in controllers 31 and 32, grounds wire 154 (common to the manual office keys) whereby a circuit is completed for the "manual office relays" 105, 342 and 341 (Figs. 19 and 18) which are connected in series between said conductor 154 and the battery feed 4.

Relay 342 shifts the sender leads 1 and 2 from the normal extensions used in calling semi-mechanical offices, to alternate extensions for special use in calling a manual office. The effect of relays 341 and 105 will appear in tracing in detail the subsequent operations.

The translators 33 and 34 are now to be used in succession instead of being operated simultaneously; and in fact they will have no "translating" function now, but will send impulses directly over the sender leads the same as controllers 35 and 36. First translator (or in this case "controller") 33 sends impulses under control of the thousands keys; then controller 34 sends impulses under control of the hundreds keys; then controller 35 sends impulses under control of the tens keys; then controller 36 sends impulses under control of the units keys, and finally (in calling a station on a party line) controller 35 will have a second operation under control of the stations keys. If the called station is not on a party line, the special or red button 119 of the stations keys will be pressed, which will cause the sending of numeral impulses to cease at the close of the "units" impulses.

The change which permits the operation of the translators 33 and 34 in succession, as controllers, is accomplished by relay 341, which prevents the operation of starter relay 352 when relay 319 is first released. When relay 214 (Fig. 17) operates at the end of the operation of the office sender, and connects test relay 318 (Fig. 18) to the sender lead 1, said test relay operates when an idle trunk line leading to the desired manual office is found and the magnet 920 of the indicator is caused to take a step, just as in the case of the brush-choosers of the semi-mechanical selectors. When relay 319 releases its armatures it removes the ground, essential to the test operation, from the sender lead 2, and completes a circuit for the manual office relay 343. The latter relay in attracting its armatures operates and locks up the relays 324, 325, 330 and 331. Relays 326 and 332 are therefore released. Relay 343 also opens the circuit of relay 319, so that it will not again be operated when test relay 318 is released. Finally, relay 343 opens connection of the battery feed to the middle brush of translator 33, which is not needed in this operation. The inner brush of translator 33, the middle and inner brushes of translator 34, the middle brush of controller 35 and the inner brush of controller 36 also are to be disregarded in the operation of the sender in governing the indicator at the manual office, the circuits through these brushes being open during such operation. The number sending apparatus is started by the completion of a circuit for starter relay 351 when test relay 318 operates and relay 319 releases at the moment when an idle trunk line leading to the desired distant office is secured by the automatic trunk selector. This circuit for starter relay 351 may be traced from battery feed 4 through back contact 314 of relay 319, front contact of relay 323, wire 398, through the winding of relay 351 to earth at the pulsator. The starter relay thereupon closes the stepping circuit for translator 33, over a path previously traced in describing the selection of a line in a distant semi-mechanical exchange. The stepping movements of magnet 366 of translator 33 simultaneously apply current derived through front contact of relay 341 and wire 152, to wire 950 and sender lead 2, and also apply ground to sender lead 1. These impulses cause the polarized relay 929 at the distant manual office to operate the step magnet 920 correspondingly, which advances the thousands wheel of the indicator. Said thousands wheel is thus given the same number of steps that controller 33 has taken in reaching the terminal grounded by the particular thousands key which was depressed, so that the corresponding numeral in the "thousands" place on the indicator would be displayed. It will be understood that the thousands wheel 924 of the indicator is not advanced on the first step of the translator 33, this wheel having been advanced one step when the circuit was completed for the test relay 318, and although the circuit of the test relay is opened at the back contact of relay 331, when relay 319 falls back, the interval until current is applied by the step magnet 366 of translator 33 is not of sufficient duration to permit the step magnet of the indicator to fall back, and, therefore, the said indicator does not advance to its second position until the second step of the translator 33.

When the outer brush on the rotary arm of the translator 33 reaches the point grounded by the depressed thousands key, the cut-off relay 316 is operated. Relay 317 is thereupon released, and closes a circuit for starter relay 352, to start translator 34. The circuit for starter relay 352 is traced from the battery feed 4 through the contact of the holding magnet of translator 33 to wire 381, back contact of relay 317, wire 382, front contact of relay 341, wire 376, contact 354 of relay 322, wire 355, contact of relay 302, (Fig. 14) wire 361, through starter relay 352, to earth at the pulsator.

Starter relay 352 closes the stepping circuit from the pulsator through the operating magnets of translator 34, previously traced in describing selection in the semi-mechanical office.

The step magnet 370 of translator 34 in responding applies battery derived from front contact of relay 341, wire 152, wire 952 to wire 953 and sender lead 1. Ground is also applied to wire 954 and sender lead 2. This causes the polarized relay 929 of the indicator to operate magnet 921 thereof and drive the hundreds wheel, causing it to display a numeral corresponding to the numeral of the depressed hundreds keys.

When the outer brush of translator 34 reaches the point grounded by the hundreds key, the cut-off relay 322 is operated in the usual way, releasing relay 323. The latter closes a new circuit for starter relay 352, as follows: from battery feed 4 at contact of holding magnet 363, to wire 381, back contact of relay 317, wire 382, back contact 380 of relay 323, wire 161, front contact of relay 342, wire 183, back contact of relay 332, wire 180, contact of relay 303, (Fig. 15) wire 181, normal contact 182 of controller 35, wire 123, normal contact of relay 327, wire 955, armature and front contact of operated relay 324, wire 383, wire 355, contact of relay 302, (Fig. 14) wire 361, relay 352, to earth at the pulsator. The starter relay 352 now closes the stepping circuit from the pulsator through the operating magnets of controller 35, as previously traced in describing selection in semi-mechanical office. The step magnet 388 of said controller in responding will apply battery 136 to sender lead 2 and ground to sender lead 1. These impulses will cause polarized relay 929 at the indicator to operate step magnet 920 thereof, which now drives the tens wheel and causes the latter to display a numeral corresponding to the numeral of the depressed tens key. When the outer brush of controller 35 reaches the point grounded by the depressed tens key, cut-off relay 327 is operated, as usual, breaking the starter circuit and stepping circuit and releasing relay 328. Relay 328 closes a new circuit for starter relay 352, as follows: from battery feed 109 through back contact of said relay 328, wire 186, contact of relay 304 (Fig. 15) wire 187, rotary arm contact 188, wire 189, back contact of relay 333, wire 398, wire 955, front contact of relay 324, wires 383, 355 and 361, through the starter relay 352, to earth at the pulsator. The starter relay now closes a stepping circuit from the pulsator through the operating magnets of controller 36, as before traced in describing selection in a semi-mechanical office. The stepping magnet 175 at each response applies battery to sender lead 1 and ground to sender lead 2, thereby causing the polarized relay 929 at the indicator to operate the step magnet 921, which now drives the units wheel 927 and causes it to display a numeral corresponding to the number of the depressed units key. When the outer brush of controller 36 reaches the point grounded by the depressed units key, cut-off relay 333 is operated in the usual way, breaking the starting and stepping circuit and releasing relay 334.

If the special red key 119 has been pressed, the operation of sending terminates just as in the selection of a line at a semi-mechanical office. If a stations key representing a station on a party-line has been pressed, the operation proceeds as follows: When relay 334 closes its contact 192, it applies battery to relay 335 through a path which may be traced as follows: from battery feed 4 at contact of holding magnet 363 of translator 33, over wire 381, back contact of relay 317, wire 382, back contact of relay 323, wire 161, front contact of relay 342, wire 183, back contact of relay 332, wire 180, contact of relay 303, (Fig. 15) wire 181, rotary arm contact 182 of controller 35, wire 123, back contact 192 of relay 334, winding and normal contact of relay 335, wire 122, through contact 162 of the holding magnet of controller 35 to the inner brush of said controller 35, this circuit to be completed to ground when said inner brush reaches the terminal grounded by the depressed stations key. At junction point 157 near relay 335 the above traced circuit divides, being continued to the starter relay 352, as follows: through a normal contact 164 of relay 335, through front contact of relay 305, (Fig. 15) front contact of relay 333, wire 398, wires 955, 383, 355 and 361, as before stated, through starter relay 352 to earth at the pulsator. The starter relay 352 now closes a stepping circuit for the operating magnets of controller 35, as follows: from pulsator 362, front contact 367 of relay 352, front contact 385 of relay 322, front contact of relay 325, wire 399, front contact of relay 330, front contact of relay 327, wire 190, front contact of relay 333, back contact of relay 335, wire 956, wire 386, through the step magnet 388 and holding magnet 387 of controller 35, to the free pole of grounded battery 389. The step magnet 388 of controller 35 at each response of the impulses of current in the stepping circuit just traced, applies battery 136 to sender lead 2 and ground 197 to sender lead 1, thereby causing the polarized relay 929 at the indicator to operate step magnet 920 to drive the stations wheel 928, and cause the same to display a letter (or numeral) corresponding to the letter (or numeral) of the depressed stations key.

When the inner brush of controller 35 reaches the point grounded by the depressed stations key, the relay 335 is operated, which breaks the stepping circuit and completes the operation of the sender in the manner formerly described. Test relay 318 is disconnected from the line by the opening of back contact of armature 307 of relay 331, which relay is operated by the "manual office" relay 343 upon the release of relay 319.

When the operator at the manual office sees the signal lamp 940 light, and the number of the line wanted appears upon the indicator, she inserts the answering plug of an ordinary standard pair in the spring-jack of the trunk line, and in so doing completes a circuit from the test ring of the jack to earth through the release magnet 923 of the indicator, thereby restoring said indicator to normal, and causing the signal lamp 940 to be extinguished by opening the circuit at contact 939. The connection to the called line is then completed by inserting the connecting plug of the pair in the jack of such line, and ringing in the ordinary way.

*Connection of office sender to leads of either primary or subsidiary sender.*—The sending apparatus under control of the office keys in intended, as before stated, to be used alternately as part of either the primary or subsidiary sender; and to this end transfer apparatus is provided, as shown in Fig. 17, whereby the office sender leads 101, 102 and 104 may be connected either to the leads 1, 2 and 4, respectively, of the primary sender, or to the leads 11, 12 and 14, respectively, of the subsidiary sender. The operation of this apparatus is as follows: relay 214, at the end of the operation of the office sender in conjunction with the primary sender, closes a contact 282 which completes a path to ground through the relay 212 from the battery feed 14 of the subsidiary sender derived through the back contact of a relay 215. If the subsidiary sender has been taken for use by another cord circuit, battery will be connected to the feed wire 14, and relay 212 will be operated and will lock up under control of relay 215. Relay 212 will also break a normal contact of its armature 276 and thereby disconnect the battery feed 4 of the primary sender from the feed wire 104 of the office sender. This will cut off current from the transfer relay 211 which normally derives current from the feed wire 104 of the office sender. Relay 211 will not, however, be again excited by current derived from the wire 104 because relay 212 in drawing up its armature 276 completes a short circuit of said relay 211. A relay 215 is provided to control the starting of the translators of the subsidiary sender in the same manner that relay 214 controls the starting of the translators 33, 34, of the primary sender. The relay 212 in drawing up its armatures switches the connection of the ground controlled by back contact of relay 213 from relay 214 to relay 215 so that at the end of the operation of controllers 31, 32, when used in conjunction with the subsidiary sender, relay 213 in recovering will complete a circuit from the battery feed 14 of the subsidiary sender through relay 215. This circuit may be traced from ground at back contact of relay 213 over wire 272, front contact 278 of relay 212, back contact 279 of relay 211, normal contact 281 of relay 215, through the winding of said relay 215 to the battery feed wire 14 of the subsidiary sender. When controllers 31, 32, have finished their work with the subsidiary sender, therefore, the keys will be restored by an impulse of current over wire 271 from relays 210 and 213, as before, and relay 215 will be operated, which will start the operation of the translators of the subsidiary sender in the same manner that relay 214 starts the translators 33, 34, of the primary sender. When relays 214, 215, are both excited, a circuit is completed for a warning signal 237 (Fig. 16) which may be a red lamp to indicate that both senders are in use, so that the operator will wait until one or the other is free before attempting to set up another connection. The lamp 237 may be included in the locking circuit of relay 215, and is arranged to be short circuited by a back contact 280 of relay 214 when said relay 214 recovers, which will be when battery is disconnected from the feed wire 120 at the end of the operation of the primary sender. When the controllers 31, 32, have completed their operation with the subsidiary sender, they will be made free to return to the primary sender, this return being under control of relay 214, and occurring when relay 214 is released. The relay 212, which was excited when relay 214 was excited, cut itself off from control of relay 214 and completed a locking circuit for itself through a back contact of relay 215. When relay 215 operates it unlocks said relay 212 which in turn removes the shunt from relay 211, thus permitting the latter to operate when battery is again applied to the office feed, which will occur when the armature 276 connects the primary sender feed 4 to the office feed 104.

*Operation when all trunks are busy.*—The last set of terminals in the path of the brushes of each selector (except the final selector) are connected as shown, for example, on Fig. 23, the test terminal 643 being without connection and the main circuit terminals 641 and 642 being connected respectively to ground (through a resistance) and to the free pole of a grounded signal appliance 646. This signal appliance is shown as a pulsator for intermittently closing circuit from the terminal 642 to earth, through a winding of an induction coil the primary of which receives interrupted current to produce a "busy-tone" signal.

When all the trunks capable of being reached by a given set of brushes are busy, the selector brushes will pass over the terminals of all these lines (there being potential present upon the test terminals of each) until the last set of terminals is reached, which has no test potential on its third terminal. The selector brushes will, therefore, stop at this last set of terminals, making connection therewith and the subsequent selecting impulses which are sent out just as if an idle trunk had been secured, will be received by the conductors 644 and 645, but will produce no effect. At the end of the sender operation, which up to this point has proceeded as though the desired line were being selected, the circuit of the battery in the cord circuit through one winding of the repeating coil and through the supervisory relay 402 is intermittently completed over the line conductors 462 (and the extension conductors 562 and 662 in the case assumed) to ground through the signaling appliance 646. The operator's supervisory lamp is thus caused to flash and a "busy tone" is produced in her telephone, and in the telephone of the calling subscriber notifying them that the desired connection cannot be obtained.

I claim:

1. In a semi-mechanical switching system, the combination with a plurality of senders, of a set of number keys, a corresponding set of locking relays associated with each sender, and means for switching the set of keys into operative relation to the set of locking relays of either sender.

2. The combination with a set of number keys, of a sender having a set of locking relays corresponding to said keys, and means controlled by the depression of keys representing a number for locking up corresponding relays of said set and rendering the other relays of the set unresponsive to said keys.

3. The combination with a set of number keys, of a primary sender and a subsidiary sender each having a set of locking relays corresponding to said keys, means controlled by the depression of keys representing a number for locking up corresponding relays of the set associated with the primary sender, and rendering the remaining relays of that set unresponsive to said keys, and means responsive to locking relays of the primary sender representing a complete number, for bringing the relays of the subsidiary sender under control of said keys.

4. The combination with a set of number keys, of a primary sender and a subsidiary sender, each having a set of locking relays corresponding to said keys, a battery-feed for each sender and means for applying current thereto in the use of that sender, circuits from the battery feed of the primary sender through the locking relays thereof controlled by corresponding keys, whereby keys representing a number may cause corresponding relays of the primary sender to be locked up, a transfer relay 306 adapted to connect the battery feed of the subsidiary sender through the locking relays thereof to said set of keys, and a circuit for said transfer relay closed through the agency of keys of the primary sender representing a complete number.

5. The combination with a group of number keys, of a sender having a corresponding group of key-relays 313 for governing its operations, a circuit for each relay adapted to be closed by the corresponding key, a relay 301 adapted when excited to disconnect the supply of current which may normally be applied to said key-relays by the corresponding keys, an exciting circuit for said relay 301 closed when any key is depressed, and a locking circuit for said relay 301 closed by its own contacts and including a locking winding of the key relay which was excited upon the depression of the corresponding relay.

6. The combination with a group of keys, of a sender having a corresponding group of relays, an exciting circuit for each relay adapted to be closed by the corresponding key, a cut-off relay included in a common branch of said relay-exciting circuits, a locking winding for each of the first-mentioned relays, and a locking circuit for the cut-off relay including the locking windings of all the key relays, closed by said cut-off relay when excited, said key relays being adapted not to draw up their armatures under the influence of the current in said locking circuit, but to hold their armatures against release if already drawn up.

7. In an automatic switching system for telephone exchanges, the combination with an operator's connecting circuit, of a selector in which said circuit terminates, stationary contacts for said selector, sending apparatus associated with said connecting circuit, office selectors connected to certain stationary terminals of said first selector, stationary terminals for said office selectors, trunk selectors in distant offices connected to stationary terminals of said office selectors, stationary terminals for said trunk selectors, group selectors in each distant office connected to the stationary terminals of said trunk selectors, stationary terminals for said group selectors, connectors connected to the stationary terminals of said group selectors, and subscribers' lines connected to the stationary terminals of said connectors; local group selectors connected to other stationary contacts of the first selector, stationary contacts for said local group selectors, and local final selectors connected to the stationary contacts of the local group selectors, said local final selectors being arranged in groups represented by corresponding zones of multiple terminals upon said local group selectors.

8. The combination with an office sender, of primary and subsidiary sender leads, a transfer relay 211 governing the alternate connection of said office sender to one set of leads or the other; relays 214 and 215 operated respectively at the conclusion of the office sender operation over the primary and subsidiary leads, a shift relay 212 and circuit connections, whereby said transfer relay is caused at the end of any office sender operation to shift the connection of said office sender from the leads over which it has just operated, to the alternate set of leads.

9. The combination with operator's connecting circuits having sender-seizing apparatus, of an office sender, primary and subsidiary sets of sending leads, a transfer relay 211 having normal contacts connecting said office sender to the subsidiary leads, and alternate contacts adapted to connect said office sender to the primary leads, a feed wire 104 for the office sender, from which said transfer relay is connected in a branch circuit, primary and subsidiary battery feed wires 4 and 14, and means for applying current thereto during the seizure of the corresponding senders by any operator's connecting circuit, a relay 212 having a normal contact connecting the primary feed wire 4 to the office sender feed wire 104, and having an alternate contact adapted to short circuit the said transfer relay, a relay 214 arranged to be excited upon the conclusion of the office sender operation over the primary leads, a relay 215 arranged to be excited upon the conclusion of the office sender operation over the subsidiary leads, a connection from the subsidiary feed wire 14 to the office feed wire 104 through normal contacts of relays 215 and 211 in series, a circuit for relay 212 adapted to be completed by relay 214, and a locking circuit for said relay 212 controlled at a back contact of relay 215.

10. In a sending apparatus for a semi-mechanical telephone exchange system, the combination with a number of controllers, of a cut-off relay for each controller in a circuit adapted to be completed by said controller at a predetermined point in its operation, a feed wire for the sender, means for supplying current to said feed wire in taking the sender for use, slow-release relays governing the sequential operation of said controllers, said slow release relays being in local circuits from said sender feed wire controlled by the respective cut-off relays, a slow-release relay released at the end of the last controller operation and means controlled thereby for cutting off current from the sender feed wire.

11. The combination with a selector having a movable switch-member, stop setting mechanism responsive to selecting impulses, a relay and means controlled thereby for advancing said switch-member to the point predetermined by said stop-setting mechanism, of sending mechanism including a controller adapted in its operation to transmit impulses for the operation of said stop-setting mechanism, a relay in a circuit completed by said controller in reaching a predetermined point, and means controlled by said last-mentioned relay for completing a circuit for said first-mentioned relay to cause the advance of the switch member under control of said stop-setting mechanism.

12. The combination with a controller, of a cut-off relay in a circuit completed by said controller at a predetermined point in its operation, a slow-release relay in a circuit adapted to be broken by said cut-off relay in its response, a sender-circuit arranged to be established momentarily through a front contact of the cut-off relay and a front contact of said slow-release relay, and electro-responsive switch mechanism adapted to be actuated by the impulse of current in said sender circuit.

13. The combination with a selector having a movable switch member, stop-setting mechanism responsive to selecting impulses, a relay and means controlled thereby for advancing said switch member under control of said stop-setting mechanism, of sending apparatus including a controller adapted in its operation to control the transmission of selecting impulses for the operation of said stop-setting mechanism, a cut-off relay actuated by said controller at a predetermined point in its operation, means responsive to said cut-off relay for stopping said controller, a slow-release relay in a circuit opened by said cut-off relay, and a circuit for the first-mentioned relay adapted to be momentarily completed in front contacts of said cut-off relay and said slow-release relay.

14. The combination with a controller having electromagnetic stepping mechanism, of a stepping circuit for said controller, a starter relay having contacts adapted to close said stepping circuit, a cut-off relay in a circuit adapted to be completed by said controller in reaching a predetermined point, said cut-off relay having contacts adapted to break said stepping circuit, a slow-release relay in a circuit adapted to be broken by said cut-off relay, a second controller, a stepping circuit for said second controller, and means controlled by back contacts of said slow-release relay, for bringing said last-mentioned stepping circuit under control of said starter relay.

15. The combination with a selector having a traveling contact brush, a source of mechanical power, a magnet controlling the application of power to drive said brush, and a stopping-switch automatically-operated as the brush reaches a predetermined point, of a relay adapted when excited to close a circuit for said magnet under control of said stopping-switch, a locking winding of said relay being included in said circuit, a circuit for said magnet excluding said locking winding, established upon the operation of said stopping-switch and controlled at a front contact of said relay, means for initially exciting said relay to cause the advance of the traveling brush to the predetermined point, and a test-circuit from said brush governing the further operation of said relay, said test-circuit being established upon the operation of said stopping-switch, whereby the traveling brush is caused to advance further to hunt an idle terminal and to stop when one is found.

16. The combination with a selector having a traveling contact brush, a power magnet and a source of mechanical power controlled thereby for moving said brush, of a circuit for said power magnet, a stopping-switch automatically actuated as said brush reaches a predetermined point, said stopping-switch being adapted to open the aforesaid circuit of said power magnet, a test circuit from the brush, a relay in said test circuit, and means controlled by the operation of said stopping switch for establishing a circuit for said power magnet under exclusive control of the relay in said test circuit.

17. The combination with a selector having a traveling contact brush, a clutch-magnet, means controlled thereby for advancing said brush during the excitation of said clutch magnet, and a stop-setting mechanism having a step-magnet for selectively adjusting the same, of a clutch relay, as 407, and a hunting relay, as 408, and temporary means for initially exciting them, a circuit closed by said clutch relay including said clutch magnet and also including locking windings for both relays, a stopping-switch adapted to open said clutch circuit as the traveling brush reaches the point predetermined by the stop-setting mechanism, whereby the clutch is thrown off and the hunting relay released, a circuit for the clutch relay completed in alternate contacts of the stopping switch, a circuit for the step-magnet completed at back contacts of the hunting relay when the latter is restored, said stop-setting mechanism being adapted under the influence of said step magnet to restore the stopping switch, whereby a circuit for the clutch is again completed, under control of a front contact of the clutch relay, said hunting relay having contacts whereby upon its recovery the locking windings of said relays have been excluded from the clutch circuit, and said clutch relay having a winding in a test circuit from said traveling brush adapted to be completed at the terminal of a busy line; whereby after the arrival of the traveling brush at the predetermined point the clutch is again thrown on to advance the brush until an idle terminal is reached.

18. The combination with a selector having a movable brush-carrier, power-driven mechanism for driving the same, and a clutch controlling the operation thereof, and a stopping device adapted to throw off the clutch as the brush carrier reaches a predetermined point, of testing means for again throwing on the clutch to secure a further travel of the brush-carrier in hunting an idle terminal, and means for suspending the operation of said clutch under control of said testing means, until the brush-carrier has settled in position after the toss occurring when the clutch is first thrown off.

19. The combination with a selector having a vertically-movable brush carrier, elevator mechanism for moving the same, a clutch controlling the mechanical operation of said elevator mechanism, and a stopping device adapted to throw off the clutch as the brush carrier reaches a predetermined point, of an initially-excited hunting relay, released upon the operation of said stopping switch, and testing means, adapted under control of said hunting relay when the latter has recovered, to again throw on the clutch to cause a further upward travel of the brush carrier to hunt an idle terminal, said hunting relay being of the slow-release type, whereby the brush carrier may settle in position after the toss that occurs when the clutch is thrown off at the end of its first operation, before said testing means may cause the clutch to be again applied for the hunting movement.

20. A selector having a traveling switch member, a stop setting mechanism and a step magnet for adjusting the same, a magnetic clutch and means controlled thereby for moving said switch member to the point determined by said stop-setting mechanism, a subsidiary brush-chooser having a step magnet, a telephone line circuit having two main conductors, the stop-setting step magnet being connected in a normal branch from one of said conductors while the brush-chooser step magnet is connected in a normal branch from the other conductor, a clutch relay in an alternative normally-open branch from said last-mentioned conductor, a local circuit for said magnetic clutch, closed by said clutch relay when excited, and a switch actuated in the operation of the stop- .cting step magnet over one line conductor, adapted to shift the connection of the other line conductor from the brush-chooser step magnet to said clutch relay; in combination with transmitting means for sending current impulses over one or the other of said line conductors.

21. The combination with a selector having a movable switch member, stop-setting mechanism, a stepping magnet for adjusting the same, a source of mechanical motive power and a magnet controlling the application thereof to carry the switch member to the point determined by said stop-setting mechanism, of a transmitting circuit having two conductors, said stepping magnet being connected to one of said conductors and the other magnet connected to the other conductor, a sender comprising means for transmitting selecting impulses over the first conductor to actuate the step magnet, and means for thereafter applying current to the other conductor to actuate the other magnet.

22. A selector having a traveling switch member, a stop setting mechanism, a step magnet and mechanism operated thereby for adjusting said stop setting mechanism to determine long divisions of advance of the switch member, a shift magnet and mechanism brought into action thereby for permitting said step magnet to adjust the stop-setting mechanism for short divisions of advance of the switch member, a clutch relay and means controlled thereby for causing the switch member to be moved to the point determined by said stop-setting mechanism; in combination with a line circuit having two main conductors, a branch circuit from one of said line conductors through said step magnet, a branch circuit from the other line conductor through said shift magnet, a switch operated by said shift magnet adapted to open the first branch containing the step magnet and substitute an alternate branch through said clutch relay, and transmitter means for applying current to either one or the other of said line conductors.

23. The combination with a selector having a traveling brush carrier, stop setting mechanism, a step magnet for adjusting the same, a clutch relay and means controlled thereby for advancing the brush carrier to the point predetermined by said stop setting mechanism, of a trunk line circuit having two main conductors, a bridge of the circuit containing polarized relay apparatus, and local circuits for the step magnet and the clutch relay respectively, adapted to be closed alternatively by said polarized relay apparatus according to the direction of current applied to said trunk line.

24. The combination with a selector having a traveling brush carrier, of a trunk line having two main conductors extending to brushes on said carrier, a relay 704 having normally-open contacts controlling such extensions to the brushes, polarized relay apparatus for controlling the operating magnets of the selector, in a bridge of the trunk line controlled by normally closed contacts of said relay 704, a marginal relay 703 also in said bridge, and a circuit for relay 704 closed by the operation of relay 703.

25. The combination with a selector having a traveling brush carrier, of a trunk line having two main conductors extending to brushes on said carrier, a relay 704 having normally-open contacts controlling such extensions to the brushes, polarized relay apparatus and a marginal relay 703 in a bridge of the trunk line, controlled by normally closed contacts of said relay 704 and including one set of windings of a repeating coil by which the incoming trunk line is conductively divided from said extensions, the other windings of the repeating coil being included together with a source of current in a bridge of said extensions, a condenser in shunt of said relays in the first mentioned bridge, a circuit for relay 704 closed by said marginal relay 703, a relay 710 having contacts controlling a circuit for maintaining the excitation of relay 704, said relay 710 having a high resistance winding in a bridge of the trunk line closed by relay 704, a supervisory relay 706 in the circuit of said extensions, and a low resistance winding for said relay 710 in a normally-open shunt of said condenser adapted to be closed by said relay 706.

26. The combination with a number of trunk selectors, a distant group selector and a trunk line extending from multiple terminals upon said trunk selectors to said group selector, of sending apparatus having a test relay governing the continuance of its operation, and a normally open circuit for said test relay whose two limbs are adapted to be extended to the two conductors of the trunk line by a trunk selector in establishing a connection under control of said sending apparatus, a bridge of the trunk line at the group selector adapted to complete the circuit of the test relay so extended to it, and an off-normal switch for the group selector adapted to open said bridge; whereby if the trunk line is seized by a trunk selector while the group selector is off normal, the operation of the test relay at the sending apparatus will be prevented.

27. In a telephone exchange system, a two-wire trunk line and a selector at the terminal thereof, a local circuit and mechanism therein adapted to determine the selection of a general zone of contacts, a second local circuit and mechanism therein adapted to determine the selection of a particular division in such zone, and polarized relay apparatus in the circuit of the trunk line near said selector adapted to close one or the other of said local circuits according to the direction of current in said trunk line, in combination with sender apparatus adapted to transmit current impulses of different polarities over said trunk line to operate said polarized relay apparatus.

28. In a semi-mechanical telephone exchange system, the combination with keys adapted to be set by the operator in combinations to represent any line number of the system, of a two-wire trunk line to a distant office, a sending apparatus adapted under control of said keys to transmit a corresponding sequence of impulses, the impulses representing the different digits being transmitted over the different wires alternately, an indicator at the distant office having a plurality of register wheels and two stepping magnets therefor, said indicator being arranged so that when a register wheel is actuated by one of said magnets, the next wheel of the series is in operative relation to be driven by the other magnet, and means whereby the impulses representing the different digits are caused to operate said magnets alternately.

29. In a semi-mechanical telephone exchange system, the combination with office keys and number keys adapted to be set by an operator at one of the exchange offices, sending apparatus governed by the office keys, selectors responsive thereto adapted to choose a trunk to the office designated by the depressed key, selector mechanism at another exchange office, a number sender at the first office controlled by the number keys, and adapted to operate said last-mentioned selectors, an indicator at still another exchange office having step-by-step number-indicating mechanism, and means controlled by the office key representing the last-mentioned office, for modifying the action of the number sender to cause the same to transmit impulses suitable for the operation of said step-by-step number-indicating mechanism.

30. In a telephone exchange system, the combination with a trunk line circuit and means for applying selecting impulses thereto, of an indicator having a series of numerical indicating parts and an operating magnet adapted to actuate said parts in response to such selecting impulses, a magnet governing the return of said indicating parts to normal position, and an operator's switch controlling a circuit for said magnet.

31. In a telephone exchange system, the combination with a two-wire trunk line circuit and means at one terminal thereof for applying selecting impulses in the circuit in successive sequences alternating in polarity, of a polarized relay in the circuit of the trunk line at the other end, responsive to said selecting impulses, an indicator having two operating magnets, and local circuits for said magnet controlled respectively by alternative actions of said polarized relay.

32. In a semi-mechanical telephone exchange system, the combination with keys adapted to be set by the operator in the combinations required to represent any line number of the system, of sending apparatus controlled by said keys, selectors at certain exchange offices adapted in response to said sending apparatus to select the line represented by the depressed keys, and indicators at other offices responsive to said sending apparatus to notify a trunking operator of the call.

33. In a semi-mechanical telephone exchange system, the combination with keys adapted to be set by an operator, of sending apparatus governed by said keys, selectors at distant offices of the system, adapted under control of said sending apparatus to select a line of such office, and indicators at other offices responsive to said sending apparatus to display the numbers registered on said number keys.

34. In a semi-mechanical telephone exchange system, the combination with office keys and number keys adapted to be set by an operator at one of the exchange offices, of sending apparatus controlled by the office keys, selectors responsive thereto for choosing a trunk to the office designated by the depressed key, selectors at certain of the other offices, sending apparatus controlled by the number keys for operating said last-mentioned selectors, an indicator at another office, and means controlled in the course of extending connection to the last-mentioned office for causing the operation of said indicator by the sending apparatus.

35. In a semi-mechanical telephone exchange system, a sender comprising keys, controller apparatus governed by said keys, a battery feed wire, relays governing the sequence of controller operations, said relays being initially excited from said feed wire, and means for releasing said relays in sequence, as the controllers are operated, to bring about succeeding operations.

36. In an automatic switching system for telephone exchanges, the combination with a connecting-circuit, and selector mechanism to which said circuit is extended, of a telephone line and means for uniting said connecting-circuit therewith in answering a call, said selector mechanism being adapted to extend said connecting-circuit to other lines and also to make a "revertive" connection to said calling line, and means, actuated in making revertive connection, adapted to cause the restoration of said selector mechanism.

37. In a telephone exchange system, a selector having a non-decimal number of sets of traveling contact brushes, each set arranged to travel over a corresponding zone of terminals, and a brush-choosing selector adapted to choose any of said sets of traveling brushes, in combination with transmitting mechanism comprising a set of decimal number keys, and means governed by a combination of said keys representing a number of a decimal system, for causing the transmission of impulses adapted to cause the sequential operation of said selectors according to the groupings of brushes and terminals thereof, to select the line represented by such combination of keys.

38. In a telephone exchange system, the combination with automatic switching mechanisms, of a calling device for selectively controlling the operation of said switching mechanisms, trunk lines extending from certain of said switching mechanisms to a manual exchange, and numerical indicating apparatus at said manual exchange operable over said trunk lines in response to said calling device to designate one or more digits of a called number.

39. In a telephone system, an exchange, automatic switching apparatus thereat, calling mechanism for controlling the operation of said switching apparatus, trunk lines connecting said apparatus with a manual exchange, numerical indicating apparatus at said manual exchange embracing a plurality of registers, each adapted in response to said calling mechanism to move a definite distance to determine a digit of a called number, and means under the control of the calling mechanism and operable over said trunk lines to associate said registers successively with said calling mechanism.

40. In a telephone system, a plurality of exchanges, trunk lines extending between said exchanges, selector switches at one of said exchanges, sending apparatus, said switches operating under the control of a sending apparatus to select a trunk line extending to the exchange of a wanted subscriber, and means at certain of said exchanges operating under the control of said sending device for displaying the number of the wanted subscriber.

41. In an automatic switching system, an exchange, a second exchange, subscribers' lines extending to said exchanges and trunk lines between said exchanges, other trunk lines local to said first exchange, automatic switches for extending a connection between subscribers' lines, and calling devices for controlling said switches, said switches operating under the control of the calling devices when manipulated in accordance with the number of the subscriber wanted, to extend the connection through an interoffice trunk line and a certain number of switches or through a local trunk line and a different number of switches according as to whether the calling and called subscribers' lines are connected to different exchanges or to one and the same exchange.

42. In a telephone system, a plurality of central stations, subscribers' lines extending thereto, interoffice and intraoffice trunks for connecting said lines, calling devices, and switches operated under the control of said calling devices when manipulated in accordance with the number of a wanted subscriber for automatically selecting and completing a connection over an intraoffice trunk through a certain number of switches or over an interoffice trunk through a greater number of switches, according to whether the calling subscriber's line terminates at the same office as the called subscriber's line or at an office external thereto.

43. A telephone switching system comprising subscribers' lines, a plurality of subscribers' stations connected to each of a plurality of said lines, controllers, automatic switch mechanism for selecting a line under the control of said controllers, and means at said switching mechanism whereby said mechanism will be released when the calling and called stations are on the same line.

44. In a telephone system, an exchange, lines terminating thereat, a plurality of subscribers' stations on certain of said lines, automatic switching mechanisms at said exchange for completing connections between calling and called subscribers' lines, and means operated when the calling and called subcribers' stations are on the same line for releasing the switching mechanism, and means for displaying a characteristic signal before the operator.

45. In a telephone system, an exchange, subscribers' lines terminating thereat, a plurality of subscribers' stations on certain of said lines, switching mechanisms, a sending device, said switching mechanisms being operated under the control of said sending device to complete a connection from a calling to a called subscriber's line, and means automatically operated incident to completing a connection back to the line of the calling subscriber for causing a characteristic tone to be transmitted to the calling subscriber.

46. A mechanical telephone switching system comprising groups of connectors, subscribers' lines connected to said connectors, group selectors for selecting idle connectors in a plurality of said group of connectors, a plurality of subscribers' stations connected to certain of said lines, sending devices for causing said group selectors to select an idle connector and for causing the connector to connect to any desired one of said lines, and means for releasing said group selectors operated when the sender is so actuated as to cause the connector to connect with the line belonging to the calling station.

47. A mechanical telephone switching system, groups of connectors, subscribers' lines connected to said connectors, group selectors adapted to select idle connectors in any of a plurality of said groups of connectors, a plurality of subscribers' stations connected to each of a plurality of said lines, sending devices for causing said group selectors to select an idle connector and for causing the connector to connect to any desired one of said lines, releasing means at said connectors and at said group selectors, and means for causing the actuation of said releasing means when the calling and called subscribers are on the same line.

48. A telephone switching system, comprising subscribers' lines, a plurality of subscribers' stations connected to each of a plurality of said lines, means for rendering the line of a calling station unselectable, sending devices, mechanical switches for selecting a line under the control of a sending device, means for releasing said switches when a sending device is actuated so as to cause the selectors to unite to a calling line, and means for maintaining the line of the calling station unselectable after the release of the switches that were caused to select said line.

49. In a telephone exchange system, a plurality of offices, lines terminating at said offices, automatic switches for completing telephonic connection between a calling and called lines, a sender for controlling the operation of said switches, office keys and sets of digits keys governing the operation of the sender, said sender operating under the control of said keys to send a less number of series of impulses when a local office key is depressed than when a key representing a distant office is depressed.

50. In a telephone exchange system, a plurality of offices, number indicating mechanism at one of said offices, automatic switches for completing a call to a wanted subscriber at another of said offices, switching apparatus for extending a calling line to either of said offices, a sending device, keys representing the several offices of an exchange governing the operation of said sending device, digits keys also controlling the operation of said sending device, said sending device operating when a key representing a semi-automatic office is depressed to send out the impulses according to a non-decimal system of notation and when a key representing a manual office is depressed to send out impulses to operate said number indicating mechanism according to the decimal system of notation.

In witness whereof, I, hereunto subscribe my name this 24th day of July A. D., 1908.

ALBERT M. BULLARD.

Witnesses:
MYRICK C. YOUNG,
WM. H. YOUNG.

Copies of this patent may be obtained for five cents each, by addressing the "Commissioner of Patents, Washington, D. C."